US 10,496,943 B2

(12) United States Patent
De et al.

(10) Patent No.: US 10,496,943 B2
(45) Date of Patent: Dec. 3, 2019

(54) VISUAL TASK ASSIGNMENT SYSTEM

(71) Applicant: Oracle International Corporation, Redwood Shores, CA (US)

(72) Inventors: Niladri De, Hyderabad (IN); Mani Kumar Vran Kasibhatla, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 1019 days.

(21) Appl. No.: 14/672,346

(22) Filed: Mar. 30, 2015

(65) Prior Publication Data

US 2016/0292620 A1 Oct. 6, 2016

(51) Int. Cl.
*G06Q 10/00* (2012.01)
*G06Q 10/06* (2012.01)

(52) U.S. Cl.
CPC .............. *G06Q 10/063118* (2013.01)

(58) Field of Classification Search
None
See application file for complete search history.

(56) References Cited

U.S. PATENT DOCUMENTS

| | | |
|---|---|---|
| 5,737,728 A | 4/1998 | Sisley et al. |
| 5,745,110 A | 4/1998 | Ertemalp |
| 6,115,640 A | 9/2000 | Tarumi |
| 6,211,856 B1 | 4/2001 | Choi et al. |
| 6,707,903 B2 | 3/2004 | Burok et al. |

(Continued)

FOREIGN PATENT DOCUMENTS

| | | |
|---|---|---|
| CN | 102306162 A | 1/2012 |
| EP | 1026609 A2 | 8/2000 |

(Continued)

OTHER PUBLICATIONS

Gunderloy, Mike. Performing Drag-and-Drop Operations, Microsoft, Feb. 2002, https://msdn.microsoft.com/en-us/library/ms973845.aspx, p. 1-7.*

(Continued)

*Primary Examiner* — Joseph M Waesco
(74) *Attorney, Agent, or Firm* — Potomac Law Group, PLLC

(57) ABSTRACT

A system is provided that visualizes task assignments. The system displays a project plan timeline within a user interface. The system further displays a first resource indicator and a second resource indicator within the project plan timeline. The system further displays a task indicator within the first resource indicator. The system further defines a side-area region of the task indicator, where the defining the side-area region designates the task as a multi-resource enabled task. The system further assigns the task to the second resource in response to a drag of the side-area region of the task indicator and a drop within the second resource indicator, where the task is assigned to both the first resource and the second resource. The system further displays a first task part indicator and a second task part indicator within the project plan timeline in place of the display of the task indicator. The first task part indicator is displayed within the first resource indicator and the second task part indicator is displayed within the second resource indicator.

18 Claims, 38 Drawing Sheets

(56) References Cited

U.S. PATENT DOCUMENTS

| | | | |
|---|---|---|---|
| 6,920,632 | B2 | 7/2005 | Donovan et al. |
| 7,092,929 | B1 | 8/2006 | Dvorak et al. |
| 7,406,432 | B1 | 7/2008 | Motoyama |
| 7,536,313 | B2 | 5/2009 | Motoyama |
| 7,688,322 | B2 * | 3/2010 | Kapler .................. G06Q 10/06 345/440 |
| 7,912,746 | B2 | 3/2011 | Kline et al. |
| 7,921,026 | B2 | 4/2011 | O'Cull et al. |
| 8,099,312 | B2 | 1/2012 | Jin et al. |
| 8,160,911 | B2 | 4/2012 | Lau et al. |
| 8,224,472 | B1 * | 7/2012 | Maluf .................... G06Q 10/06 700/97 |
| 8,286,103 | B2 | 10/2012 | Chaudhri et al. |
| 8,433,632 | B2 | 4/2013 | Sankaran et al. |
| 8,544,011 | B2 | 9/2013 | Tanikawa |
| 8,776,008 | B2 | 7/2014 | Kapoor et al. |
| 2003/0038831 | A1 | 2/2003 | Engelfriet |
| 2003/0061266 | A1 | 3/2003 | Ouchi |
| 2003/0149717 | A1 | 8/2003 | Heinzman |
| 2005/0149370 | A1 | 7/2005 | Brown |
| 2005/0165631 | A1 | 7/2005 | Horvitz |
| 2005/0198103 | A1 | 9/2005 | Ching |
| 2005/0229151 | A1 | 10/2005 | Gupta et al. |
| 2005/0289013 | A1 | 12/2005 | Goldberg |
| 2006/0004618 | A1 * | 1/2006 | Brixius ................... G06Q 10/06 705/7.18 |
| 2006/0212325 | A1 | 9/2006 | Levanon |
| 2006/0277487 | A1 * | 12/2006 | Poulsen ................. G06Q 10/06 715/772 |
| 2007/0073575 | A1 | 3/2007 | Yomogida |
| 2007/0150327 | A1 | 6/2007 | Dromgold |
| 2007/0192748 | A1 * | 8/2007 | Martin .................. G06F 3/0486 715/856 |
| 2007/0233534 | A1 * | 10/2007 | Martin ................... G06Q 10/06 705/301 |
| 2007/0245300 | A1 | 10/2007 | Chan et al. |
| 2008/0027776 | A1 * | 1/2008 | Sourov ................. G06Q 10/06 705/7.23 |
| 2008/0103871 | A1 | 5/2008 | Ruehl et al. |
| 2008/0126114 | A1 | 5/2008 | McClure |
| 2008/0155433 | A1 | 6/2008 | Robertson et al. |
| 2008/0215409 | A1 | 9/2008 | Matre |
| 2008/0221946 | A1 | 9/2008 | Balon |
| 2008/0301698 | A1 | 12/2008 | Badaloo et al. |
| 2009/0133027 | A1 * | 5/2009 | Gunning ................ G06Q 10/06 718/103 |
| 2009/0158293 | A1 | 6/2009 | Kajihara |
| 2009/0198540 | A1 | 8/2009 | Kienzle et al. |
| 2009/0216602 | A1 | 8/2009 | Henderson |
| 2009/0234699 | A1 | 9/2009 | Steinglass et al. |
| 2009/0320019 | A1 | 12/2009 | Ellington et al. |
| 2010/0010856 | A1 | 1/2010 | Chua et al. |
| 2010/0257015 | A1 * | 10/2010 | Molander ............... G06Q 10/06 705/7.21 |
| 2011/0107256 | A1 | 5/2011 | Robertson et al. |
| 2011/0216067 | A1 * | 9/2011 | Schorr .................. G06F 3/0486 345/440 |
| 2011/0271220 | A1 | 11/2011 | Remsberg et al. |
| 2011/0276351 | A1 | 11/2011 | Kondo et al. |
| 2011/0283285 | A1 | 11/2011 | Saad et al. |
| 2012/0079403 | A1 * | 3/2012 | Schorr .................. G06F 3/0486 715/764 |
| 2012/0130907 | A1 * | 5/2012 | Thompson ........... G06Q 10/103 705/301 |
| 2012/0278118 | A1 | 11/2012 | Araki et al. |
| 2013/0120239 | A1 | 5/2013 | Suzuki et al. |
| 2013/0132334 | A1 * | 5/2013 | Reisdorf .............. G06Q 10/101 707/608 |
| 2013/0144679 | A1 | 6/2013 | Burnett et al. |
| 2013/0325763 | A1 | 12/2013 | Cantor et al. |
| 2014/0032257 | A1 | 1/2014 | Houle |
| 2014/0058786 | A1 * | 2/2014 | Marquet .......... G06Q 10/06316 705/7.26 |
| 2014/0122144 | A1 * | 5/2014 | Cirpus .................. G06Q 10/06 705/7.14 |
| 2014/0229212 | A1 * | 8/2014 | MacElheron .......... G06Q 10/06 705/7.15 |
| 2014/0244334 | A1 * | 8/2014 | De ................. G06Q 10/063118 705/7.17 |
| 2014/0278690 | A1 | 9/2014 | Agarwal et al. |
| 2015/0007058 | A1 * | 1/2015 | Wooten ............... G06F 3/04842 715/753 |
| 2015/0324190 | A1 * | 11/2015 | Ledbrook .......... G06Q 10/0631 717/101 |

FOREIGN PATENT DOCUMENTS

| | | |
|---|---|---|
| EP | 1061443 A2 | 12/2000 |
| JP | 2000194469 A | 7/2000 |
| JP | 2012079200 A | 4/2012 |
| JP | 2013105310 A | 5/2013 |
| JP | 2013127821 A | 6/2013 |
| WO | 1994016397 | 7/1994 |
| WO | 2001018683 A2 | 3/2001 |
| WO | 20040102431 A1 | 11/2004 |
| WO | 2009055425 A1 | 4/2009 |
| WO | 2012092556 A2 | 7/2012 |
| WO | 20130100902 A1 | 7/2013 |
| WO | 20130162572 A1 | 10/2013 |

OTHER PUBLICATIONS

Daniel D. Suthers, "An Analysis of Explanation and Its Implications for the Design of Explanation Planners", Computer Science, Feb. 1993, ftp://ftp.pitt.edu/dept/lrdc/edtech/suthers/suthers-thesis-full.pdf, last downloaded Mar. 5, 2014.

Charlotte Russe, "BOARD delivers Budgeting and Planning Applications for Charlotte Russe", http://www.board.com/downloads/1en_CharlotteRusse.pdf, last downloaded Mar. 5, 2014.

Constraints and Dependencies—Gantt Charts Online—Gantto.com, http://gantto.com/support/documentation/constraints-and-dependencies/?overlay=false, last downloaded Mar. 5, 2014.

Stephen Sloan et al., "CPM and GANTT: The Next Step in Multi-Project Management", http://www.nesug.org/Proceedings/nesug12/ma/ma07.pdf, last downloaded Mar. 5, 2014.

Distribute project work evenly (level resource assignments), http://office.microsoft.com/en-in/project-help/distribute-project-work-evenly-level-resource-assignments-HA001231647.aspx, last downloaded Mar. 5, 2014.

Agata Czarnigowska, "Earned value method as a tool for project control", Budownictwo i Architektura 3 (2008) 15-32, http://yadda.icm.edu.pl/baztech/element/bwmeta1.element.baztech-article-BPL6-0014-0070/c/httpwibis_pollub_plfilesplikikonferencje32.pdf, last downloaded Mar. 5, 2014.

Bonnie Biafore, "Fast-track tasks to shorten your project schedule—Project—Office.com", http://office.microsoft.com/en-in/project-help/fast-track-tasks-to-shorten-your-project-schedule-HA010036399.aspx, last downloaded Mar. 5, 2014.

Features: Task Management, Zilicus PM Project planing & collaboration software, http://www.zilicus.com/features/task-management.html, last downloaded Mar. 5, 2014.

Danny Holten, "Hierarchical Edge Bundles: Visualization of Adjacency Relations in Hierarchical Data", IEEE Transactions on Visualization and Computer Graphics, vol. 12, No. 5, Sep./Oct. 2006, http://www.win.tue.nl/~dholten/papers/bundles_infovis.pdf, last downloaded Mar. 5, 2014.

How to Create Project Schedule Part II, Elementool Project Management Blog, http://www.elementool.com/blog/?p=238, last downloaded Mar. 5, 2014.

Zhenhua Guo et al., "Improving Resource Utilization in MapReduce", School of Informatics and Computing, Indiana University, US, http://grids.ucs.indiana.edu/ptliupages/publications/Improve_Resource_Utilization_MapReduce_V8.pdf, last downloaded Mar. 5, 2014.

Microsoft Project—Project Management Features, http://office.microsoft.com/en-us/project/project-management-and-ppm-showcase-microsoft-project-FX103802304.aspx, last downloaded Mar. 5, 2014.

(56) References Cited

OTHER PUBLICATIONS

Microsoft Project—Project Portfolio Management Features, http://office.microsoft.com/en-us/project/project-management-and-ppm-showcase-microsoft-project-FX103802304.aspx, last downloaded Mar. 5, 2014.
Download Microsoft Project for the masses from Official Microsoft Download Centre, "Microsoft Project for the masses", http://www.microsoft.com/en-in/download/details.aspx?id=25194, last downloaded Mar. 5, 2014.
Project Management Software—Quick Tour, "MinuteMan Systems", http://www.minuteman-systems.com/QuickTour.htm, last downloaded Mar. 5, 2014.
Oracle Primavera, Oracle Data Sheet, "Oracle's Primavera P6 Enterprise Project Portfolio Management", Copyright 2013.
OmniPlan, version 2.0.1 Manual, http://downloads2.omnigroup.com/software/MacOSX/Manuals/OmniPlan-2-Manual.pdf, last downloaded Mar. 5, 2014.
Wolfgang Wahlster et al., "Plan-based Integration of Natural Language and Graphics Generation", Jan. 1993, http://scidok.sulb.uni-saarland.de/volltexte/2013/5011/pdf/RR_93_02_.pdf, last downloaded Mar. 5, 2014.
Top Down and Bottom Up Planning Project Management Tool Set, "PM Tool with Top Down Planning Design and Bottom Up Processing Strategic Approach", http://2-plan.com/free-project-management-software-2-plan-desktop/top-down-and-bottom-up-planning-project-management-tool-set.html, last downloaded Mar. 5, 2014.
Project Management Shortcuts: Resource Leveling Made Easy—Liquid Planner, http://www.liquidplanner.com/blog/project-management-shortcuts-resource-leveling-made-easy/, last downloaded Mar. 5, 2014.
RationalPlan Project Management Software—MultiProject Version, http://www.rationalplan.com/multi-project-management-software.php, last downloaded Mar. 5, 2014.
Scheduling Projects Reference 1, http://www.openxprocess.com/help/reference/scheduler/overview.html, last downloaded Mar. 5, 2014.
Scheduling Projects Reference 2, http://www.openxprocess.com/help/reference/scheduler/specify_tasks.html, last downloaded Mar. 5, 2014.
Andy Carmichael, Ph.D.,CEng, FBCS, "Planning by Priority, How to prioritize project tasks to maximize delivered business benefits", Ivis Technologies, Issue 2.0, Scheduling Projects Reference 3, http://www.openxprocess.com/whitepapers/Planning%20By%20Priority%20_04_.pdf, last downloaded Mar. 5, 2014.
Asana Guide, The path to doing great things, "Sorting & Filtering", https://asana.com/guide/projects/sorting, last downloaded Mar. 5, 2014.
TaskInsight 3.0 Task Manager Updates Timeline Graphics and Functionality, http://prmac.com/release-id-29274.htm, last downloaded Mar. 5, 2014.
Anant Shree Agrawal, "Task Prioritization Rules for Project Execution", (IJERA) ISSN: 2248-9622, vol. 2, Issue 4, Jul.-Aug. 2012, pp. 1208-1212, http://www.ijera.com/papers/Vol2_issue4/GT2412081212.pdf, last downloaded Mar. 5, 2014.
Time Management Software—Get Things Done with Achieve Planner Task Management, http://www.effexis.com/achieve/planner.htm, last downloaded Mar. 5, 2014.
Use top-down planning to create summary tasks (or phases)—Project—Office.com, http://office.microsoft.com/en-in/project-help/use-top-down-planning-to-create-summary-tasks-or-phases-HA010376809.aspx, last downloaded Mar. 5, 2014.
VMware Horizon Mirage Web Manager Guide, v4.2, Jun. 2013, http://www.vmware.com/pdf/mirage-web-manager-guide-42.pdf, last downloaded Mar. 5, 2014.
What is Project Management—LeanKit, http://leankit.com/project-management/what-is-project-management/, last downloaded Mar. 5, 2014.
Workforce Scheduler, Employee Scheduling Software Saves Time and Money And Gets People Working, by Kronos www.kronos.com/Scheduling-Software/Employee-Scheduling-Software.aspx, last downloaded Mar. 5, 2014.
Niladri De et al., U.S. Appl. No. 14/200,057, filed Mar. 7, 2014.
Niladri De et al., U.S. Appl. No. 14/200,054, filed Mar. 7, 2014.
Niladri De et al., U.S. Appl. No. 14/269,300, filed May 5, 2014.
Niladri De et al., U.S. Appl. No. 14/273,646, filed May 9, 2014.
Niladri De et al., U.S. Appl. No. 14/300,725, filed Jun. 10, 2014.
Oracle, "Oracle RCUI Guidelines", Oracle ADF Rich Client User Interface Guidelines, Gantt Chart Usage Guideline, http://www.oracle.com/webfolder/ux/middleware/richclient/index.html?/webfolder/ux/middleware/richclient/guidelines5/gantt.html, last downloaded Jan. 15, 2015.
Opinion Center Li, "Microsoft Project", http://opioncenter.li/microsoft-project/, last downloaded Jan. 15, 2015.
Seavus Project Viewer, "User Manual for Seavus Project Viewer 11", http://www.seavusprojectviewer.com/support/documents/, last visited on Jan. 22, 2015, 118 pages.
Niladri De et al., U.S. Appl. No. 14/612,322, filed Feb. 3, 2015.
Ragnar Bade et al., "Connecting time-oriented data and informatin to a coherent interactive visualization", Proceedings of the 2004 Conference on Human Factors in Computing Systems, CHI '04, Jan. 1, 2004, pp. 105-112, XP055138586.

* cited by examiner

VISUAL TASK ASSIGNMENT SYSTEM

FIELD

One embodiment is directed to a computer system, and more particularly, to a computer system that displays data.

BACKGROUND

Project managers or planners typically work with a project plan timeline, which is a set of tasks that are associated with an overall project or objective, and that are displayed over a timeline within a user interface. Project managers typically define the project plan timeline, and thus, typically define how tasks are distributed within the project plan timeline.

Traditionally, a project planning system could allow a user to interact with the project plan timeline that is displayed within the user interface. More specifically, the project planning system could allow a user to assign tasks to resources, and can visually display the task-resource assignments. Further, the project planning system could allow the user to manage various other parameters of tasks. However, a typical limitation of the project planning system was that it was not possible for a user to interact with the displayed project plan timeline to assign a task to multiple resources, manage resource allocation percentages of each resource individually, and also add or subtract any one resource individually. In this scenario, it was possible that the project planning system could switch from a view of the project plan timeline to a task-specific detail view within the user interface, and allow a user to perform multiple resource assignments and related modifications within the task-specific detail view. However, the project planning system typically could not allow the user to achieve the same result from a view of the project plan timeline. Further, if a task was assigned to multiple resources, the project planning system could not typically visualize this information within the view of the project plan timeline displayed to the user within the interface. Instead, the user would usually be required to switch to the task-specific detail view within the user interface in order to determine whether the task was assigned to multiple resources.

Further, a project plan timeline typically includes a special type of task that is identified as a "milestone task," where a "milestone task" is a task that indicates a completion of a significant phase in an overall project. A project planning system typically displays a task within a user interface based on an effort associated with the task. However, a milestone task typically does not have an effort associated with the milestone task. This can make visually displaying a milestone task very difficult, as the milestone task would be displayed as a point, which is difficult to depict within a user interface and which would make it difficult for a user to interact with. Typically, a milestone task is displayed within a Gantt chart as a diamond. However, if a project planning system visually displays a milestone task as a diamond within a user interface, the project planning system will generally be unable to display any information within the diamond, unless a size of the diamond is very large. However, if the project planning system displays a milestone task as a very large diamond, it can be problematic for the project planning system to display other tasks or milestone tasks in the same vicinity, as the large diamond will take up a significant amount of space within the user interface. Even further, certain types of milestone tasks may have an associated non-zero duration, and may even have an associated non-zero effort, and these milestone tasks need to be displayed in a manner that distinguishes these milestone tasks from conventional tasks that have an associated duration and effort. Thus, project planning systems typically do not have a feasible way to display a milestone task within a user interface, where the display of the milestone task is both visible and unobtrusive, and where the display of the milestone task visually depicts whether, or how much of, a duration and/or effort is associated with the milestone task. Further, it is desirable that the project planning system has a consistent visual pattern of depiction or different types of milestone tasks, and the visual depiction should be easy to interact with (e.g., drag within the user interface, resize, etc.).

Even further, project managers typically work on projects where work comes in as a flow. Such work can include: food orders in a restaurant; electrical/plumbing maintenance service requests for a commercial building; stitching orders for a tailoring shop; or lathe machining jobs in a workshop. This work can come in as an irregular stream or flow, often in bursts. The actual flow is typically not accurately known beforehand even though good estimations might be available. Thus, it may become necessary to perform dynamic monitoring, dynamic resource allocation and dynamic planning in order to manage the incoming work. Important parameters which may need monitoring and management can include, for example: pending work for a current date or time period; incoming work for a current date or time period; work allocation to resources for a current date or time period; current progress of work (overall and resource-wise); productivity resource-wise; available resource bandwidth for current date or time period and future date or time periods; and estimated incoming work for future date or time periods. It may be difficult for a project manager to monitor all these parameters, identify actions that need to be taken in light of the monitored parameters, and respond to modifications to the monitored parameters, such as more incoming work, slower than expected productivity or progress, etc.

SUMMARY

One embodiment is a system that visualizes task assignments. The system displays a project plan timeline within a user interface. The system further displays a first resource indicator and a second resource indicator within the project plan timeline, where the first resource indicator visually represents a first resource, and where the second resource indicator visually represents a second resource. The system further displays a task indicator within the first resource indicator, where the task indicator visually represents a task assigned to the first resource. The system further defines a side-area region of the task indicator, where the defining the side-area region designates the task as a "multi-resource enabled task," where a "multi-resource enabled task" is a task that is capable of being assigned to multiple resources. The system further assigns the task to the second resource in response to a drag of the side-area region of the task indicator and a drop within the second resource indicator, where the task is assigned to both the first resource and the second resource. The system further displays a first task part indicator and a second task part indicator within the project plan timeline in place of the display of the task indicator, where the first task part indicator visually represents a first portion of the task that is assigned to the first resource and the second task part indicator visually represents a second portion of the task that is assigned to the second resource. The first task part indicator is displayed within the first resource indicator and the second task part indicator is displayed within the second resource indicator.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, a visual task assignment system that includes a graphical user interface (or "user interface") is provided. The visual task assignment system can display, or otherwise visually depict, tasks and resources of a project plan within a project plan timeline. The visual task assignment system can further allow a user to interact with the user interface and to assign a task to multiple resources. The visual task assignment system can further display a visual indication that the task has been assigned to multiple resources. The visual task assignment system can allow the user to further interact with the user interface and to un-assign a task from one assigned resource, some of the assigned resources, or all of the assigned resources. Further, in accordance with the embodiment, the visual task assignment system can modify a resource allocation percentage for a specific assigned resource. In accordance with yet another embodiment, the visual task assignment system can modify a start date-time and/or a finish date-time of any task, either assigned to one or more resources, or not assigned to any resource.

In one embodiment, the visual task assignment system can further display, or otherwise visual depict, milestone tasks. The visual task assignment can further allow the user to interact with the user interface and to assign a milestone task to multiple resources. The visual task assignment system can further display a visual indication that the milestone task has been assigned to multiple resources. The visual task assignment system can allow the user to further interact with the user interface and to un-assign a milestone task from one assigned resource, some of the assigned resources, or all of the assigned resources. In accordance with the embodiment, the visual task assignment system can further convert a milestone task from an original type of milestone task to a new type of milestone task, and can further convert the milestone task back to the original type of milestone task. The visual task assignment system can display, or otherwise visually depict, each distinct type of milestone task using a distinct visual format.

In one embodiment, the visual task assignment system can further display, or otherwise visually depict, a flow of incoming work for distinct work types within a user interface. The visual task assignment can further display, or otherwise visually depict, work parameters associated with the incoming work. The visual task assignment system can further allow a user to allocate the incoming work to various resources, and can further display indications of the various allocations. Thus, the visual task assignment system can allow a user to continuously manage the allocation of incoming work to the resources within the user interface.

Figure 1:
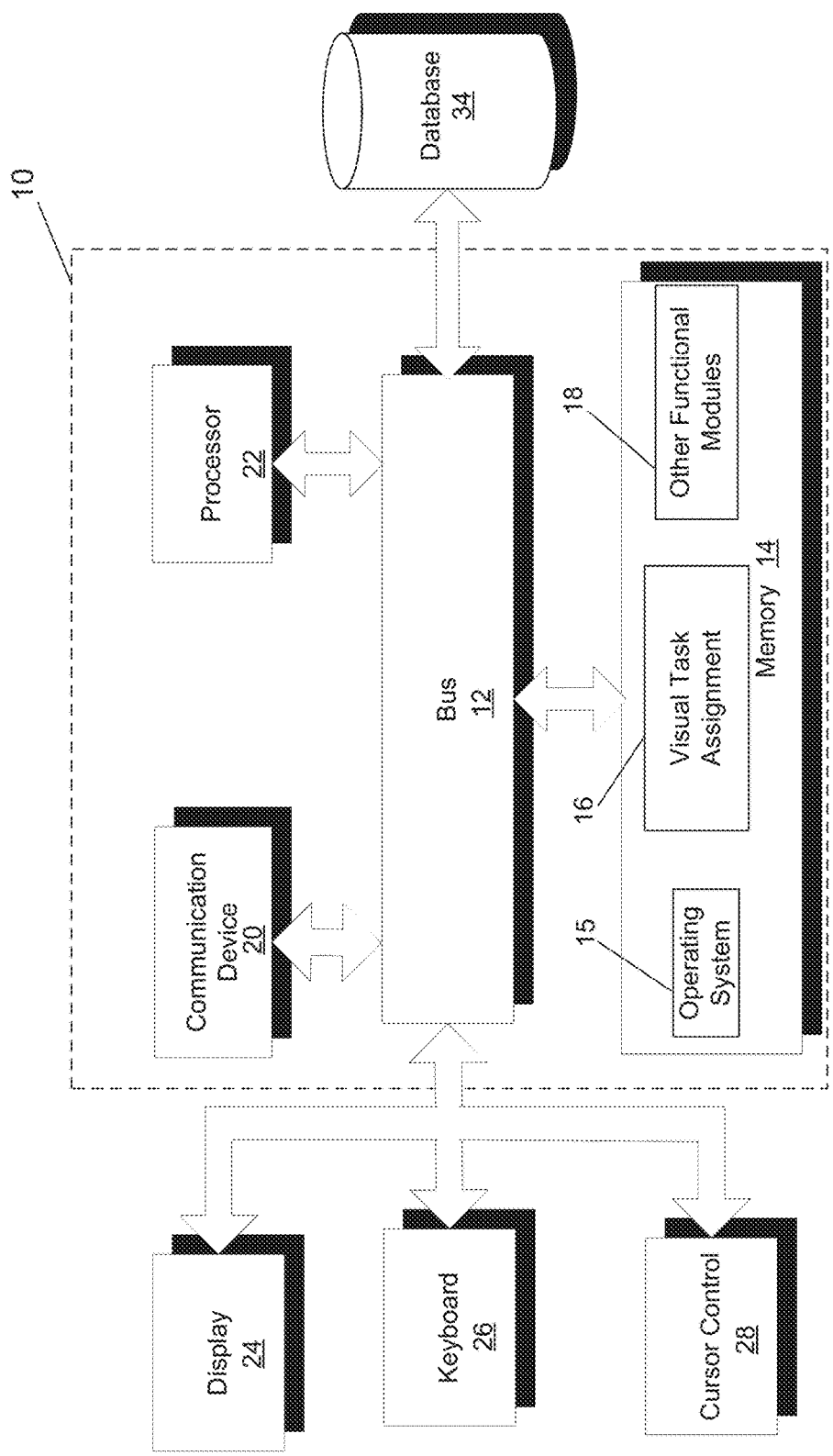
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a visual task assignment module 16, as well as other functional modules 18. Operating system 15 can provide an operating system functionality for system 10. Visual task assignment module 16 can provide functionality for visualizing task assignments, where tasks are assigned to resources, as further disclosed below. In certain embodiments, visual task assignment module 16 can comprise a plurality of modules, where each module provides specific individual functionality for visualizing task assignments within a user interface. System 10 can also be part of a larger system. Thus, system 10 can include one or more additional functional modules 18 to include the additional functionality. For example, functional modules 18 may include modules that provide additional functionality, such as functionality of a "Primavera Enterprise Project Portfolio Management" by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

In accordance with an embodiment, as previously described, a visual task assignment system can display, or otherwise visually depict, tasks and resources of a project plan within a project plan timeline, where the visual task assignment system can further display the project plan timeline within the user interface. In accordance with the embodiment, the visual task assignment system can visually represent a task displayed within the project plan timeline as a task indicator. The visual task assignment system can also visually represent a resource displayed within the project plan timeline as a resource indicator, where the resource indicator can also be identified as a "resource channel."

The visual task assignment system can further allow a user to interact with the user interface and to assign a task to a resource by dragging the corresponding task indicator into the corresponding resource indicator (i.e., resource channel). The visual task assignment system can further allow the user to assign a task to multiple resources by selecting a task indicator that corresponds to a task that is assigned to an original resource and by dragging the task indicator into a resource indicator that corresponds to a new resource, where the task indicator is replaced with a first task part indicator that is displayed within a resource indicator that corresponds to the original resource and a second task part indicator that is displayed within a resource indicator that corresponds to the new resource. The user can subsequently drag either the first task part indicator or the second task part indicator to other resource indicators that correspond to other new resources in order to assign the task to the other new resources. The visual task assignment system can further modify the display of the task part indicators in order to visually indicate that the corresponding task has been assigned to multiple resources.

The visual task assignment system can further allow the user to un-assign a task from an assigned resource, where the task has been previously assigned to multiple resources, by dragging a task part indicator that corresponds to the task, and that is positioned within a resource indicator that corresponds to the assigned resource, to another resource indicator that corresponds to another assigned resource. In order to un-assign the task from multiple assigned resources, the user can subsequently drag the task part indicator from other resource indicators that correspond to other assigned resources to another resource indicator that corresponds to another assigned resource. Further, in order to un-assign the task from all assigned resources, the user can drag the task part indicator to an unassigned resource indicator that visually represents an "unassigned resource" or a region where unassigned tasks are displayed.

Further, in accordance with the embodiment, the visual task assignment system can define a surface area of a task indicator or task part indicator that visually represents a task or a portion of the task based on an effort associated with the task or the portion of the task. For a task that is not assigned to a resource (i.e., "unassigned task"), an effort of a task can equal a duration of the task. Thus, for a task indicator that visually represents an unassigned task, a surface area of the task indicator can visually represent an effort of the task, and a height of the task indicator can visually represent a duration of the task. In an alternate embodiment, a width of the task indicator, rather than the height, can visually represent a duration of the task. For a task that is assigned to a resource (i.e., "assigned task"), the effort of the task can equal a product of a duration of the task and a resource allocation percentage of the task (i.e., a percentage of available time or capacity of the resource that is allocated to perform the task). Thus, for a task indicator that visually represents an assigned task (or a task part indicator that visually represents a portion of an assigned task), a surface area of the task indicator (or task part indicator) can visually represent an effort of the task (or portion of the task), a height of the task indicator (or task part indicator) can visually represent a duration of the task (or portion of the task), and a width of the task indicator (or task part indicator) can visually represent a resource allocation percentage of the task (or portion of the task). In an alternate embodiment, a width of the task indicator (or task part indicator) can visually represent a duration, and a height of the task indicator (or task part indicator) can visually present a resource allocation percentage. The visual task assignment system can further allow a user to interact with the user interface and to modify a resource allocation percentage of an assigned task (or portion of the assigned task) by dragging an edge of a task indicator (or task part indicator) that corresponds to the assigned task (or portion of the assigned task).

Figure 2:
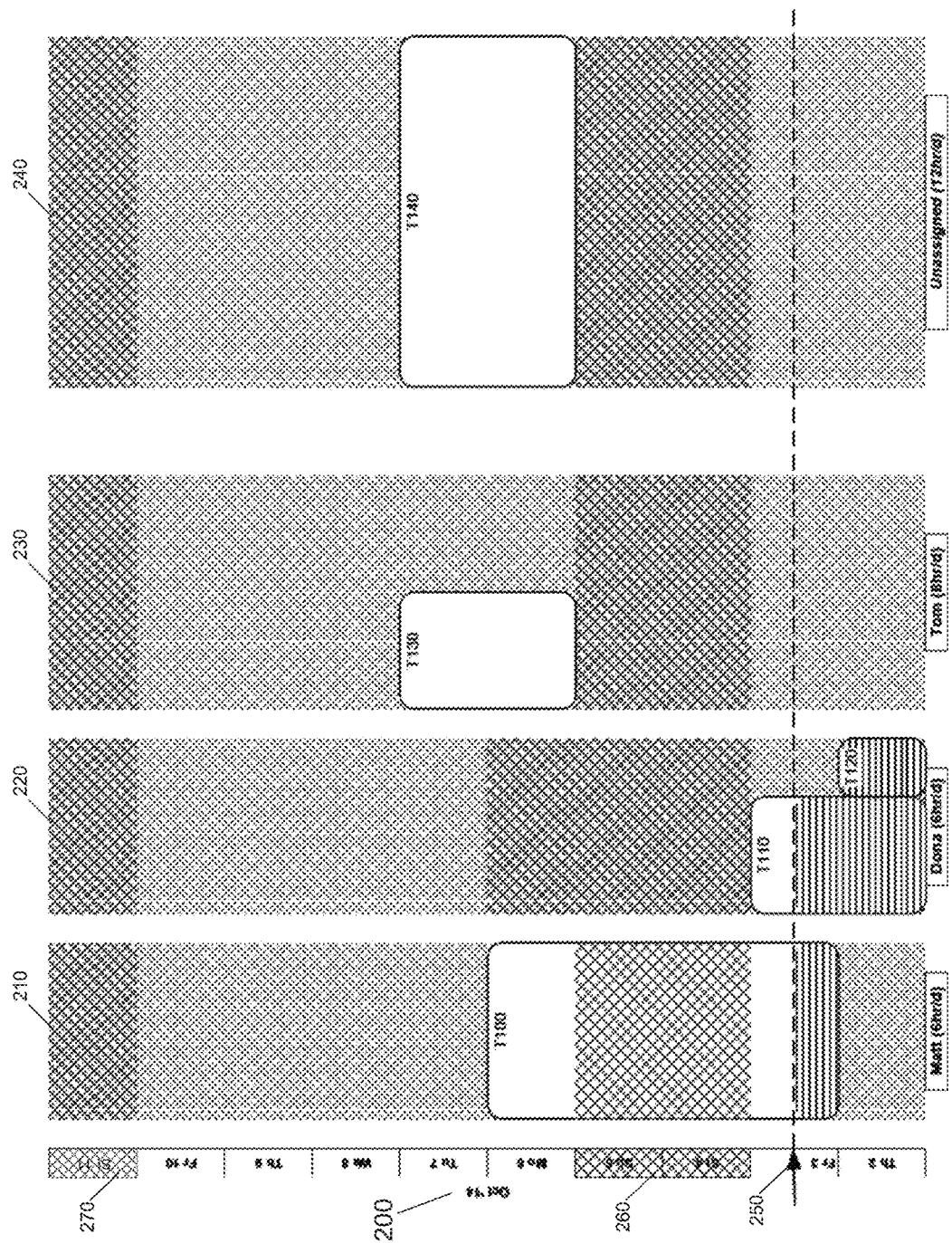
FIG. 2 illustrates a project plan timeline that is displayed by a visual task assignment system, where the project plan timeline includes resources and tasks, according to an embodiment of the invention.

FIG. 2 illustrates a project plan timeline 200 that is displayed by a visual task assignment system, where project plan timeline 200 includes resources and tasks, according to an embodiment of the invention. More specifically, project plan timeline 200 includes a timeline that includes one or more time units visually represented by one or more time unit indicators that are displayed within a user interface. Time units can be seconds, minutes, hours, days, weeks, months, years, etc. In the illustrated embodiment, the timeline is a vertical time axis, where the time unit indicators are displayed along a vertical axis, either from bottom to top, as illustrated in FIG. 2, or from top to bottom. In an alternate embodiment, the timeline can be a horizontal time axis, where the time unit indicators are displayed along a horizontal axis, either from left to right or right to left.

Project plan timeline 200 further includes tasks T100, T110, T120, T130, and T140. Tasks T100, T110, T120, T130, and T140 are displayed within project plan timeline 200, where project plan timeline 200 is displayed within a user interface. More specifically, task indicators (e.g., rectangles with rounded corners as illustrated in FIG. 2) are displayed within the user interface, where the task indicators represent tasks T100, T110, T120, T130, and T140.

Project plan timeline 200 further includes resources Matt, Dona, and Tom (i.e., resources 210, 220, and 230, respectively). Resources Matt, Dona, and Tom are also displayed within project plan timeline 200, where project plan timeline 200 is displayed within the user interface. More specifically, resource indicators (e.g., rectangular regions or "channels" as illustrated in FIG. 2) are displayed within the user interface, where the resource indicators (i.e., resource indicators 210, 220, and 230, respectively) represent resources Matt, Dona, and Tom. Further, an unassigned resource (i.e., unassigned resource 240) is also displayed within project plan time 200. More specifically, an unassigned resource indicator (e.g., a rectangular region or "channel" as illustrated in FIG. 2) is displayed within the user interface, where the unassigned resource indicator visually represents the unassigned resource (i.e., unassigned resource indicator 240). The unassigned resource is not an actual resource, but instead is a region where unassigned tasks (i.e., tasks that are not assigned to any resources) are displayed within the user interface. In an embodiment, when the visual task assignment system first displays a task, the visual task assignment system can display the task within the unassigned resource (i.e., unassigned resource 240) because the task is unassigned. As is further described below in greater detail, a user of the visual task assignment system can assign a task to a resource by "dragging," or otherwise moving, the task to a resource within the user interface.

A resource has a specified capacity, and a width of a resource indicator (i.e., resource channel) that is displayed within the user interface is based on the specified capacity of the resource. In the illustrated embodiment, resources Matt and Dona each have a capacity of 6 hours per day, and resource Tom has a capacity of 8 hours per day. Thus, within the user interface, a width of Tom's resource indicator (i.e., resource indicator 230) is larger than a width of Matt's resource indicator (i.e., resource indicator 210) and a width of Dona's resource indicator (i.e., resource indicator 220). Further, an unassigned resource can also have a specified capacity for display purposes, and a width of an unassigned resource channel that is displayed within the user interface can be based on user-specific settings and screen space availability within the user interface. In the illustrated embodiment, the unassigned resource (i.e., unassigned resource indicator 240) has a notional capacity of 12 hours per day. Thus, in the illustrated embodiment of FIG. 2, within the user interface, a width of the unassigned resource indicator (i.e., unassigned resource indicator 240) is larger than the width of Matt's resource indicator, Dona's resource indicator, and Tom's resource indicator (i.e., resource indicators 210, 220, and 230), respectively.

According to the illustrated embodiment, task T100 is assigned to resource Matt. Thus, within project plan timeline 200, task T100 is displayed within Matt's resource indicator (i.e., resource indicator 210). Further, tasks T110 and T120 are assigned to resource Dona. Thus, within project plan timeline 200, tasks T110 and T120 are displayed within Dona's resource indicator (i.e., resource indicator 220). Task T130 is assigned to resource Tom. Thus, within project plan timeline 200, task T130 is displayed within Tom's resource indicator (i.e., resource indicator 230). Further, task T140 is unassigned (i.e., not assigned to any resource). Thus, within project plan timeline 200, task T140 is displayed within an unassigned resource indicator (i.e., unassigned resource indicator 240).

Project plan timeline 200 further includes current date-time indicator 250 which indicates a current date and/or time (i.e., "date-time"). Further, in the illustrated embodiment, the visual task assignment system displays completed portions of tasks T100, T110, and T120 as dashed regions within project plan timeline 200. Further, the visual task assignment system displays non-working regions 260 and 270 which represent date-times where resources do not perform any work.

Figure 3:
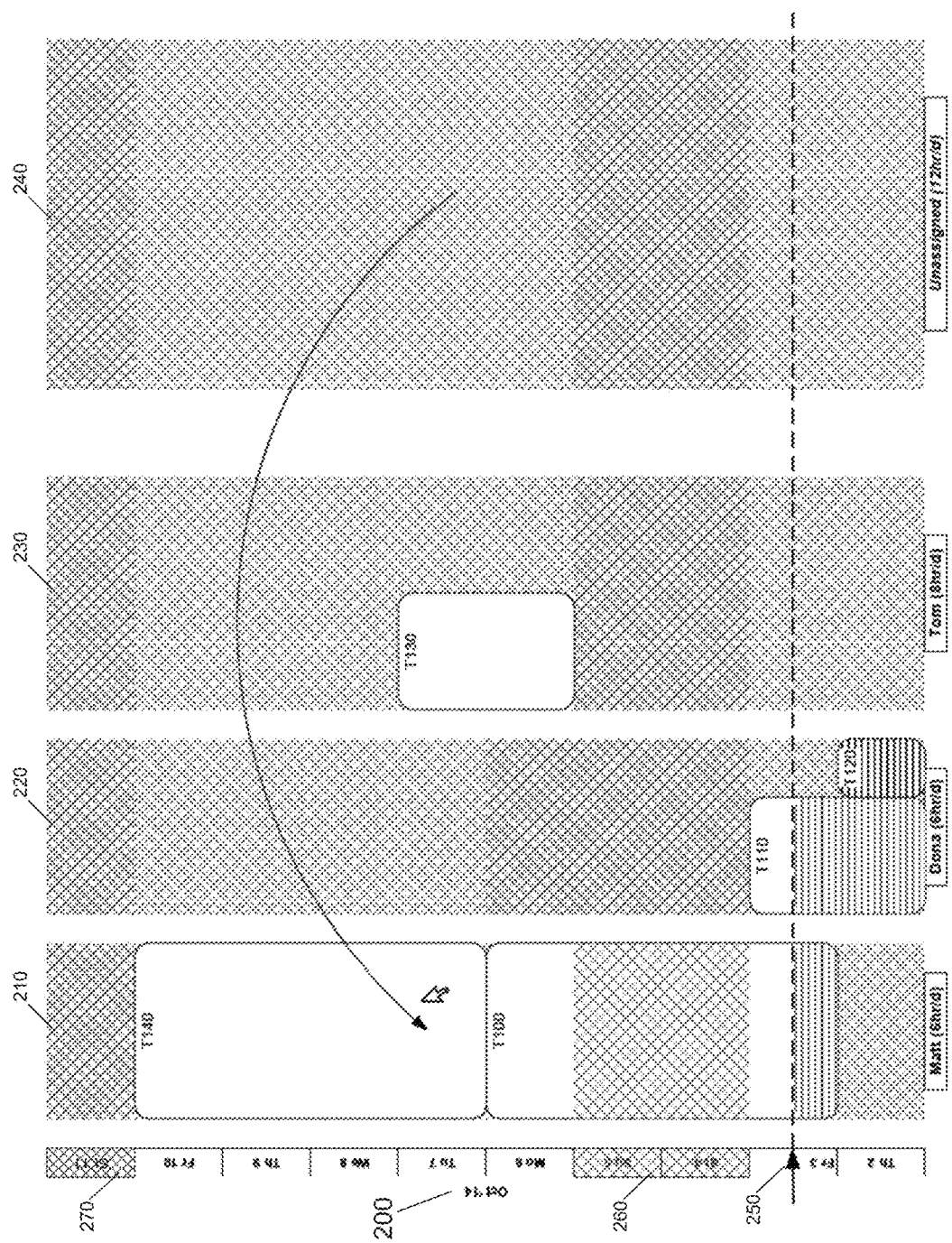
FIG. 3 illustrates a project plan timeline that is displayed by a visual task assignment system, where a task is assigned to a resource according to an embodiment of the invention.

FIG. 3 illustrates project plan timeline 200 that is displayed by a visual task assignment system, where task T140 is assigned to resource Matt according to an embodiment of the invention. According to the embodiment, a user interacts with project plan timeline 200 using a cursor control device, such as a computer mouse, and "drags," or otherwise moves, task T140 from an unassigned resource indicator (i.e., unassigned resource indicator 240) to Matt's resource indicator (i.e., resource indicator 210) (where the user interaction is illustrated in FIG. 3 as an arrow). In response to the user interaction, the visual task assignment system assigns task T140 to resource Matt, and further displays task T140 within Matt's resource indicator (i.e., resource indicator 210), rather than within the unassigned resource indicator (i.e., unassigned resource indicator 240).

As illustrated in FIG. 3, the visual task assignment system automatically modifies the display of task T140 to fit within a capacity of Matt's resource indicator (resource indicator 210). More specifically, a height of task T140 is automatically increased, and a width of task T140 is automatically decreased. However, a surface area of task T140 is maintained. As previously described, a surface area of task T140 can be defined based on an effort of task T140, where the effort of task T140 can equal a product of a duration of task T140 and a resource allocation percentage of task T140.

Figure 4:
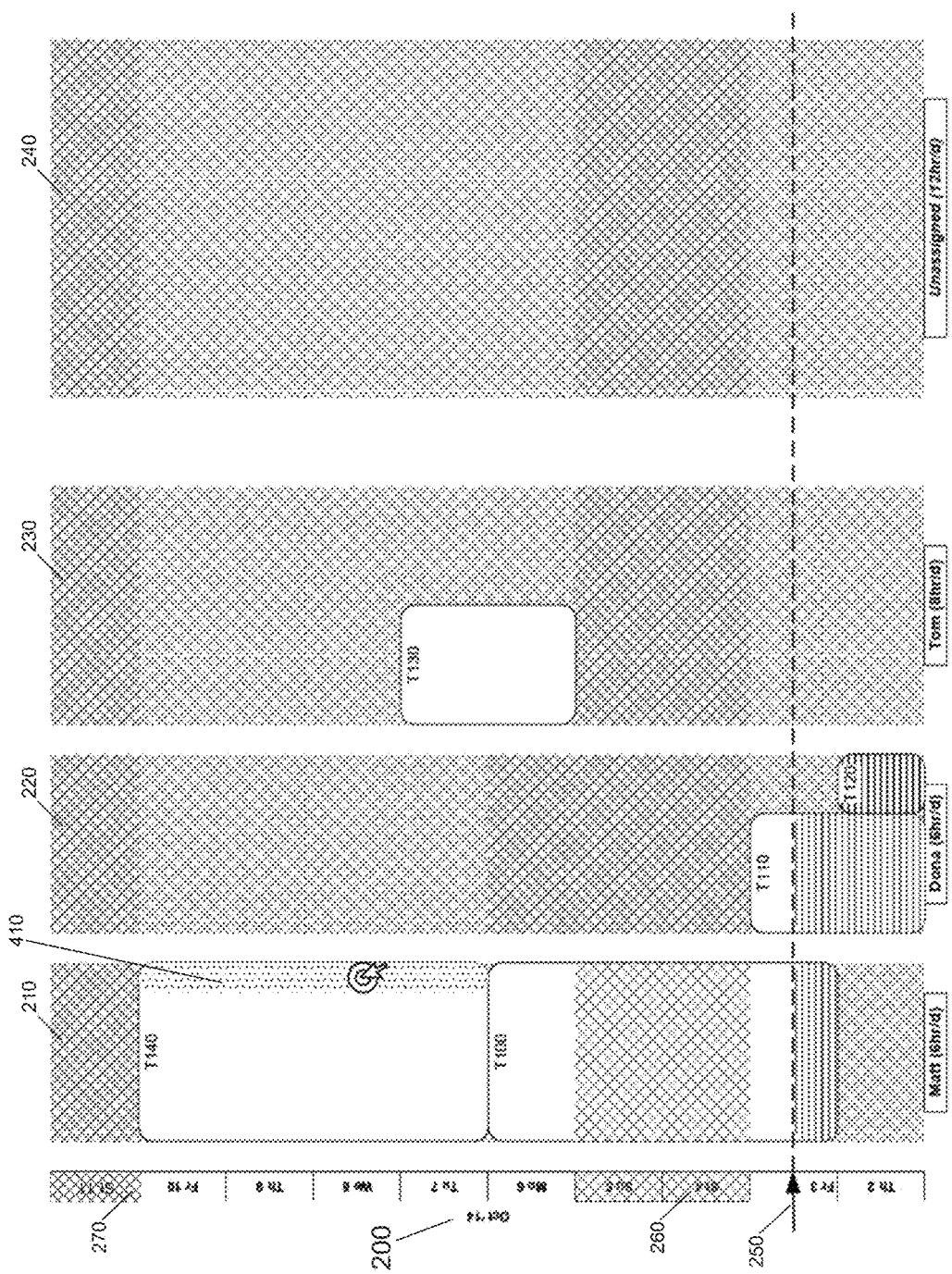
FIG. 4 illustrates a project plan timeline that is displayed by a visual task assignment system, where a task is designated as a multi-resource enabled task, according to an embodiment of the invention.

FIG. 4 illustrates project plan timeline 200 that is displayed by a visual task assignment system, where task T140 is designated as a multi-resource enabled task, according to an embodiment of the invention. According to the embodiment, a user interacts with project plan timeline 200 using a cursor control device, such as a computer mouse, and "double-clicks," or otherwise interacts with, a side region of task T140 (where the user interaction is illustrated in FIG. 4 as a bullseye target). In response to the user interaction, the visual task assignment system designates task T140 as a multi-resource enabled task, where task T140 is capable of being assigned to multiple resources. In further response to the user interaction, the visual task assignment system further displays a side-area region 410 within task T140. In the illustrated embodiment of FIG. 4, side-area region 410 is a shaded region. Further, in the illustrated embodiment, the user interacts with a right side region of task T140, and side-area region 410 is displayed within a right side region of task T140. However, in an alternate embodiment, the user can interact with a left side of region of task 140, and side-area region 410 can be displayed within a left side region of task 140. As described below in greater detail, side-area region 410 is a drag-handle for multiple resource assignment (i.e., assigning task T140 to multiple resources). In one embodiment, if the user performs a user interaction other than a user interaction that assigns task T140 to multiple resources, such as the user interaction described below in greater detail in conjunction with FIG. 5, the visual task assignment system can cancel the designation of task T140 as a multi-resource enabled task, and can remove the display of side-area region 410 from the right side region of task T140.

Figure 5:
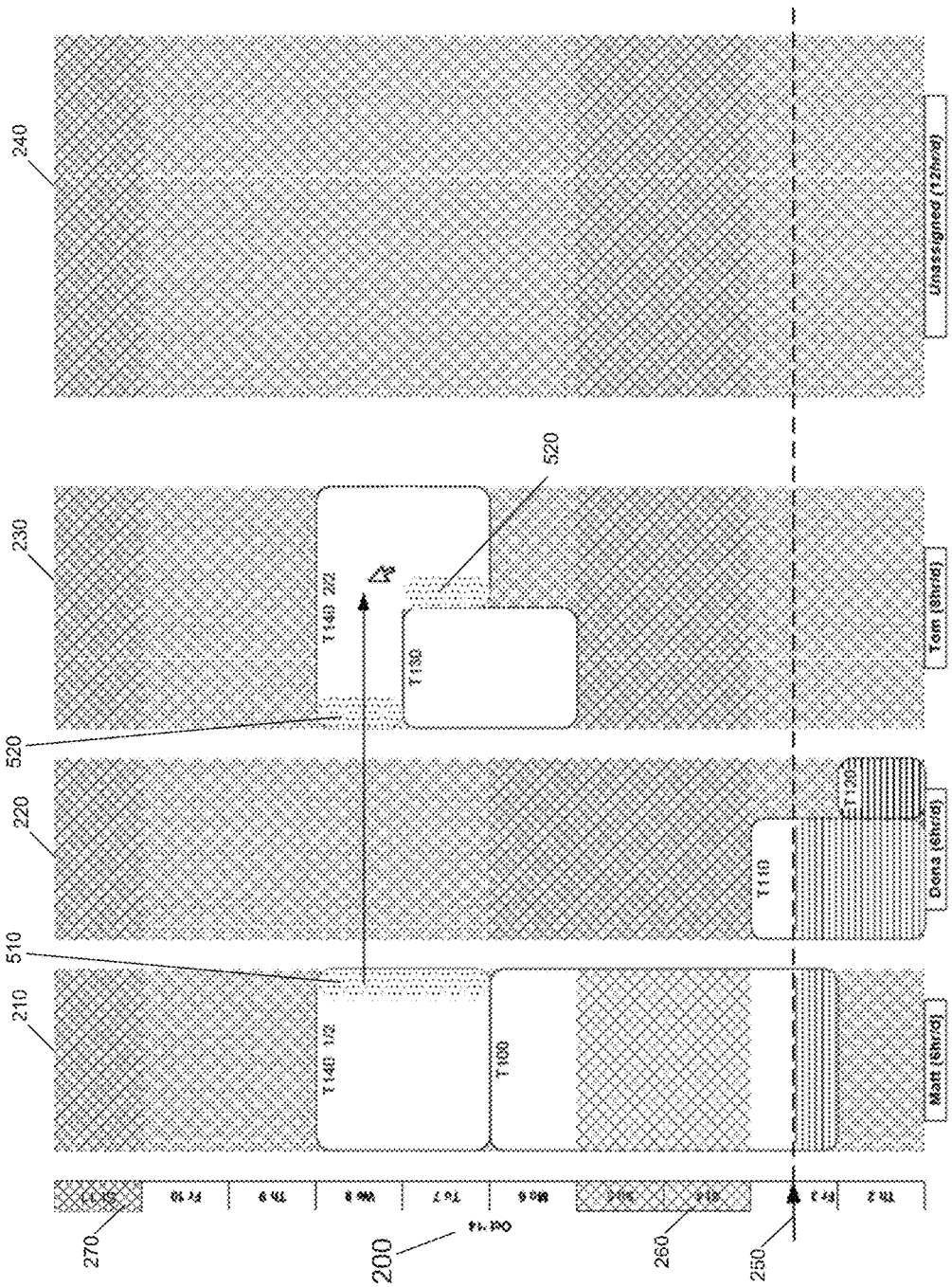
FIG. 5 illustrates a project plan timeline that is displayed by a visual task assignment system, where a task that is already assigned to a first resource is additionally assigned to a second resource, according to an embodiment of the invention.

FIG. 5 illustrates project plan timeline 200 that is displayed by a visual task assignment system, where task T140 (already assigned to resource Matt) is additionally assigned to resource Tom, according to an embodiment of the invention. According to the embodiment, a user interacts with project plan timeline 200 using a cursor control device, such as a computer mouse, and "drags," or otherwise moves, side-area region 410 of task T140 of FIG. 4 from Matt's resource indicator (i.e., resource indicator 210) to Tom's resource indicator (i.e., resource indicator 230) (where the user interaction is illustrated in FIG. 5 as an arrow). In response to the user interaction, and because task T140 is designated as a multi-resource enabled task, the visual task assignment system assigns task T140 to resource Tom, so that task T140 is assigned to resources Matt and Tom. Although the user "drags," or otherwise moves, side-area region 410 of task T140 over Dona's resource indicator (i.e., resource indicator 220), the visual task assignment system does not assign task T140 to resource Dona because the user does not "drop," or otherwise position, side-area region 410 of task T140 within Dona's resource indicator (i.e., resource indicator 220).

In further response to the user interaction, the visual task assignment system further displays task T140 as two task parts: task part T140 1/2 and task part T140 2/2, where task part T140 1/2 is assigned to resource Matt and task part T140 2/2 is assigned to resource Tom. More specifically, two task part indicators (e.g., rectangles with rounded corners as illustrated in FIG. 5) are displayed within the user interface, where the two task part indicators collectively represent task T140 (i.e., going from left to right, the first task part indicator visually represents task part T140 1/2 and the second task part indicator visually represents task part T140 2/2). According to the embodiment, the visual task assignment system divides an effort associated with task T140 between task part T140 1/2 and task part T140 2/2. Based on this division of effort, the visual task assignment system defines a duration for task parts T140 1/2 and T140 2/2 that is reduced as compared to a duration that was defined for task T140 of FIG. 4. Thus, as illustrated in FIG. 5, heights (and corresponding surface areas) of task parts T140 1/2 and T140 2/2 are each reduced as compared to a height (and corresponding surface area) of task T140 of FIG. 4. Further, although task part T140 2/2 and task T130 partially overlap with respect to project plan timeline 200, task part T140 2/2 and task T130 are displayed within project plan timeline 200 so that they do not visually overlap.

Further, the visual task assignment system displays a side-area region 510 within task part T140 1/2 and a side-area region 520 within task part T140 2/2. In the illustrated embodiment of FIG. 5, side-area regions 510 and 520 are shaded regions. Further, in the illustrated embodiment, side-area region 510 is displayed within a right side region of task part T140 1/2 and side-area region 520 is displayed within a left side region of task part T140 2/2. As previously described, side-area regions 510 and 520 are drag-handles for multiple resource assignment (i.e., assigning task T140 to multiple resources). Further, side-area regions 510 and 520 are also visual indicators that there are multiple task parts associated with a task. According to an embodiment, a side-area region can be displayed on a side of a task part that corresponds to a side of the user interface where other task parts are positioned. As illustrated in FIG. 5, side-area region 510 is displayed within a right side region of task part T140 1/2 because task part T140 2/2 is positioned to the right of task part T140 1/2 within project plan timeline 200. Further, side-area region 520 is displayed within a left side region of task part T140 2/2 because task part T140 1/2 is positioned to the left of task part T140 2/2 within project plan timeline 200. This can be beneficial where only a portion of the total task parts are displayed within a visible view of the user interface, and where a user is required to scroll the visible view of the user interface in order to view other task parts within the user interface, as the user is able to determine that a task is represented by multiple task parts even if all of the task parts are not immediately visible within the user interface.

Figure 6:
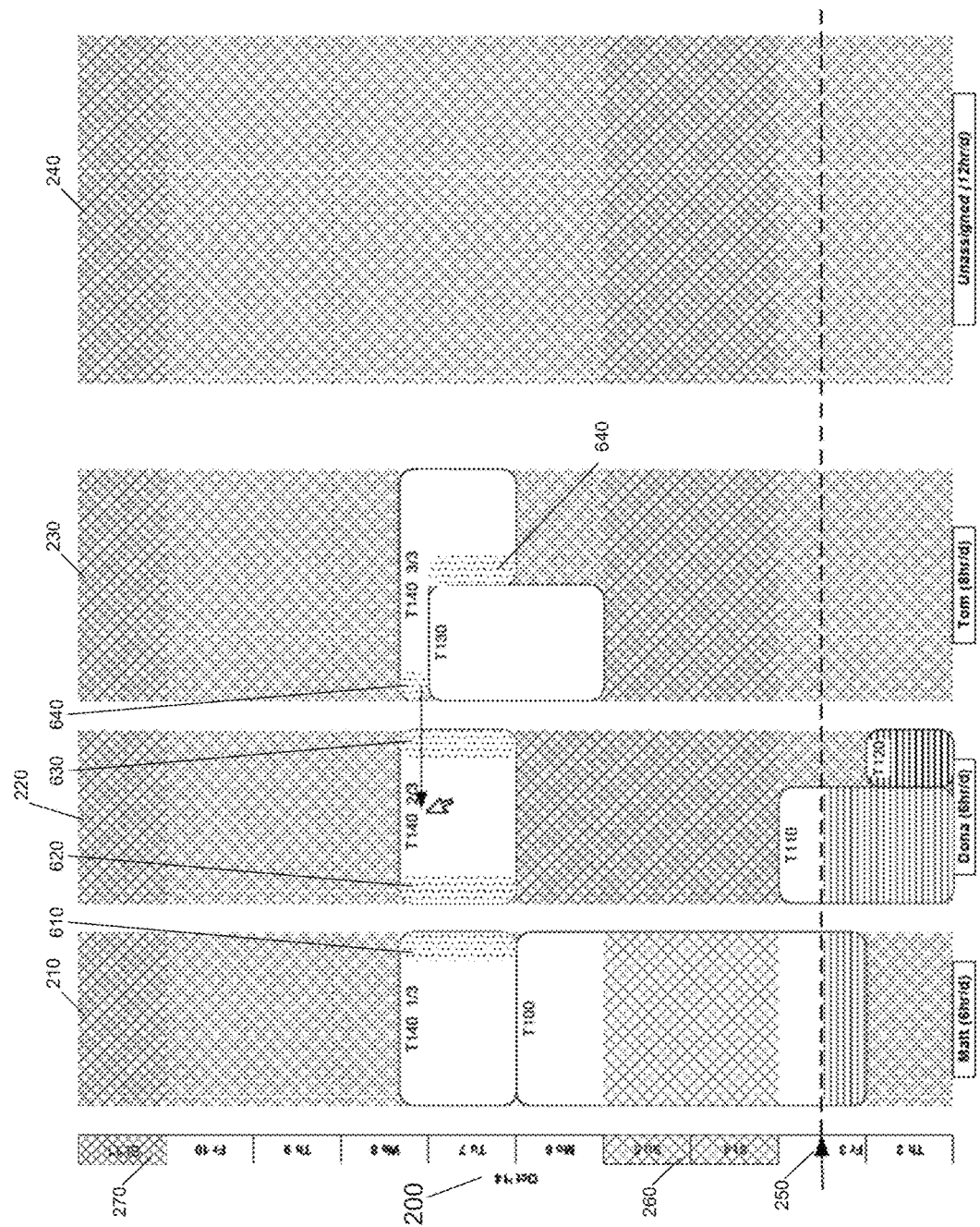
FIG. 6 illustrates a project plan timeline that is displayed by a visual task assignment system, where a task that is already assigned to a first resource and a second resource is additionally assigned to a third resource, according to an embodiment of the invention.

FIG. 6 illustrates project plan timeline 200 that is displayed by a visual task assignment system, where task T140 (already assigned to resources Matt and Tom) is additionally assigned to resource Dona, according to an embodiment of the invention. According to the embodiment, a user interacts with project plan timeline 200 using a cursor control device, such as a computer mouse, and "drags," or otherwise moves, side-area region 520 of task T140 2/2 of FIG. 5 from Tom's resource indicator (i.e., resource indicator 230) to Dona's resource indicator (i.e., resource indicator 220) (where the user interaction is illustrated in FIG. 6 as an arrow). In response to the user interaction, and because task T140 is designated as a multi-resource enabled task, the visual task assignment system assigns task T140 to resource Dona, so that task T140 is assigned to resources Matt, Tom, and Dona.

In further response to the user interaction, the visual task assignment system further displays task T140 as three task parts: task part T140 1/3, task part T140 2/3, and task part T140 3/3, where task part T140 1/3 is assigned to resource Matt, task part T140 2/3 is assigned to resource Dona, and task part T140 3/3 is assigned to resource Tom. More specifically, three task part indicators (e.g., rectangles with rounded corners as illustrated in FIG. 6) are displayed within the user interface, where the three task part indicators collectively represent task T140 (i.e., going from left to right, the first task part indicator visually represents task part T140 1/3, the second task part indicator visually represents task part T140 2/3, and the third task part indicator visually represents task part T140 3/3). According to the embodiment, the visual task assignment system divides an effort associated with task T140 between task part T140 1/3, task part T140 2/3, and task part T140 3/3. Based on this division of effort, the visual task assignment system defines a duration for task parts T140 1/3, T140 2/3, and T140 3/3 that is reduced as compared to a duration that was defined for task parts T140 1/2 and T140 2/2 of FIG. 5. Thus, as illustrated in FIG. 6, heights (and corresponding surface areas) of task parts T140 1/3, T 140 2/3, and T140 3/3 are each reduced as compared to a height (and corresponding surface area) of task parts T140 1/2 and T140 2/2 of FIG. 5. Further, although task part T140 3/3 and task T130 partially overlap, task part T140 3/3 and task T130 are displayed within project plan timeline 200 so that they do not visually overlap.

Further, the visual task assignment system displays a side-area region 610 within task part T140 1/3, side-area regions 620 and 630 within task part T140 2/3, and a side-area region 640 within task part T140 3/3. In the illustrated embodiment of FIG. 6, side-area regions 610, 620, 630, and 640 are shaded regions. Further, in the illustrated embodiment, side-area region 610 is displayed within a right side region of task part T140 1/3, side-area region 620 is displayed within a left side region of task part T140 2/3, side-area region 630 is displayed within a right side region of task part T140 2/3, and side-area region 640 is displayed within a left side region of task part T140 3/3. As previously described, side-area regions 610, 620, 630, and 640 are drag-handles for multiple resource assignment (i.e., assigning task T140 to multiple resources). Further, side-area regions 610, 620, 630, and 640 are also visual indicators that there are multiple task parts associated with a task. According to an embodiment, a side-area region can be displayed on a side of a task part that corresponds to a side of the user interface where other task parts are positioned. As illustrated in FIG. 6, side-area region 610 is displayed within a right side region of task part T140 1/3 because task parts T140 2/3 and T140 3/3 are positioned to the right of task part T140 1/3 within project plan timeline 200. Further, side-area region 620 is displayed within a left side region of task part T140 2/3 because task part T140 1/3 is positioned to the left of task part T140 2/3 within project plan timeline 200, and side-area region 630 is displayed within a right side region of task part T 140 2/3 because task part T140 3/3 is positioned to the right of task part T140 2/3 within project plan timeline 200. Even further, side-area region 640 is displayed within a left side region of task part T140 3/3 because task parts T140 1/3 and T140 2/3 are positioned to the left of task part T140 3/3 within project plan timeline 200.

Figure 7:
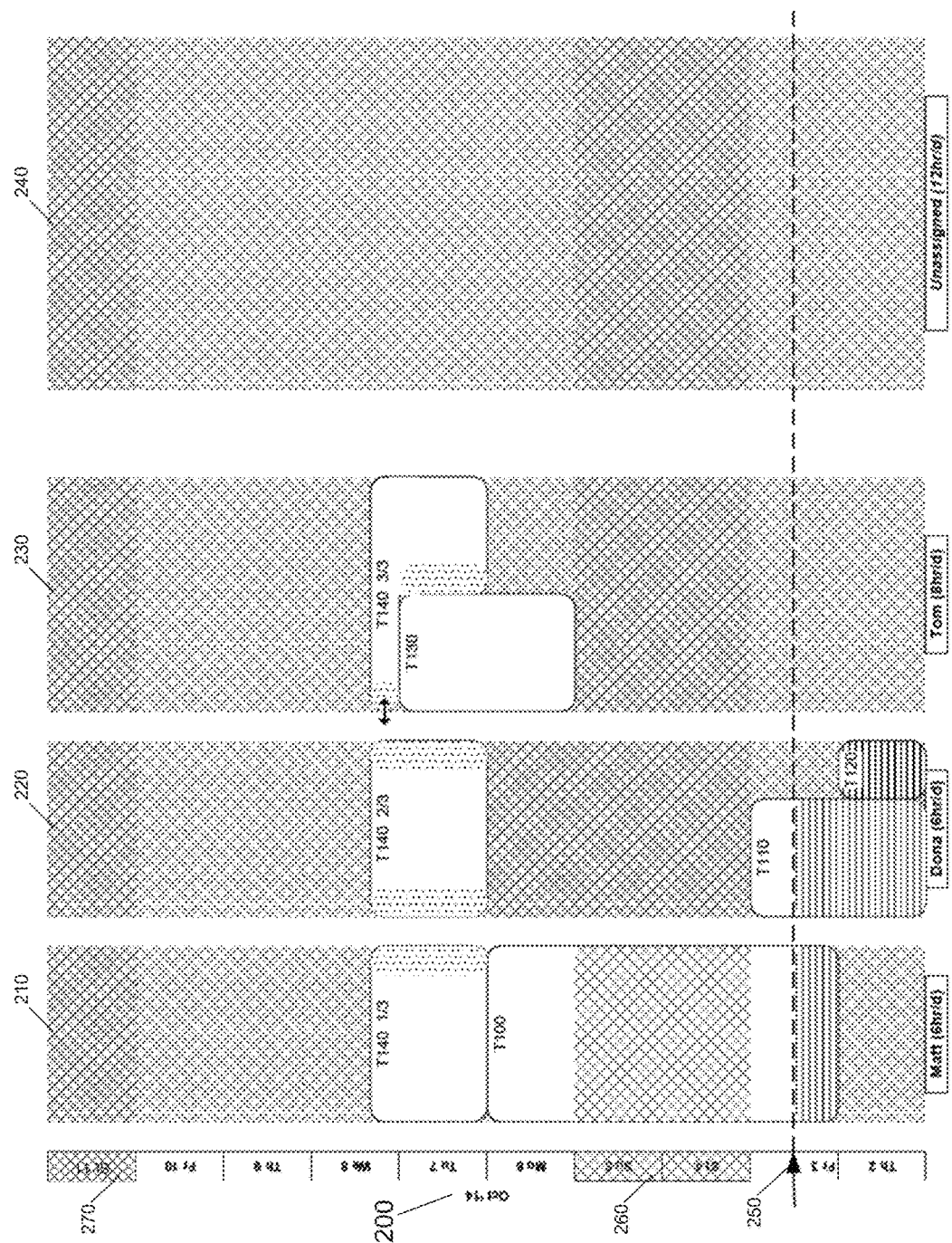
FIG. 7 illustrates a project plan timeline that is displayed by a visual task assignment system, where a modification to a resource allocation percentage for a specific resource of a task that is assigned to three resources is indicated, according to an embodiment of the invention.

FIG. 7 illustrates project plan timeline 200 that is displayed by a visual task assignment system, where a modification to a resource allocation percentage of task part T140 3/3, according to an embodiment of the invention. According to the embodiment, a user interacts with project plan timeline 200 using a cursor control device, such as a computer mouse, and initiates a "drag," or other movement, of a left side edge of task part T140 3/3 towards the right (where the user interaction is illustrated in FIG. 7 as a double-edged arrow). The user interaction indicates to the visual task assignment system that the resource allocation percentage of task part T140 3/3 is to be modified.

Figure 8:
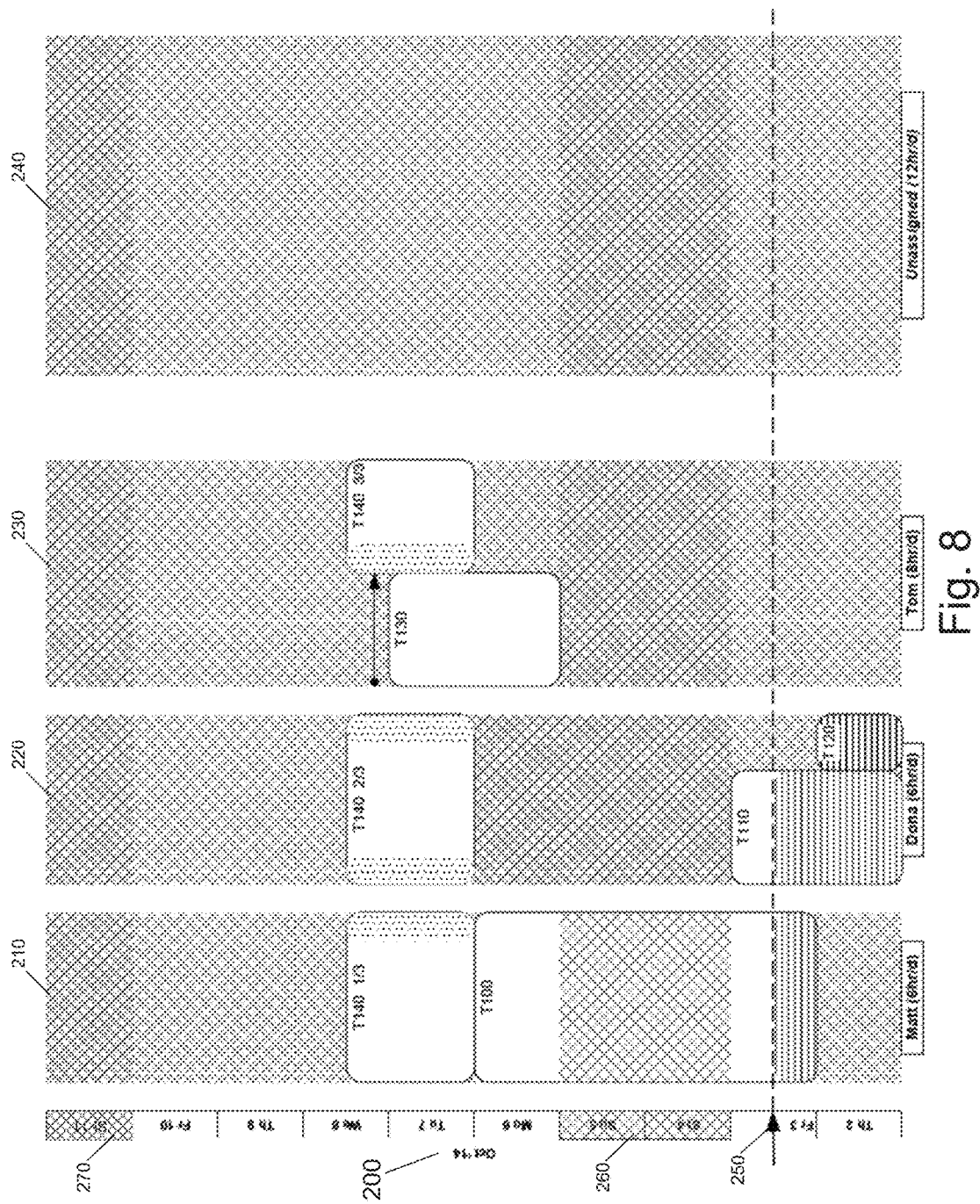
FIG. 8 illustrates a project plan timeline that is displayed by a visual task assignment system, where a resource allocation percentage of a task is modified, according to an embodiment of the invention.

FIG. 8 illustrates project plan timeline 200 that is displayed by a visual task assignment system, where a resource allocation percentage of task part T140 3/3 is modified, according to an embodiment of the invention. According to the embodiment, a user interacts with project plan timeline 200 using a cursor control device, such as a computer mouse, and "drags," or otherwise moves, a left side edge of task part T140 3/3 towards the right (where the user interaction is illustrated in FIG. 8 as an arrow). In response to the user interaction, the visual task assignment system modifies a resource allocation percentage of task part T140 3/3 from 100% to 50%. Further, in response to modifying the resource allocation percentage of task part T140 3/3 from 100% to 50%, the visual task assignment system reduces a width of task part T140 3/3. The visual task assignment system further increases a duration of task parts T140 1/3, T140 2/3, and T140 3/3, and, thus correspondingly increases a height of task parts T140 1/3, T140 2/3, and T140 3/3 within the user interface.

Figure 9:
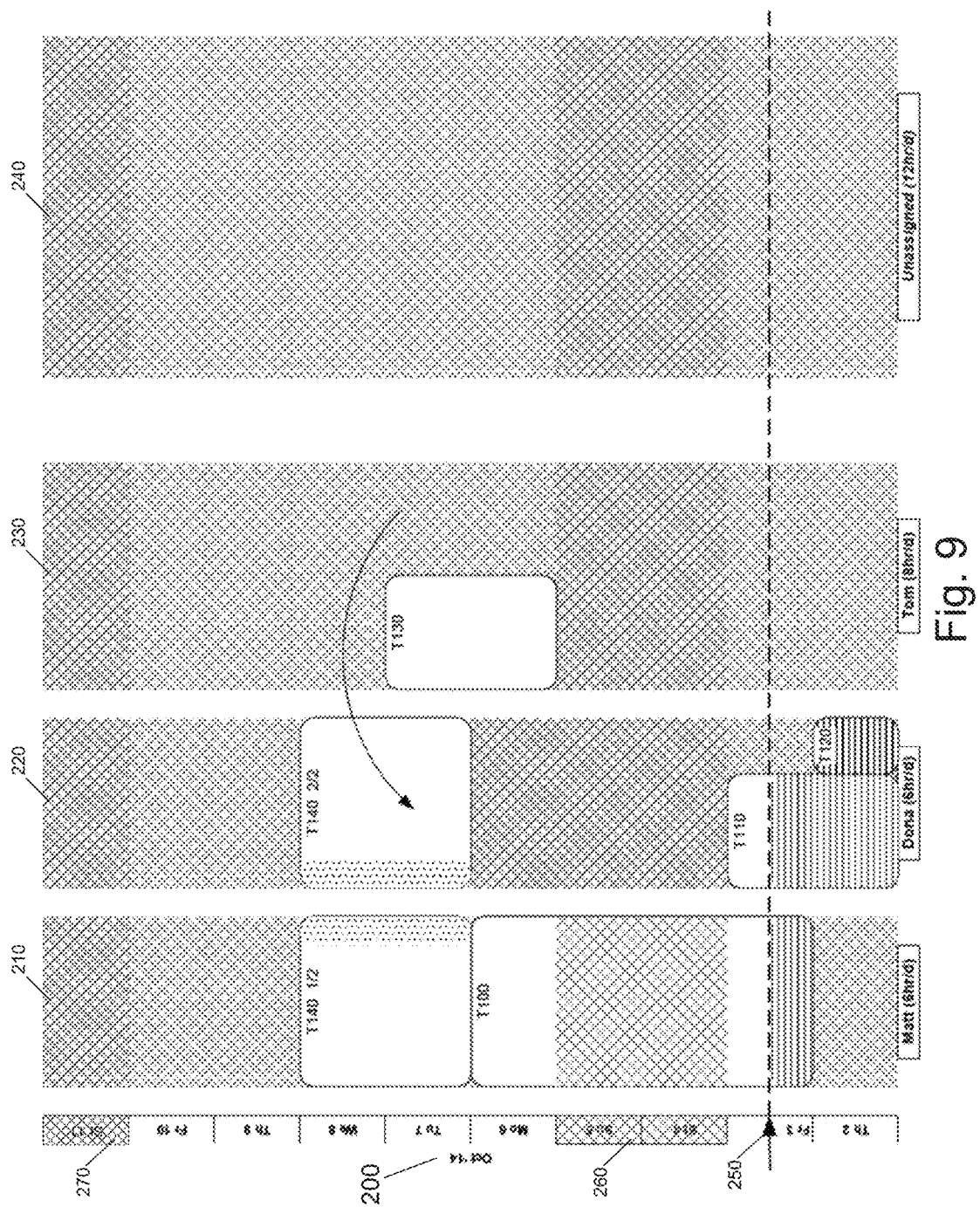
FIG. 9 illustrates a project plan timeline that is displayed by a visual task assignment system, where a task that is assigned to three resources is un-assigned from a specific assigned resource, according to an embodiment of the invention.

FIG. 9 illustrates project plan timeline 200 that is displayed by a visual task assignment system, where task T140 is un-assigned from resource Tom, according to an embodiment of the invention. According to the embodiment, a user interacts with project plan timeline 200 using a cursor control device, such as a computer mouse, and "drags," or otherwise moves, task part T140 3/3 of FIG. 8 from Tom's resource indicator (i.e., resource indicator 230) to Dona's resource indicator (i.e., resource indicator 220) (where the user interaction is illustrated in FIG. 9 as an arrow). In response to the user interaction, the visual task assignment system un-assigns task T140 from resource Tom. In further response to the user interaction, the visual task assignment system further displays task T140 as two task parts: task part T140 1/2 and task part T140 2/2, where task part T140 1/2 is assigned to resource Matt and task part T140 2/2 is assigned to resource Dona. More specifically, two task part indicators (e.g., rectangles with rounded corners as illustrated in FIG. 9) are displayed within the user interface, where the two task part indicators collectively represent task T140 (i.e., going from left to right, the first task part indicator visually represents task part T140 1/2 and the second task part indicator visually represents task part T140 2/2). This replaces the previous display of three task part indicators (i.e., task parts T140 1/1, T140 1/2, and T140 3/3) as illustrated in FIG. 8. According to the embodiment, the visual task assignment system compensates for the lost effort associated with task part T140 3/3 by increasing an effort associated with task parts T140 1/2 and T140 2/2. Based on this compensation, the visual task assignment system defines a duration for task parts T140 1/2 and T140 2/2 that is increased as compared to a duration that was defined for task parts T140 1/3 and T140 2/3. Thus, as illustrated in FIG. 9, heights (and corresponding surface areas) of task parts T140 1/2 and T140 2/2 are each increased as compared to heights (and corresponding surface areas) of task parts T140 1/3 and T140 2/3 of FIG. 8.

Figure 10:
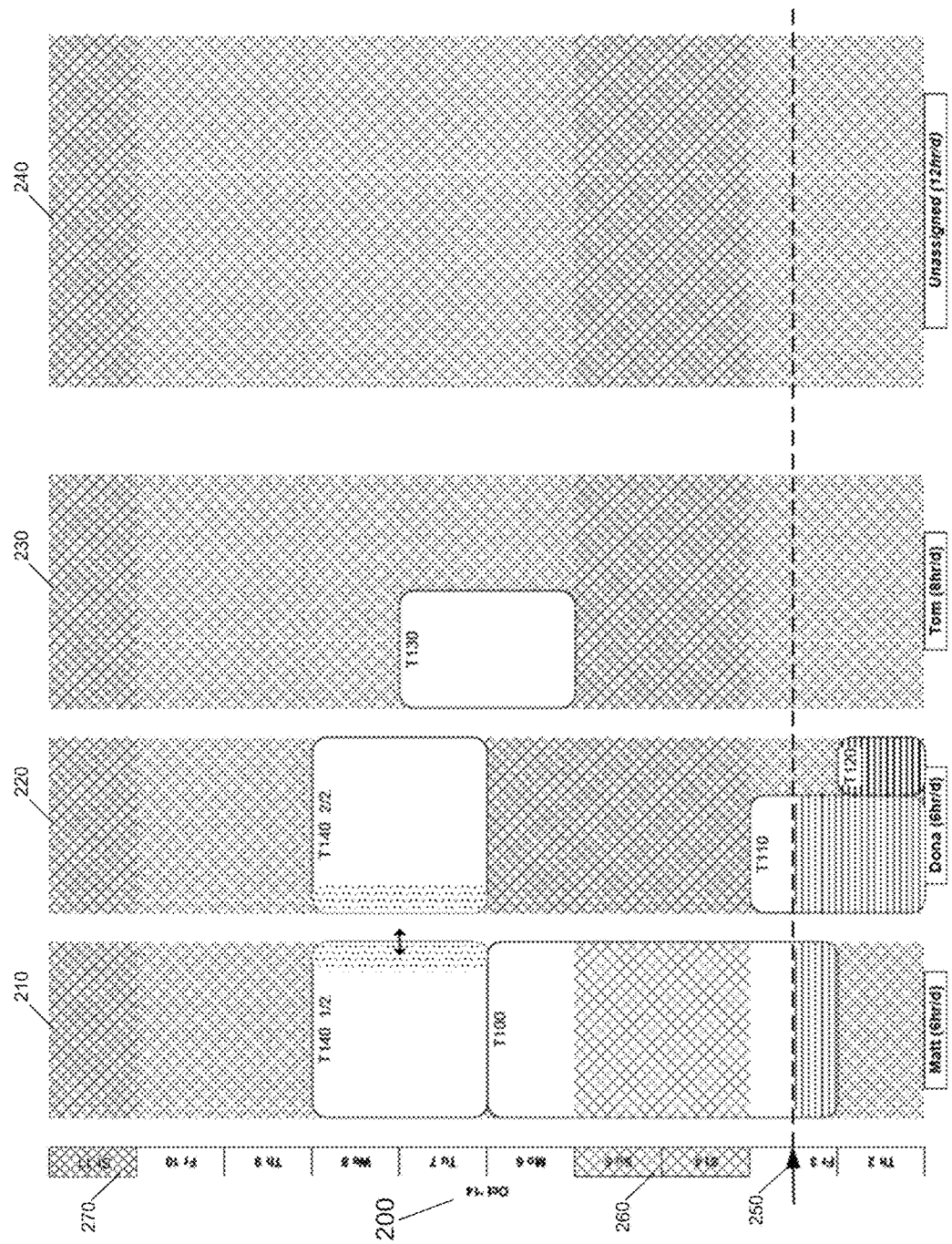
FIG. 10 illustrates a project plan timeline that is displayed by a visual task assignment system, where a modification in a specific resource's resource allocation percentage to a task that is assigned to multiple resources is indicated, according to another embodiment of the invention.

FIG. 10 illustrates a project plan timeline 200 that is displayed by a visual task assignment system, where a modification of a resource allocation percentage of task part T140 1/2 is indicated, according to another embodiment of the invention. According to the embodiment, a user interacts with project plan timeline 200 using a cursor control device, such as a computer mouse, and initiates a "drag," or other movement, of a right side edge of task part T140 1/2 towards the left (where the user interaction is illustrated in FIG. 10 as a double-edged arrow). The user interaction indicates to the visual task assignment system that the resource allocation percentage of task part T140 1/2 is to be modified.

Figure 11:
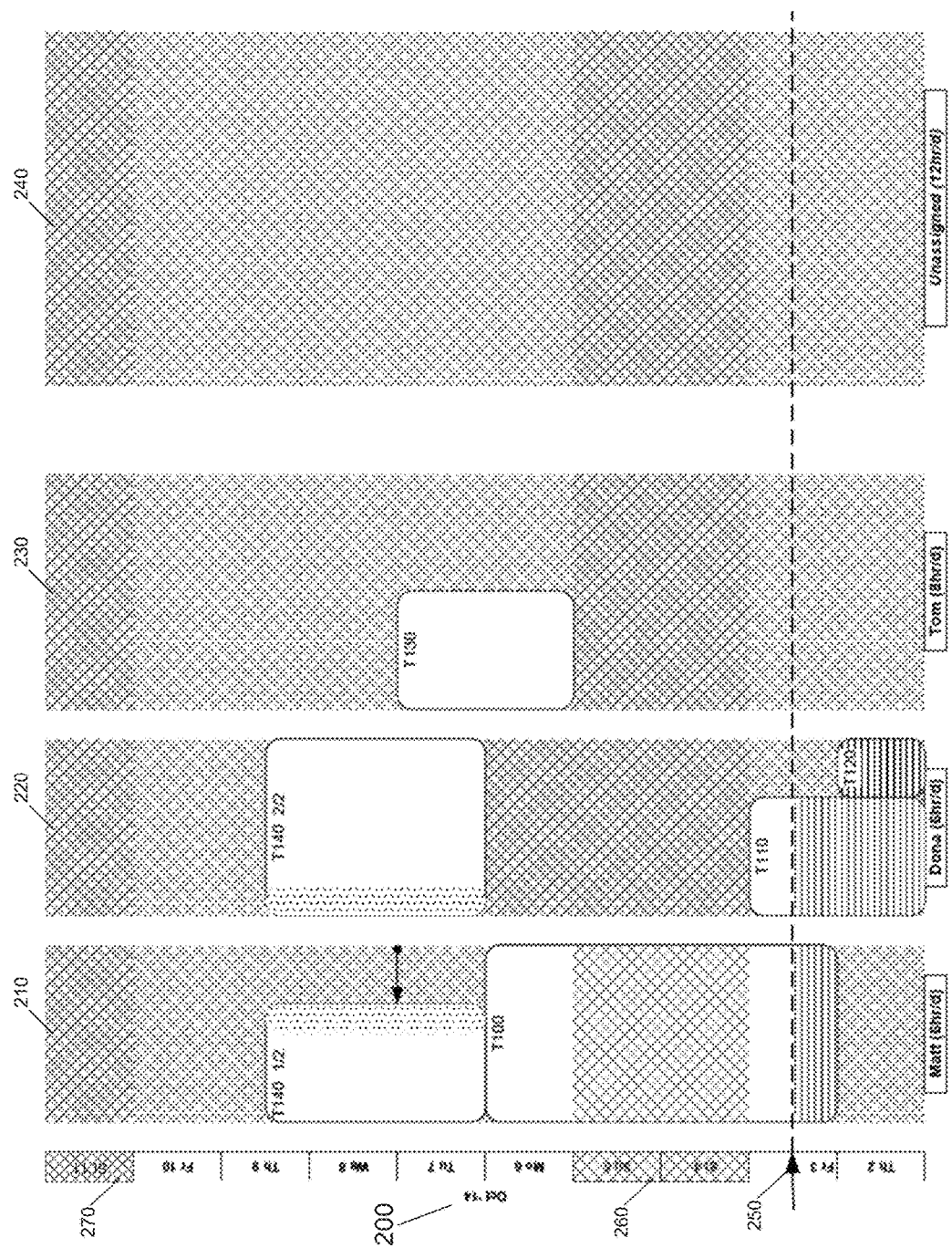
FIG. 11 illustrates a project plan timeline that is displayed by a visual task assignment system, where a specific resource's allocation percentage to a task that is assigned to multiple resources is modified, according to another embodiment of the invention.

FIG. 11 illustrates project plan timeline 200 that is displayed by a visual task assignment system, where a resource allocation percentage of task part T140 1/2 is modified, according to another embodiment of the invention. According to the embodiment, a user interacts with project plan timeline 200 using a cursor control device, such as a computer mouse, and "drags," or otherwise moves, a right side edge of task part T140 1/2 towards the left (where the user interaction is illustrated in FIG. 10 as an arrow). In response to the user interaction, the visual task assignment system modifies a resource allocation percentage of task part T140 1/2 from 100% to 67%. Further, in response to modifying the resource allocation percentage of task part T140 1/2 from 100% to 67%, the visual task assignment system reduces a width of task part T140 1/2. The visual task assignment system further increases a duration of task parts T140 1/2 and T140 2/2, and, thus correspondingly increases a height of task parts T140 1/2 and T140 2/2 within the user interface.

Figure 12:
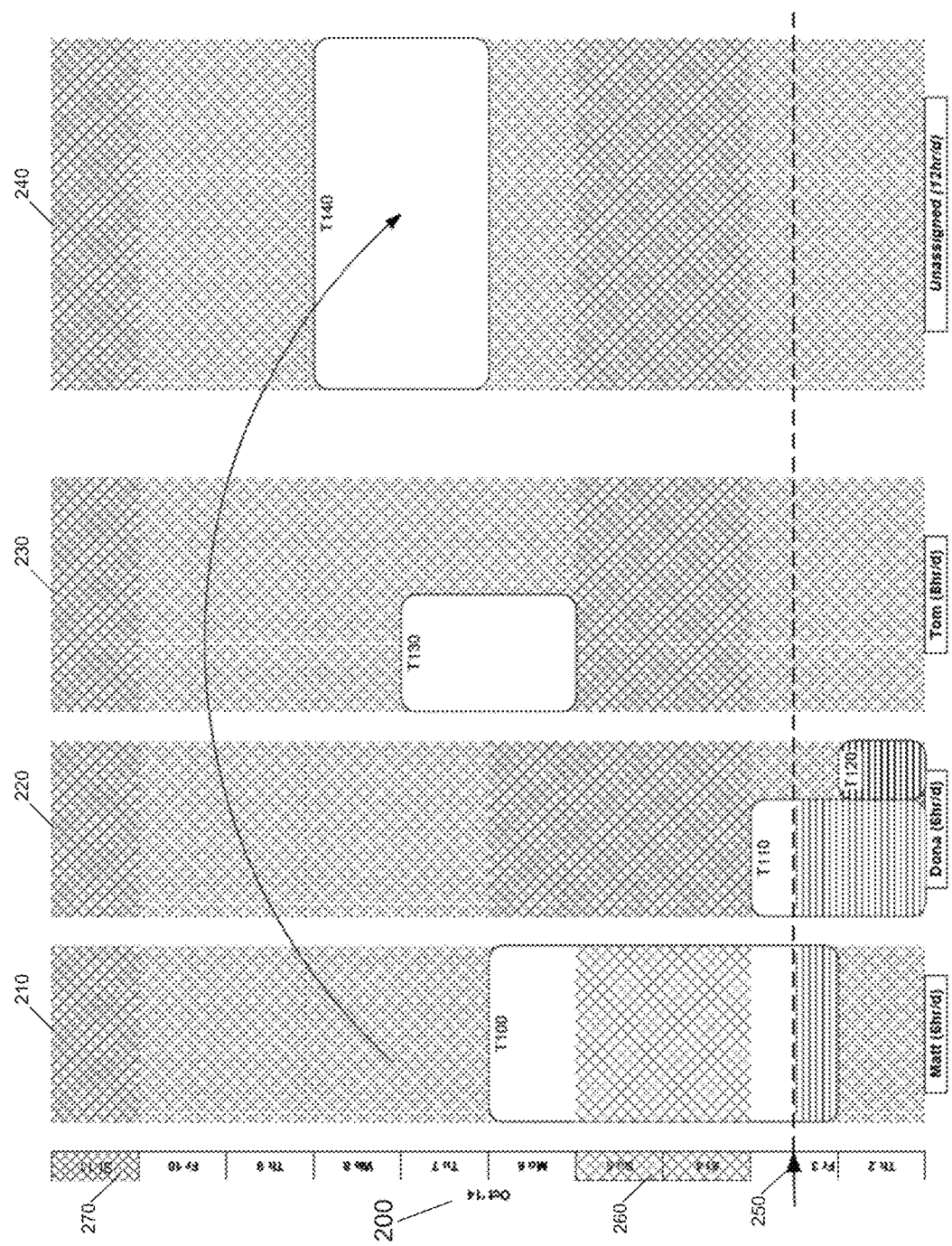
FIG. 12 illustrates a project plan timeline that is displayed by a visual task assignment system, where a task is un-assigned from all assigned resources using a single interaction, according to an embodiment of the invention.

FIG. 12 illustrates project plan timeline 200 that is displayed by a visual task assignment system, where task T140 is un-assigned from all assigned resources using a single interaction, according to an embodiment of the invention. According to the embodiment, a user interacts with project plan timeline 200 using a cursor control device, such as a computer mouse, and "drags," or otherwise moves, task part T140 1/2 of FIG. 11 from Matt's resource indicator (i.e., resource indicator 210) to an unassigned resource indicator (i.e., unassigned resource indicator 240) (where the user interaction is illustrated in FIG. 12 as an arrow). In response to the user interaction, the visual task assignment system un-assigns task T140 from all assigned resources (i.e., resources Matt and Dona). In further response to the user interaction, the visual task assignment system removes task parts T140 1/2 and T140 2/2 from the user interface and displays task T140 within the unassigned resource indicator (i.e., unassigned resource indicator 240). As illustrated in FIG. 12, the visual task assignment system automatically modifies the display of task T140 to fit within the unassigned resource indicator (i.e., unassigned resource indicator 240). This is an example of bulk un-assignment, as task T140 is un-assigned from all assigned resources (i.e., resources Matt and Dona). Alternatively, if a user desires to un-assign a single resource (e.g., resource Matt), the user can drag a task or task part from a resource indicator of the assigned resource that the user desires to un-assign to a resource indicator of another assigned resource, as previously described in conjunction with FIG. 9.

In one embodiment, the visual task assignment system can further display, or otherwise visual depict, "milestone tasks," in addition to tasks. As previously described, a "milestone task" is a task that indicates a completion of a significant phase in an overall project. As also previously described, a format for displaying, or otherwise visually depicting, a task within a user interface is a task indicator (e.g., rectangle with rounded corners), where a height of the task indicator visually represents a duration of the task and a width of the task indicator visually represents a resource allocation percentage (or vice-versa), and thus, a surface area of the task indicator visually represents an effort of the task. Because an effort of a milestone task is typically zero, it can be difficult to display, or otherwise visually depict, milestone tasks using this format. This is because a milestone task indicator, when displayed using this format, appears within a user interface as a point, which is difficult to display, or otherwise visually depict, within the user interface, and which also is difficult for a user to interact with.

In accordance with an embodiment, there can be three types of milestone tasks: (1) a zero-effort zero-duration milestone ("ZEZDM") task; (2) a zero-effort non-zero-duration milestone ("ZENZDM") task; and (3) a non-zero-effort non-zero-duration milestone ("NZENZDM") task. A ZEZDM task is a type of milestone task does not have any effort that is associated with the milestone task, and also does not have any duration that is associated with the milestone task. A ZEZDM task can also be identified as a "pure milestone task." A ZENZDM task is a type of milestone task does not have any effort that is associated with the milestone task, but does have a non-zero duration that is associated with the milestone task. A NZENZDM task is a type of milestone task has both a non-zero effort and a non-zero duration that is associated with the milestone task. A NZENZDM task can also be thought of as an actual task that is identified as a milestone task for functional reasons.

Currently, project management systems cannot easily visually depict milestone tasks. However, milestone tasks are usually assigned to a single resource, or multiple resources, similar to actual tasks. Therefore, an ability to visually assign milestone tasks would greatly assist project managers in managing project plans.

Thus, in one embodiment, a visual task assignment system can display, or otherwise visually depict, milestone tasks. The visual task assignment system can further allow the user to interact with the user interface and to assign a milestone task to multiple resources. The visual task assignment system can further display a visual indication that the milestone task has been assigned to multiple resources. The visual task assignment system can allow the user to further interact with the user interface and to un-assign a milestone task from one assigned resource, some of the assigned resources, or all of the assigned resources. In accordance with the embodiment, the visual task assignment system can further convert a ZEZDM task into a ZENZDM task, and can further convert the ZENZDM task back to the ZEZDM task. The visual task assignment system can even further convert a ZENZDM task into a NZENZDM task, and can further convert the NZENZDM task back to the ZENZDM task. The visual task assignment system can display, or otherwise visually depict, ZEZDM tasks, ZENZDM tasks, and NZENZDM tasks using a distinct visual format.

Figure 13:
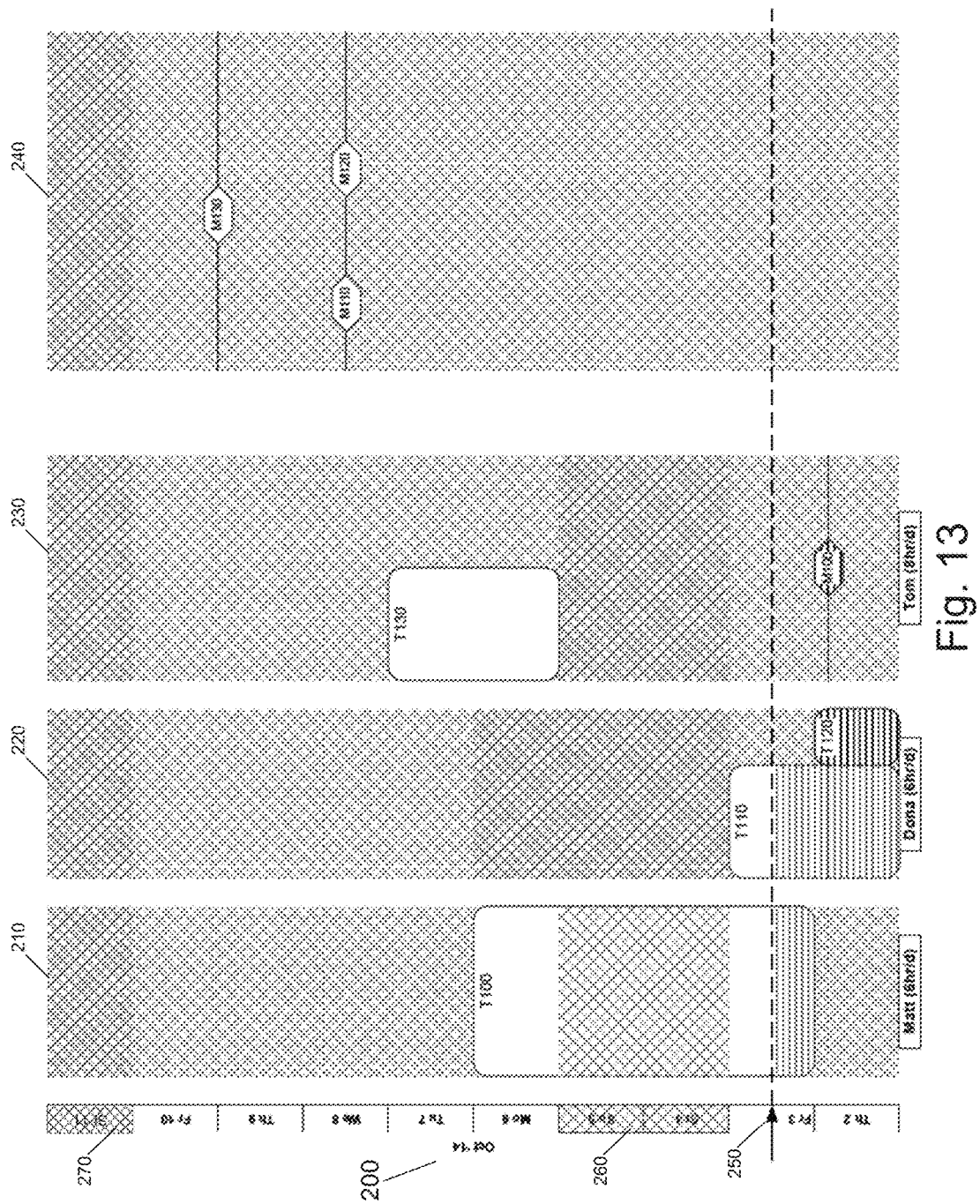
FIG. 13 illustrates a project plan timeline that is displayed by a visual task assignment system, where the project plan timeline includes resources, tasks, and milestone tasks, according to an embodiment of the invention.

FIG. 13 illustrates project plan timeline 200 that is displayed by a visual task assignment system, where project plan timeline 200 includes resources, tasks, and milestone tasks, according to an embodiment of the invention. As illustrated in FIG. 13, task T140 has been replaced by milestone tasks M100, M110, M120, and M130. Milestone tasks M100, M110, M120, and M130 are displayed within project plan timeline 200, where project plan timeline 200 is displayed within a user interface. More specifically, milestone task indicators (e.g., rectangular hexagons as illustrated in FIG. 13) are displayed within the user interface, where the milestone task indicators represent tasks M100, M110, M120, and M130. In the illustrated embodiment, milestone tasks M100, M110, M120, and M130 are ZEZDM tasks or "pure milestone tasks."

According to the illustrated embodiment, milestone task M100 is assigned to resource Tom. Thus, within project plan timeline 200, milestone task M100 is displayed within Tom's resource indicator (i.e., resource indicator 230). Further, milestone tasks M110, M120, and M130 are unassigned (i.e., not assigned to any resource). Thus, within project plan timeline 200, milestone tasks M110, M120, and M130 are displayed within an unassigned resource indicator (i.e., unassigned resource indicator 240). As illustrated in FIG. 13, milestone tasks M110 and M120 appear on the same date-time line within project plan timeline 200, indicating that milestone tasks M110 and M120 are planned for the same date-time (i.e., are planned to start and finish on the same date-time).

Further, in the illustrated embodiment, the visual task assignment system displays a completed portion of milestone task M100 as a dashed region within project plan timeline 200. According to an embodiment, a ZEZDM task (i.e., a pure milestone task) can only be not started or completely finished. In other words, a ZEZDM task cannot be partially finished, and thus, cannot include a partially dashed region. In contrast, a ZENZDM task or a NZENZDM task can be partially finished, and thus, a ZENZDM task or a NZENZDM task can include a partially dashed region.

Figure 14:
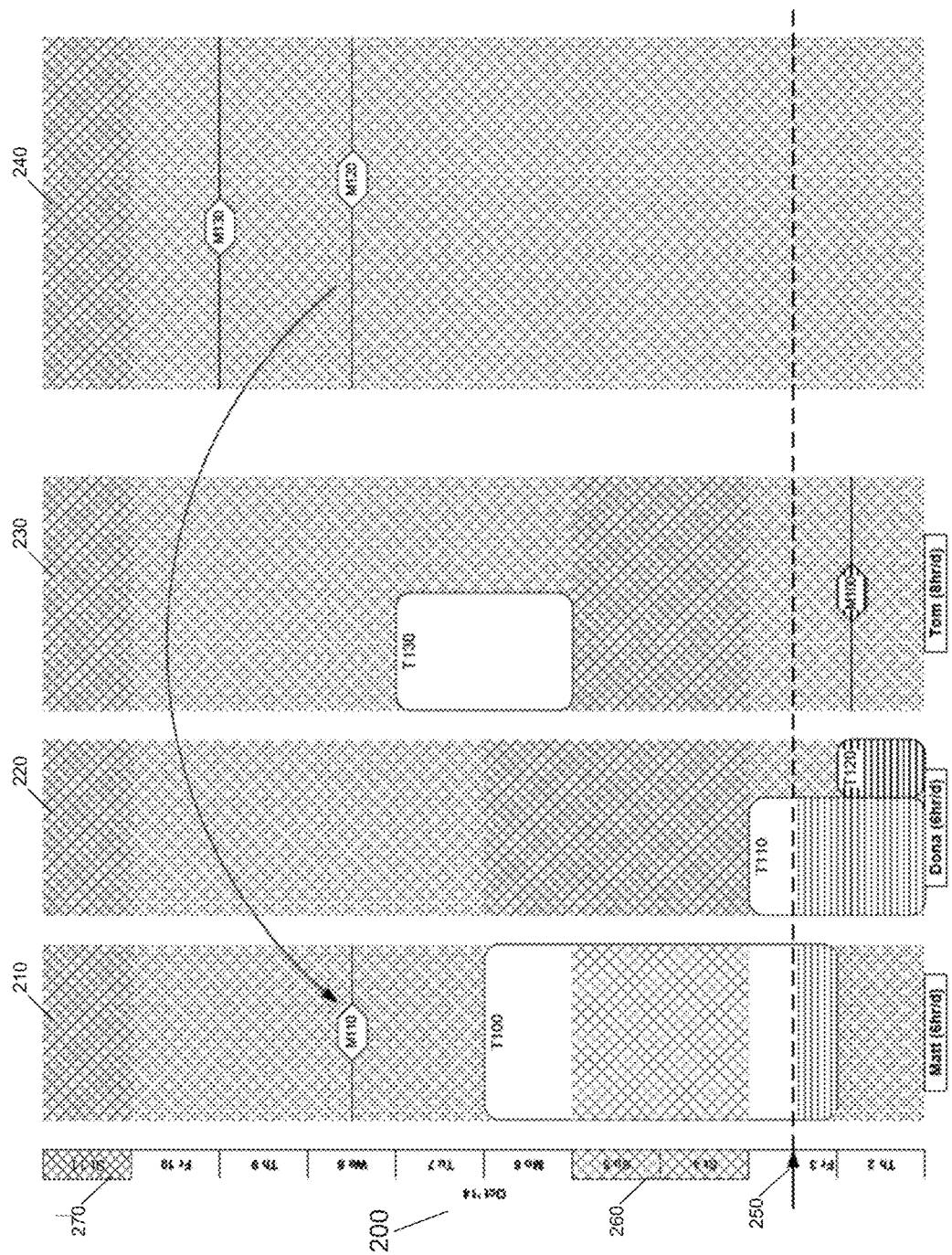
FIG. 14 illustrates a project plan timeline that is displayed by a visual task assignment system, where a milestone task is assigned to a resource according to an embodiment of the invention.

FIG. 14 illustrates project plan timeline 200 that is displayed by a visual task assignment system, where milestone task M110 is assigned to resource Matt, according to an embodiment of the invention. According to the embodiment, a user interacts with project plan timeline 200 using a cursor control device, such as a computer mouse, and "drags," or otherwise moves, milestone task M110 from an unassigned resource indicator (i.e., unassigned resource indicator 240) to Matt's resource indicator (i.e., resource indicator 210) (where the user interaction is illustrated in FIG. 14 as an arrow). In response to the user interaction, the visual task assignment system assigns milestone task M110 to resource Matt, and further displays milestone task M110 within Matt's resource indicator (i.e., resource indicator 210), rather than within the unassigned resource indicator (i.e., unassigned resource indicator 240). As illustrated in FIG. 14, the visual task assignment system also displays a line that is aligned with milestone task M110. The line indicates a date-time that milestone task M110 is planned to be started and finished.

Figure 15:
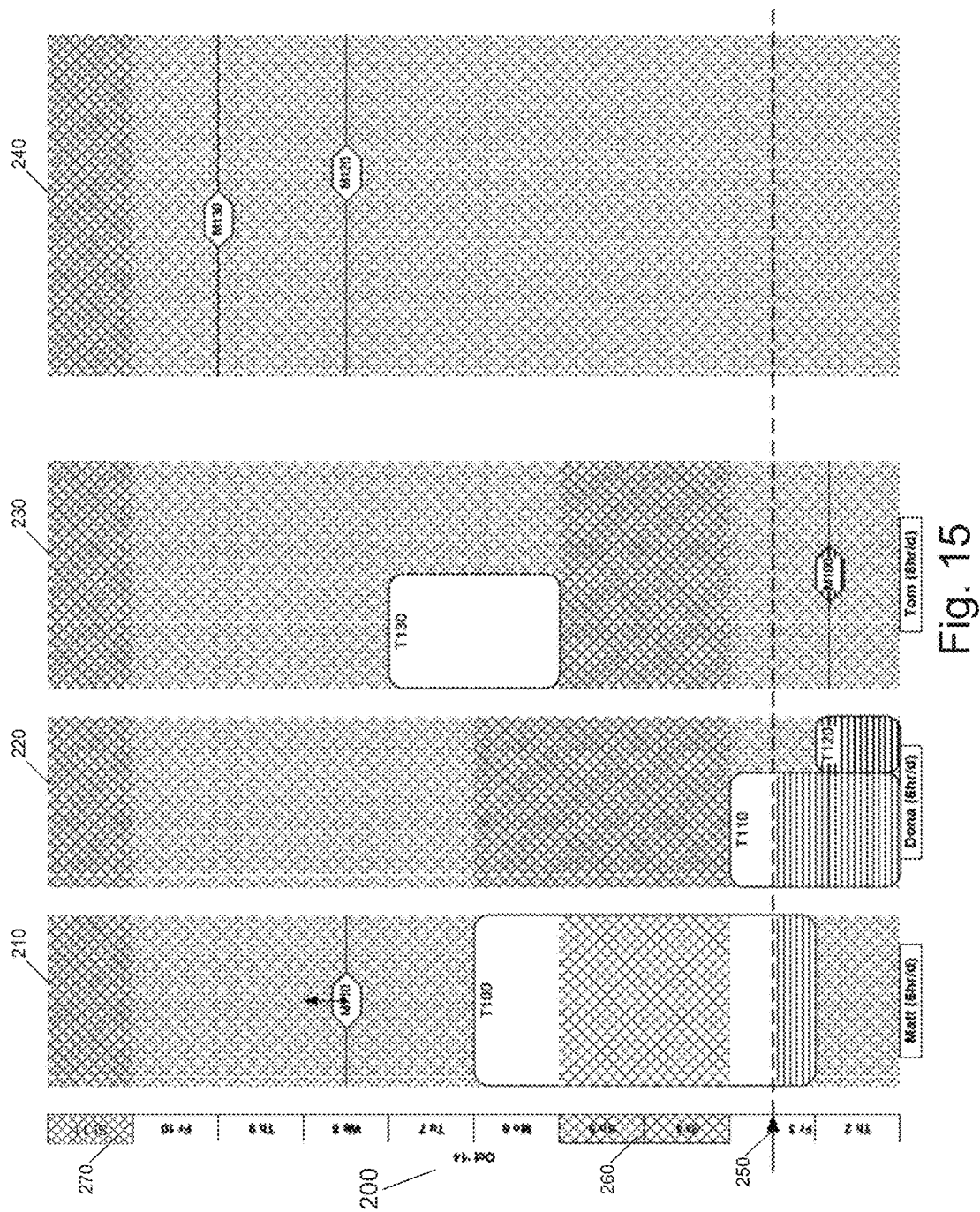
FIG. 15 illustrates a project plan timeline that is displayed by a visual task assignment system, where a position of a milestone task within the project plan timeline is modified, according to an embodiment of the invention.

FIG. 15 illustrates project plan timeline 200 that is displayed by a visual task assignment system, where a position of milestone task M110 within project plan timeline 200 is modified, according to an embodiment of the invention. According to the embodiment, a user interacts with project plan timeline 200 using a cursor control device, such as a computer mouse, and "drags," or otherwise moves, milestone task M110 from its original position within Matt's resource indicator (i.e., resource indicator 210) to a new position within Matt's resource indicator (i.e., resource indicator 210) (where the user interaction is illustrated in FIG. 15 as an arrow). In response to the user interaction, the visual task assignment system modifies a planned start date-time and a planned finish date-time of milestone task M110 based on the new position. Further, as is further described below and illustrated in FIG. 16, the visual task assignment system also displays milestone task M110 in the new position within Matt's resource indicator (i.e., resource indicator 210).

Figure 16:
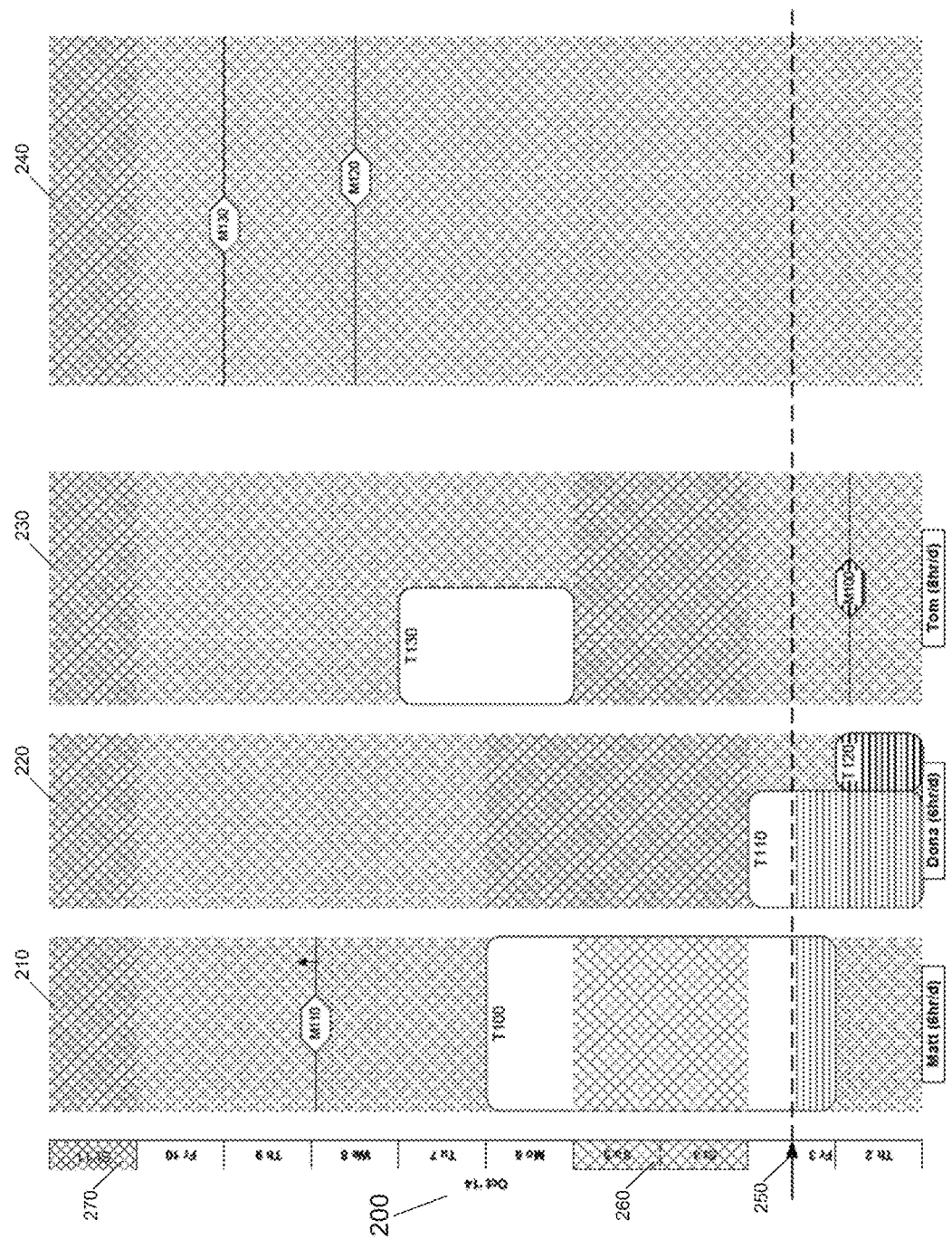
FIG. 16 illustrates a project plan timeline that is displayed by a visual task assignment system, where a zero-effort zero-duration milestone task is converted into a zero-effort non-zero-duration milestone task, according to an embodiment of the invention.
Figure 17:
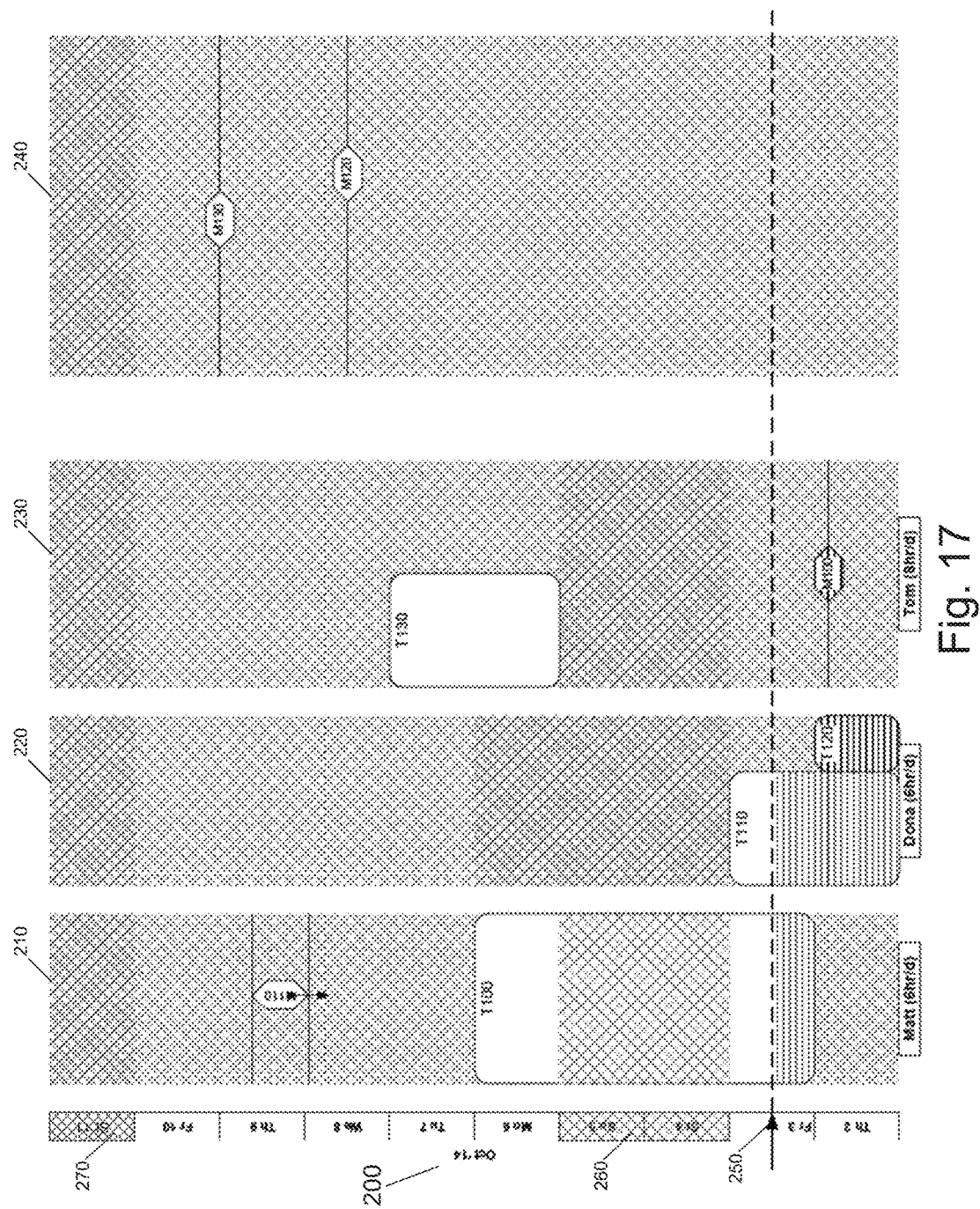
FIG. 17 illustrates a project plan timeline that is displayed by a visual task assignment system, where a position of a zero-effort non-zero-duration milestone task within the project plan timeline is modified, according to an embodiment of the invention.

FIG. 16 illustrates project plan timeline 200 that is displayed by a visual task assignment system, where milestone task M110 is converted from a ZEZDM task into a ZENZDM task, according to an embodiment of the invention. As illustrated in FIG. 16, milestone task M110 is displayed in a new position within Matt's resource indicator (i.e., resource indicator 210) based on the user interaction previously described in conjunction with FIG. 15. According to the embodiment, a user interacts with project plan timeline 200 using a cursor control device, such as a computer mouse, and "drags," or otherwise moves, a line on any side of milestone task M110 in a vertical direction (where the user interaction is illustrated in FIG. 16 as an arrow). In response to the user interaction, the visual task assignment system converts milestone task M110 from a ZEZDM task into a ZENZDM task. Further, as is further described below and as illustrated in FIG. 17, the visual task assignment system also modifies a display of the line of milestone task M110 by splitting the line of milestone task M110 into two lines, where a space between the two lines of milestone task M110 visually indicates a non-zero duration of milestone task M110. In addition, as also described below and as also illustrated in FIG. 17, the visual task assignment system modifies a display of milestone task M110 by rotating milestone task M110 ninety degrees (for example, in a counter-clockwise direction), where the modified display of milestone task M110 visually indicates a zero effort of milestone task M110. Thus, a top line of the two lines intersects a top vertex of milestone task M110, and a bottom line of the two lines intersects a bottom vertex of milestone task M110.

FIG. 17 illustrates project plan timeline 200 that is displayed by a visual task assignment system, where a position of milestone task M110 within project plan timeline 200 is modified, according to an embodiment of the invention. As illustrated in FIG. 17, a display of milestone task M110 has been modified based on the user interaction previously described in conjunction with FIG. 16. According to the embodiment, a user interacts with project plan timeline 200 using a cursor control device, such as a computer mouse, and "drags," or otherwise moves, milestone task M110 from its original position within Matt's resource indicator (i.e., resource indicator 210) to a new position within Matt's resource indicator (i.e., resource indicator 210) (where the user interaction is illustrated in FIG. 17 as an arrow). In response to the user interaction, the visual task assignment system modifies a planned start date-time and a planned finish date-time of milestone task M110 based on the new position. Further, as is further described below and illustrated in FIG. 18, the visual task assignment system also displays milestone task M110 in the new position within Matt's resource indicator (i.e., resource indicator 210).

Figure 18:
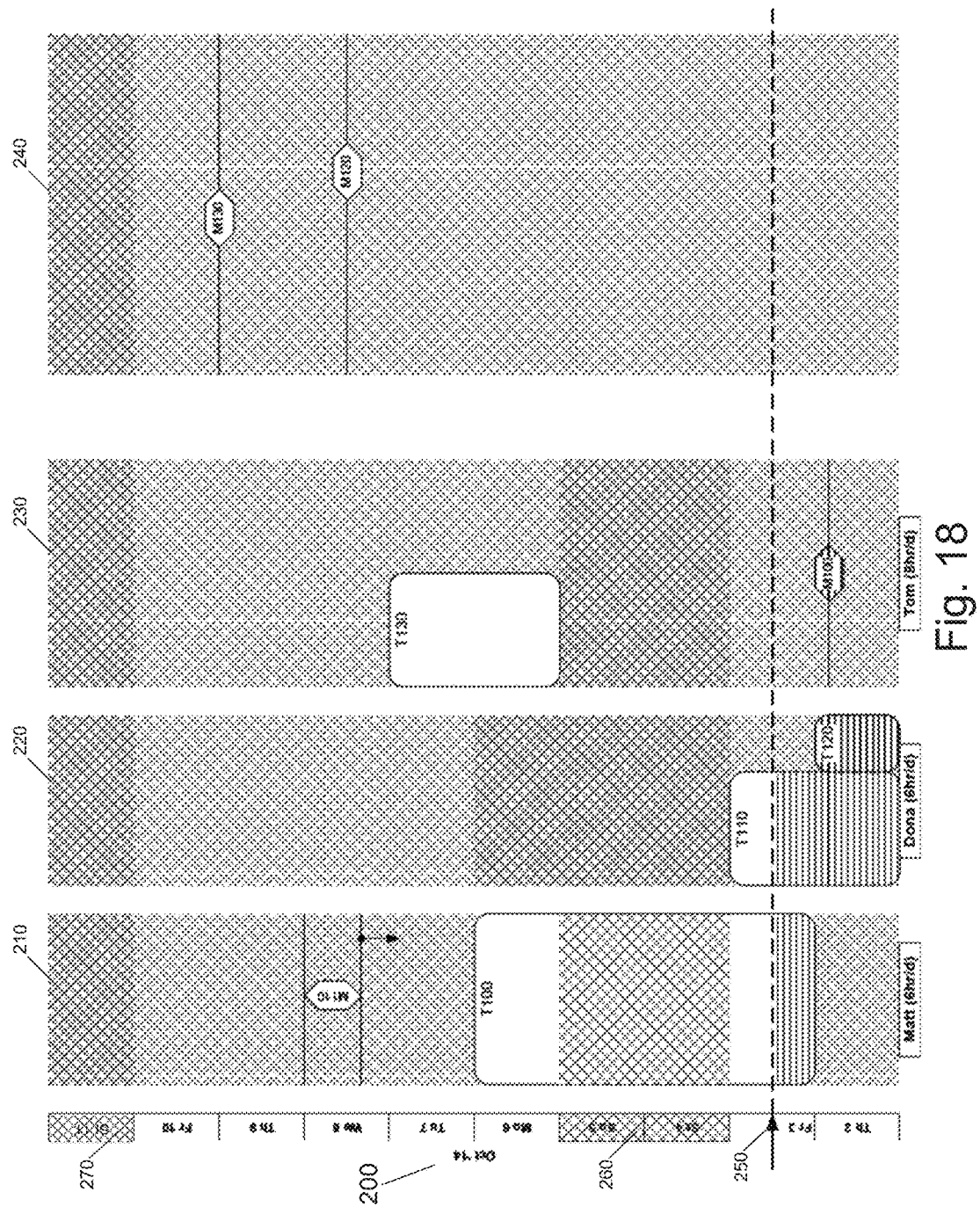
FIG. 18 illustrates a project plan timeline that is displayed by a visual task assignment system, where a duration of a zero-effort non-zero-duration milestone task is modified, according to an embodiment of the invention.
Figure 19:
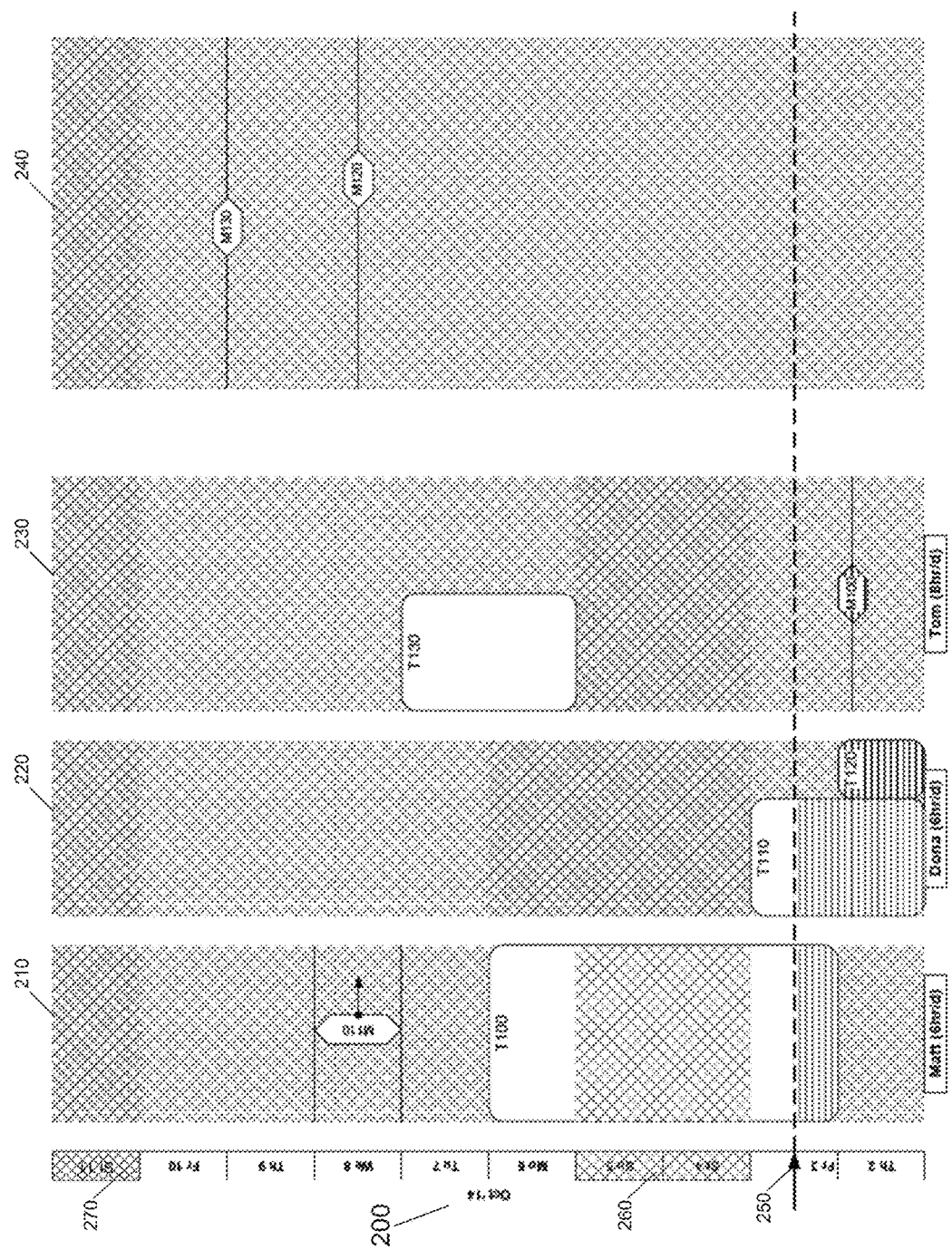
FIG. 19 illustrates a project plan timeline that is displayed by a visual task assignment system, where a zero-effort non-zero-duration milestone task is converted into a non-zero-effort non-zero-duration milestone task, according to an embodiment of the invention.

FIG. 18 illustrates project plan timeline 200 that is displayed by a visual task assignment system, where a duration of milestone task M110 is modified, according to an embodiment of the invention. As illustrated in FIG. 18, milestone task M110 is displayed in a new position within Matt's resource indicator (i.e., resource indicator 210) based on the user interaction previously described in conjunction with FIG. 17. According to the embodiment, a user interacts with project plan timeline 200 using a cursor control device, such as a computer mouse, and "drags," or otherwise moves, one of the two lines of milestone task M110 in a vertical direction (where the user interaction is illustrated in FIG. 18 as an arrow). In response to the user interaction, the visual task assignment system modifies a duration of milestone task M110. Further, as is further described below and as illustrated in FIG. 19, the visual task assignment system also modifies a display of the selected line of milestone task M110 by displaying the selected line of milestone task M110 in the selected new position. In addition, as also described below and as also illustrated in FIG. 19, the visual task assignment system modifies a display of milestone task M110 by increasing a length of milestone task M110 so that a top line of the two lines intersects a top vertex of milestone task M110, and a bottom line of the two lines intersects a bottom vertex of milestone task M110.

FIG. 19 illustrates project plan timeline 200 that is displayed by a visual task assignment system, where milestone task M110 is converted from a ZENZDM task to a NZENZDM task, according to an embodiment of the invention. As illustrated in FIG. 19, a display of milestone task M110 has been modified based on the user interaction previously described in conjunction with FIG. 18. According to the embodiment, a user interacts with project plan timeline 200 using a cursor control device, such as a computer mouse, and "drags," or otherwise moves, a side edge of milestone task M110 in a horizontal direction (where the user interaction is illustrated in FIG. 19 as an arrow). In response to the user interaction, the visual task assignment system converts milestone task M110 from a ZENZDM task into a NZENZDM task. Further, as is further described below and as illustrated in FIG. 20, the visual task assignment system also modifies a display of milestone task M110 by displaying milestone task M110 as an octagon, rather than a rectangular hexagon, where a width of a portion of the octagon that intersects the two lines of milestone task M110 visually indicates a non-zero resource allocation percentage, and, in effect, a non-zero effort (i.e., a non-zero resource allocation percentage multiplied by a non-zero duration equals a non-zero effort) of milestone task M110.

Figure 20:
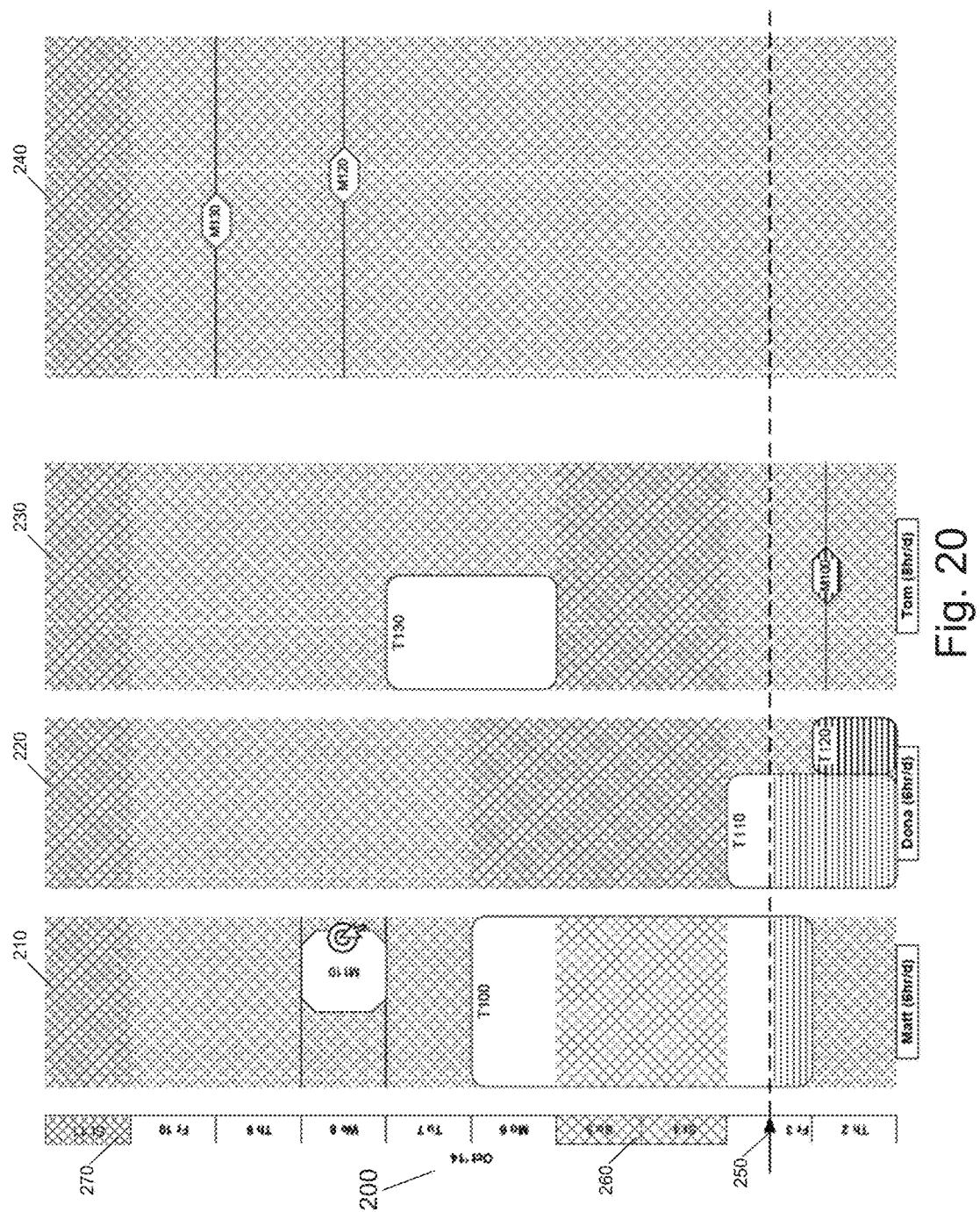
FIG. 20 illustrates a project plan timeline that is displayed by a visual task assignment system, where a milestone task is designated as a multi-resource enabled milestone task, according to an embodiment of the invention.

FIG. 20 illustrates project plan timeline 200 that is displayed by a visual task assignment system, where milestone task M110 is designated as a multi-resource enabled milestone task, according to an embodiment of the invention. As illustrated in FIG. 20, a display of milestone task M110 has been modified based on the user interaction previously described in conjunction with FIG. 19. According to the embodiment, a user interacts with project plan timeline 200 using a cursor control device, such as a computer mouse, and "double-clicks," or otherwise interacts with, a side region of milestone task M110 (where the user interaction is illustrated in FIG. 20 as a bullseye target). In response to the user interaction, the visual task assignment system designates milestone task M110 as a "multi-resource enabled milestone task," where milestone task M110 is capable of being assigned to multiple resources. In further response to the user interaction, as is described below and as illustrated in FIG. 21, the visual task assignment system further displays a shaded side-area region 2110 within milestone task M110.

Figure 21:
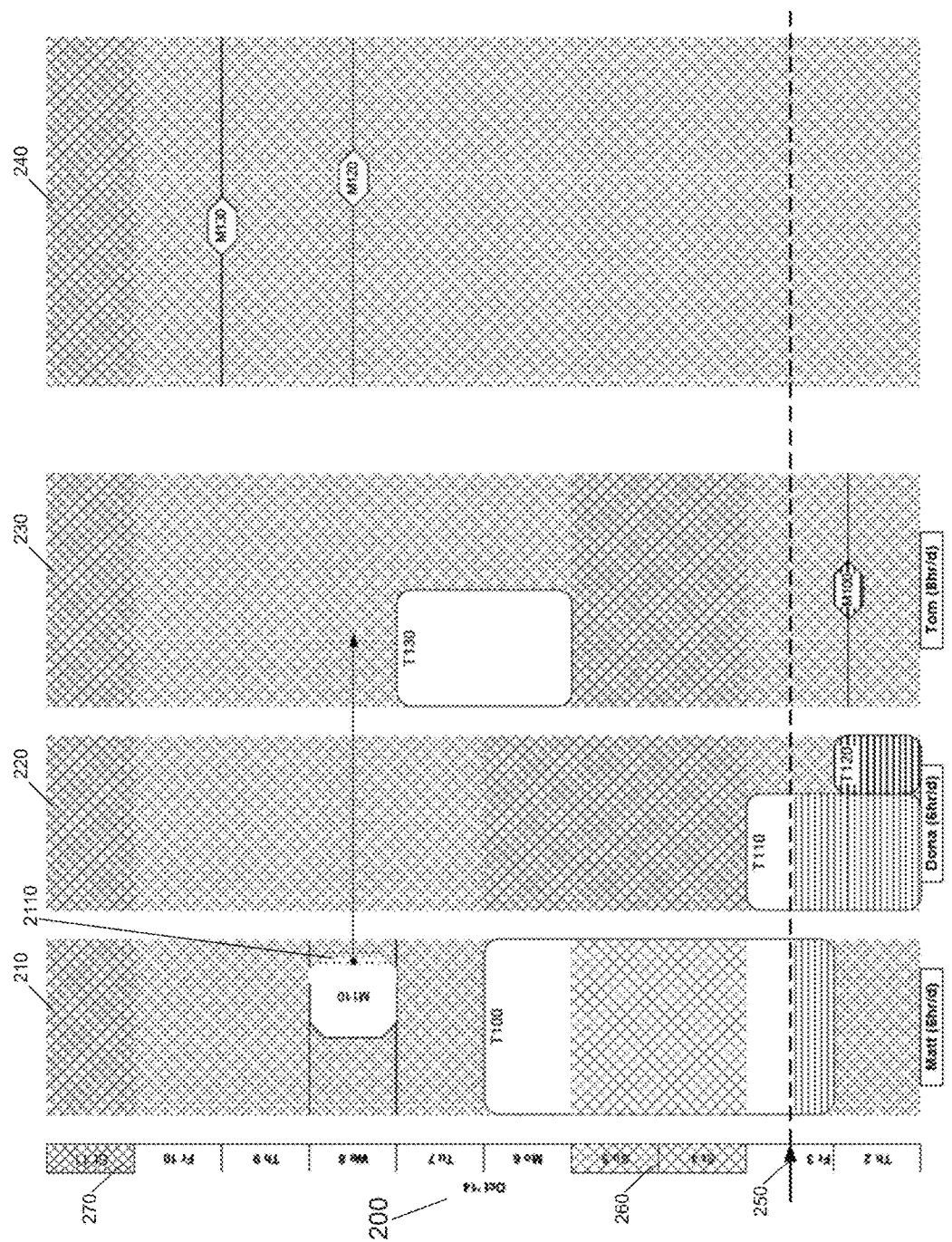
FIG. 21 illustrates a project plan timeline that is displayed by a visual task assignment system, where a milestone task that is already assigned to a first resource is assigned to a second resource, according to an embodiment of the invention.

FIG. 21 illustrates project plan timeline 200 that is displayed by a visual task assignment system, where a milestone task that is already assigned to a first resource is assigned to a second resource, according to an embodiment of the invention. As illustrated in FIG. 21, a side-area region 2110 is displayed within milestone task M110 based on the user interaction previously described in conjunction with FIG. 20. In the illustrated embodiment of FIG. 21, side-area region 2110 is a shaded region. Further, in the illustrated embodiment, side-area region 2110 is displayed within a right side region of milestone task M110. However, in an alternate embodiment, side-area region 2110 can be displayed within a left side region of milestone task M110. As previously described, side-area region 2110 is a drag-handle for multiple resource assignment (i.e., assigning milestone task M110 to multiple resources). In one embodiment, if the user performs a user interaction other than a user interaction that assigns milestone task M110 to multiple resources, such as the user interaction described below in greater detail in conjunction with FIG. 21, the visual task assignment system can cancel the designation of milestone task M110 as a multi-resource enabled milestone task, and can remove the display of side-area region 2110 from the right side region of milestone task M110.

According to the embodiment, a user interacts with project plan timeline 200 using a cursor control device, such as a computer mouse, and "drags," or otherwise moves, side-area region 2110 of milestone task M110 from Matt's resource indicator (i.e., resource indicator 210) to Tom's resource indicator (i.e., resource indicator 230) (where the user interaction is illustrated in FIG. 21 as an arrow). In response to the user interaction, and because milestone task M110 is designated as a multi-resource enabled milestone task, the visual task assignment system assigns milestone task M110 to resource Tom, so that milestone task M110 is assigned to resources Matt and Tom. Although the user "drags," or otherwise moves, side-area region 2110 of milestone task M110 over Dona's resource indicator (i.e., resource indicator 220), the visual task assignment system does not assign milestone task M110 to resource Dona because the user does not "drop," or otherwise position, side-area region 2110 of milestone task M110 within Dona's resource indicator (i.e., resource indicator 220).

Figure 22:
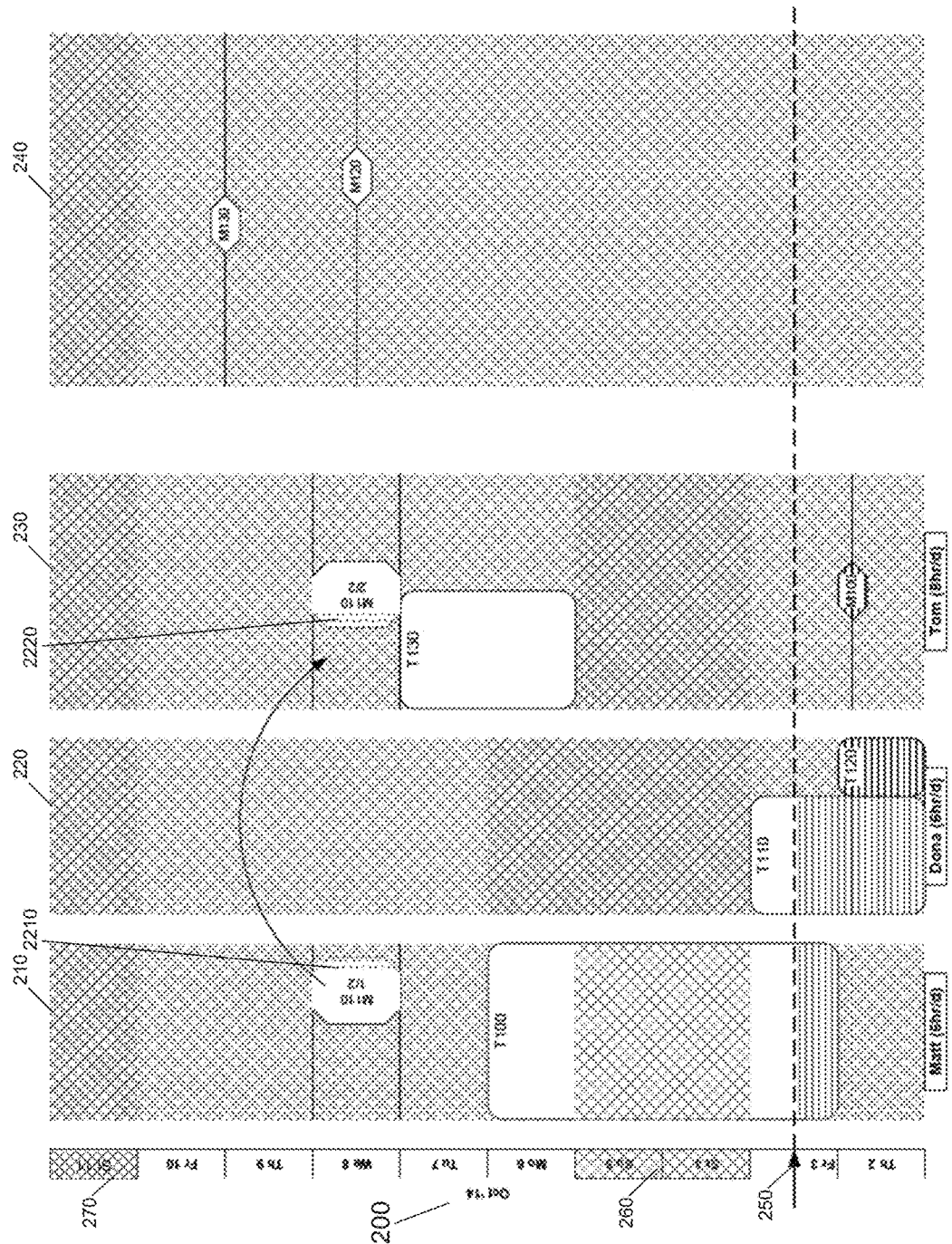
FIG. 22 illustrates a project plan timeline that is displayed by a visual task assignment system, where a milestone task is un-assigned from an assigned resource, according to an embodiment of the invention.

FIG. 22 illustrates project plan timeline 200 that is displayed by a visual task assignment system, where milestone task M110 is un-assigned from resource Matt, according to an embodiment of the invention. As illustrated in FIG. 22, the visual task assignment system further displays task milestone task M110 as two milestone task parts based on the user interaction previously described in conjunction with FIG. 21: milestone task part M110 1/2 and milestone task part M110 2/2, where milestone task part M110 1/2 is assigned to resource Matt and milestone task part M110 2/2 is assigned to resource Tom. More specifically, two milestone task part indicators (e.g., rectangular octagons as illustrated in FIG. 22) are displayed within the user interface, where the two milestone task part indicators collectively represent milestone task M110 (i.e., going from left to right, the first milestone task part indicator visually represents milestone task part M110 1/2 and the second milestone task part indicator visually represents milestone task part M110 2/2). According to the embodiment, the visual task assignment system divides an effort associated with milestone task M110 between milestone task part M110 1/2 and milestone task part M110 2/2. Based on this division of effort, the visual task assignment system defines resource allocation percentages for milestone task parts M110 1/2 and M110 2/2 that are reduced as compared to a resource allocation percentage that was defined for milestone task M110 of FIG. 21. Thus, as illustrated in FIG. 22, widths (and corresponding surface areas) of milestone task parts M110 1/2 and M110 2/2 are each reduced as compared to a width (and corresponding surface area) of milestone task M110 of FIG. 21.

Further, the visual task assignment system displays a side-area region 2210 within milestone task part M110 1/2 and a side-area region 2220 within milestone task part M110 2/2. In the illustrated embodiment of FIG. 22, side-area regions 2210 and 2220 are shaded regions. Further, in the illustrated embodiment, side-area region 2210 is displayed within a right side region of milestone task part M110 1/2 and side-area region 2220 is displayed within a left side region of milestone task part M110 2/2. As previously described, side-area regions 2210 and 2220 are drag-handles for multiple resource assignment (i.e., assigning milestone task M110 to multiple resources). Further, side-area regions 2210 and 2220 are also visual indicators that there are multiple milestone task parts associated with a milestone task. According to an embodiment, a side-area region can be displayed on a side of a milestone task part that corresponds to a side of the user interface where other milestone task parts are positioned. As illustrated in FIG. 22, side-area region 2210 is displayed within a right side region of milestone task part M110 1/2 because milestone task part M110 2/2 is positioned to the right of milestone task part M110 1/2 within project plan timeline 200. Further, side-area region 2220 is displayed within a left side region of milestone task part M110 2/2 because milestone task part M110 1/2 is positioned to the left of milestone task part M110 2/2 within project plan timeline 200.

According to the embodiment, a user further interacts with project plan timeline 200 using a cursor control device, such as a computer mouse, and "drags," or otherwise moves, milestone task part M110 1/2 from Matt's resource indicator (i.e., resource indicator 210) to Tom's resource indicator (i.e., resource indicator 230) (where the user interaction is illustrated in FIG. 22 as an arrow). In response to the user interaction, the visual task assignment system un-assigns milestone task M110 from resource Matt.

Figure 23:
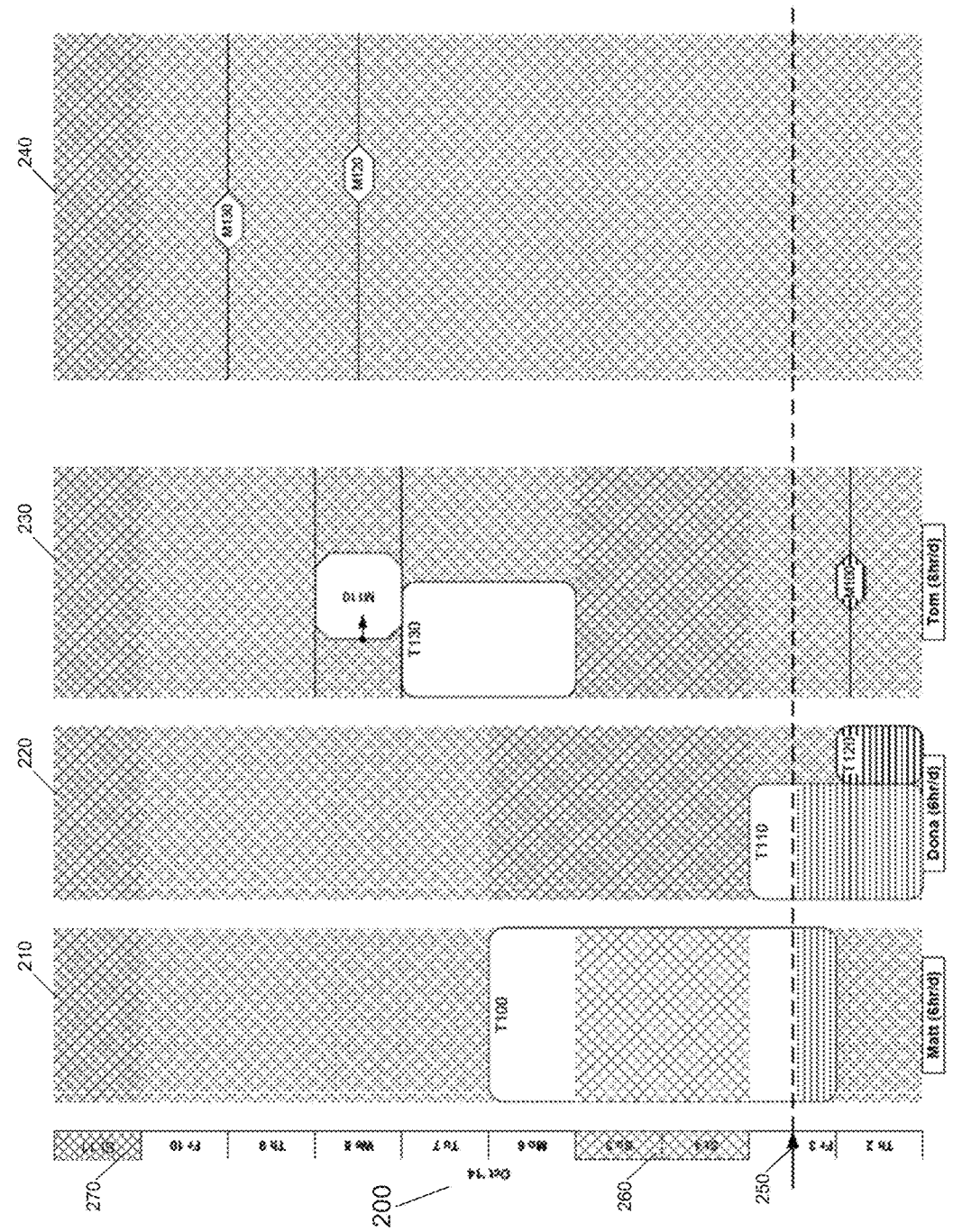
FIG. 23 illustrates a project plan timeline that is displayed by a visual task assignment system, where a non-zero-effort non-zero-duration milestone task is converted into a zero-effort non-zero-duration milestone task, according to an embodiment of the invention.

FIG. 23 illustrates a project plan timeline 200 that is displayed by a visual task assignment system, where milestone task M110 is converted from a NZENZDM task into a ZENZDM task, according to an embodiment of the invention. As illustrated in FIG. 23, the visual task assignment system removes milestone task parts M110 1/2 and M110 2/2 from the user interface and displays milestone task M110 within resource Tom based on the user interaction previously described in conjunction with FIG. 22. According to the embodiment, the visual task assignment system compensates for the lost effort associated with milestone task part M110 1/2 by increasing an effort associated with milestone task M110. Based on this compensation, the visual task assignment system defines a resource allocation percentage for milestone task part M110 that is increased as compared to resource allocation percentages that were defined for milestone task parts M110 1/2 and M110 2/2 of FIG. 22. Thus, as illustrated in FIG. 23, a width (and corresponding surface area) of milestone task M110 is increased as compared to widths (and corresponding surface areas) of milestone task parts M110 1/2 and M110 2/2 of FIG. 22.

According to the embodiment, a user further interacts with project plan timeline 200 using a cursor control device, such as a computer mouse, and "drags," or otherwise moves, a side edge of milestone task M110 in a horizontal direction (where the user interaction is illustrated in FIG. 23 as an arrow). In response to the user interaction, the visual task assignment system converts milestone task M110 from a NZENZDM task into a ZENZDM task.

Figure 24:
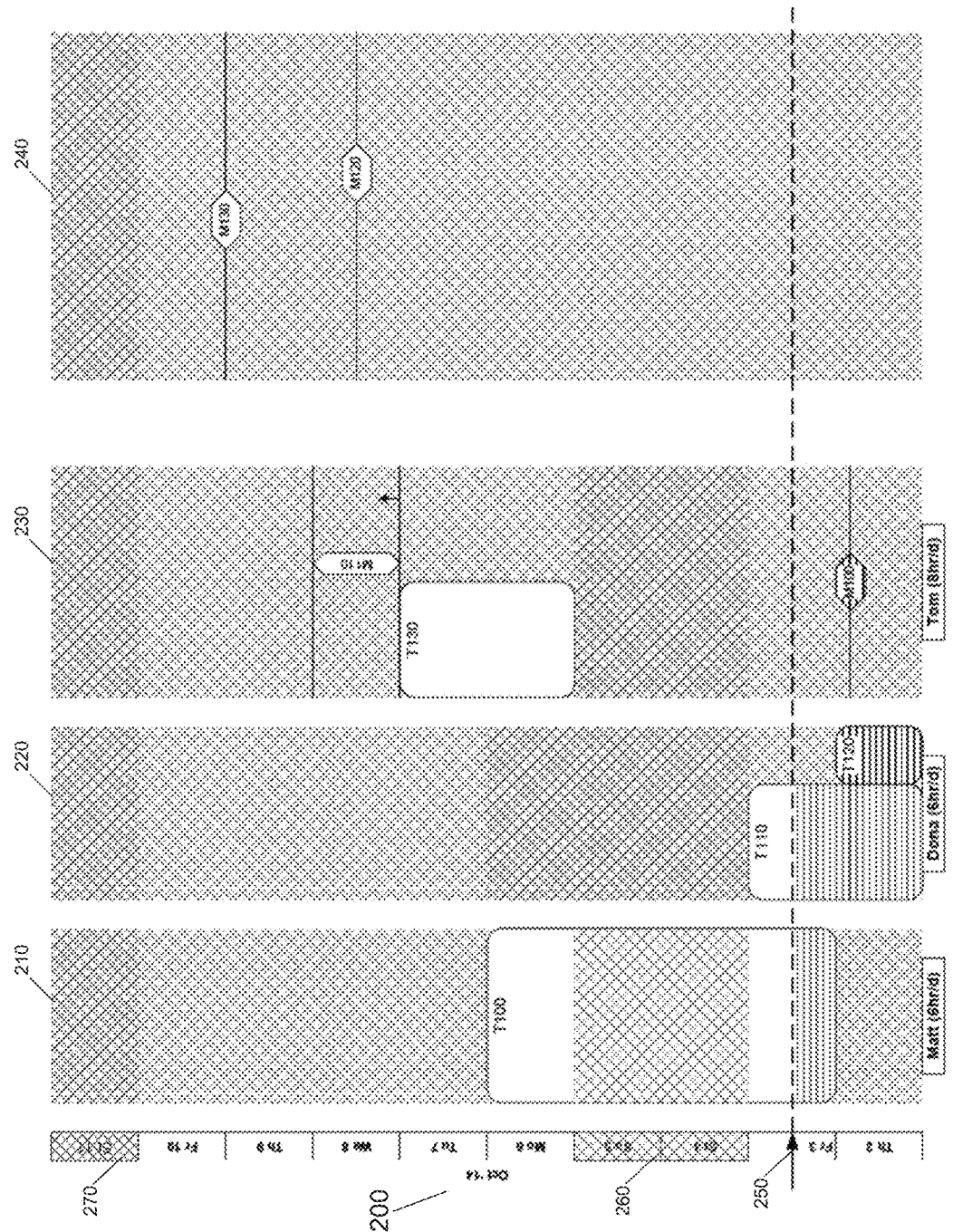
FIG. 24 illustrates a project plan timeline that is displayed by a visual task assignment system, where a zero-effort non-zero-duration milestone task is converted into a zero-effort zero-duration milestone task, according to an embodiment of the invention.

FIG. 24 illustrates a project plan timeline 200 that is displayed by a visual task assignment system, where milestone task M110 is converted from a ZENZDM task into a ZEZDM task, according to an embodiment of the invention. As illustrated in FIG. 24, the visual task assignment system modifies a display of milestone task M110 based on the user interaction previously described in conjunction with FIG. 23, by displaying milestone task M110 as a hexagon, rather than an octagon, where the hexagon visually indicates a zero resource allocation percentage, and, correspondingly, a zero effort of milestone task M110. As illustrated in FIG. 24, milestone task M110 still has a non-zero duration.

According to the embodiment, a user further interacts with project plan timeline 200 using a cursor control device, such as a computer mouse, and "drags," or otherwise moves, one of the two lines of milestone task M110 in a vertical direction so that the line is positioned on top of the other line of milestone task M110 (where the user interaction is illustrated in FIG. 24 as an arrow). In response to the user interaction, the visual task assignment system converts milestone task M110 from a ZENZDM task into a ZEZDM task.

Figure 25:
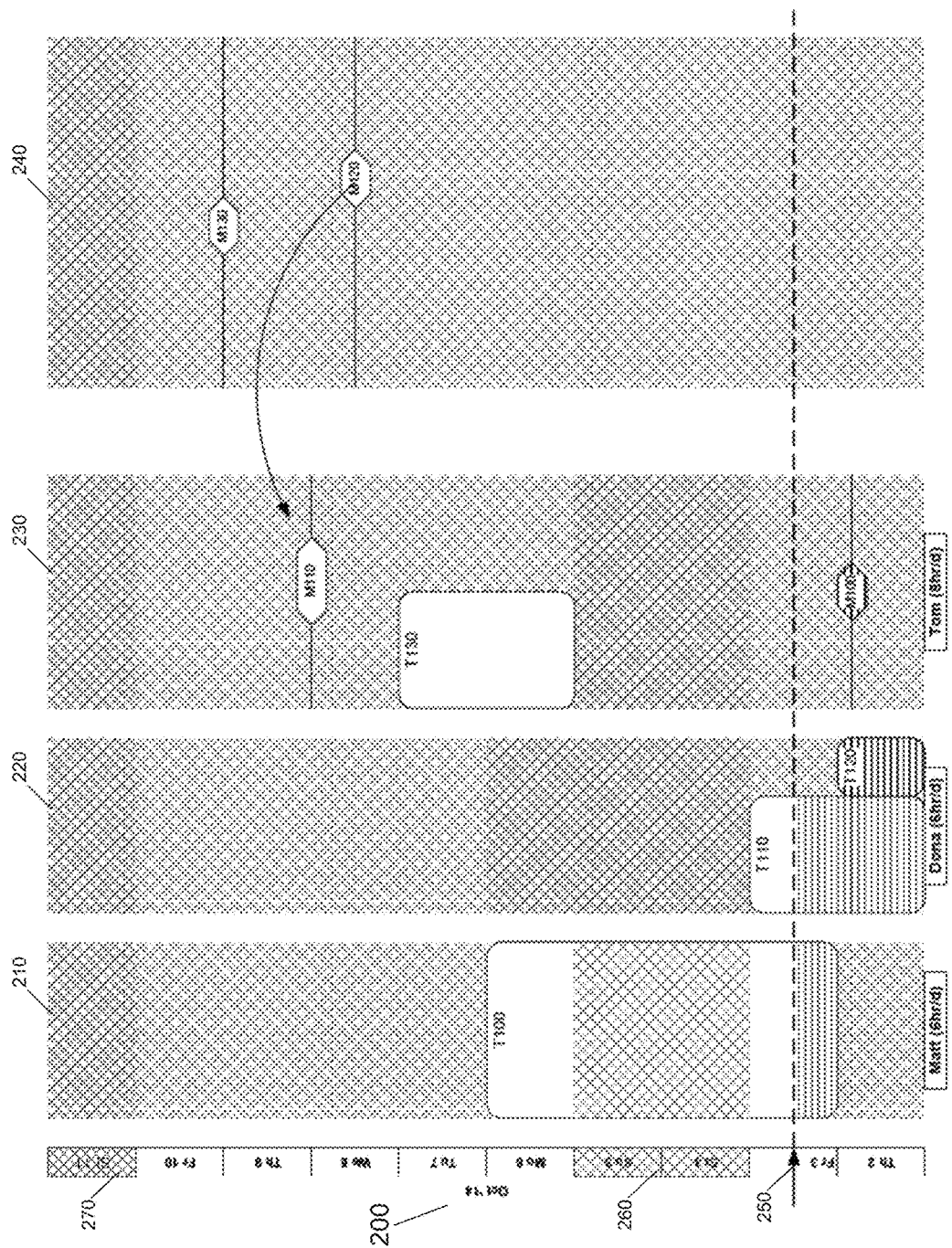
FIG. 25 illustrates a project plan timeline that is displayed by a visual task assignment system, where a second milestone task is assigned to a resource that already have a first milestone task assigned to it, according to an embodiment of the invention.

FIG. 25 illustrates project plan timeline 200 that is displayed by a visual task assignment system, where milestone task M120 is assigned to resource Tom, where resource Tom already have milestone task M110 assigned to it, according to an embodiment of the invention. As illustrated in FIG. 25, the visual task assignment system modifies a display of milestone task M110 based on the user interaction previously described in conjunction with FIG. 24. More specifically, the visual task assignment system modifies a display of the two lines of milestone task M110 by merging the two lines into a single line, and displaying the single line so that the single line intersects milestone task M110 (e.g., runs through the hexagon representing milestone task M110), where the single line visually indicates a zero duration of milestone task M110. In addition, the visually task assignment system modifies a display of milestone task M110 by rotating milestone task M110 ninety degrees.

According to the embodiment, a user further interacts with project plan timeline 200 using a cursor control device, such as a computer mouse, and "drags," or otherwise moves, milestone task M120 from an unassigned resource indicator (i.e., unassigned resource indicator 240) to Tom's resource indicator (i.e., resource indicator 230) (where the user interaction is illustrated in FIG. 25 as an arrow). In response to the user interaction, the visual task assignment system assigns milestone task M120 to resource Tom.

Figure 26:
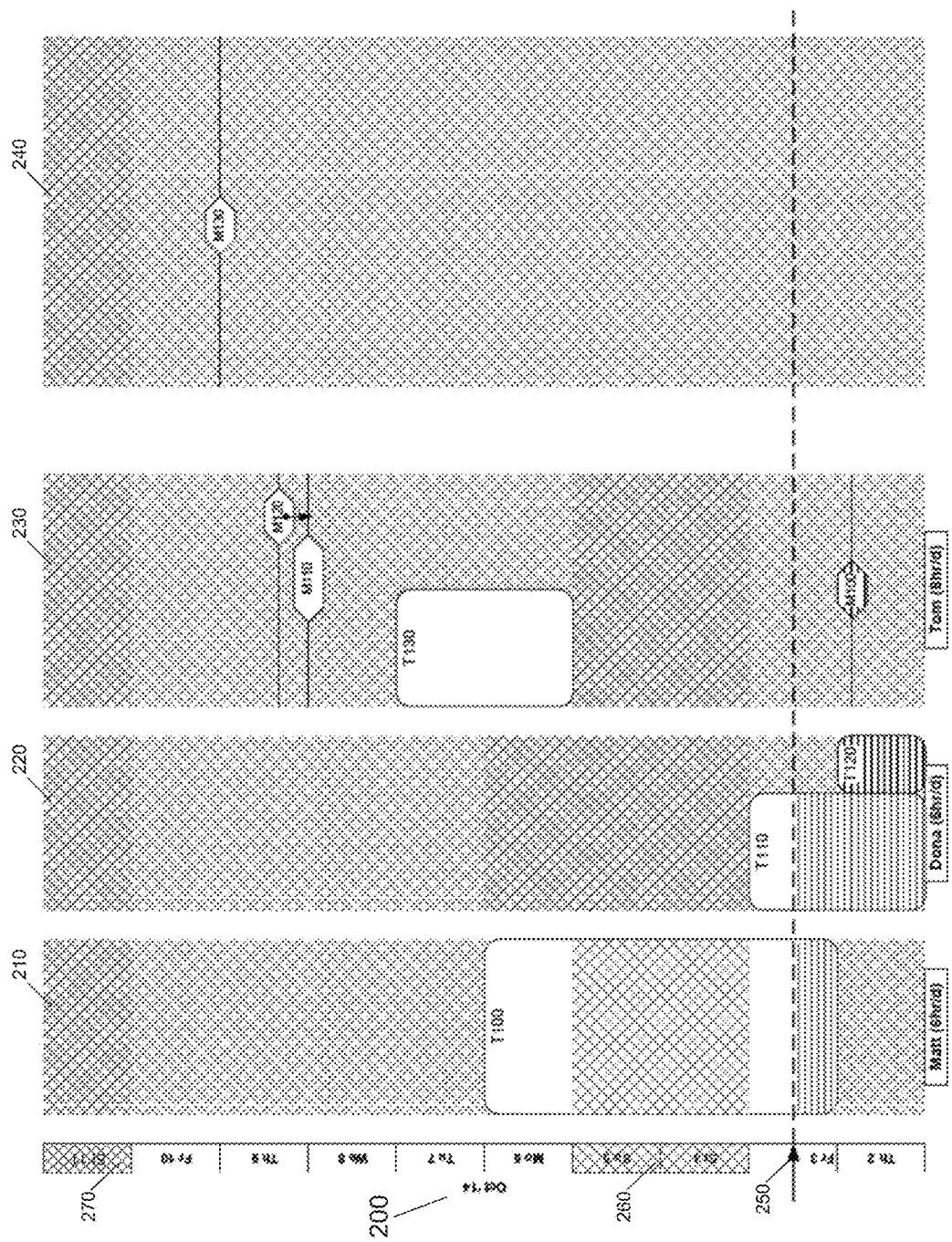
FIG. 26 illustrates a project plan timeline that is displayed by a visual task assignment system, where a position of a second milestone task is modified to coincide with a position of a first milestone task within the project plan timeline, according to an embodiment of the invention.

FIG. 26 illustrates project plan timeline 200 that is displayed by a visual task assignment system, where a position of milestone task M120 is modified to coincide with a position of milestone task M110 within project plan timeline 200, according to an embodiment of the invention. As illustrated in FIG. 26, the visual task assignment system displays milestone task M120 within Tom's resource indicator (i.e., resource indicator 230) based on the user interaction previously described in conjunction with FIG. 25. As also illustrated in FIG. 26, the visual task assignment system also displays a line that intersects milestone task M120. As previously described, the line indicates a date-time that milestone task M120 is planned to be started and finished. As can be seen in FIG. 26, milestone task M120 is planned to be started and finished after milestone task M110 is planned to be started and finished.

According to the embodiment, a user further interacts with project plan timeline 200 using a cursor control device, such as a computer mouse, and "drags," or otherwise moves, milestone task M120 to a position within Tom's resource indicator (i.e., resource indicator 230) that coincides with a position of milestone task M110 (where the user interaction is illustrated in FIG. 26 as an arrow). In response to the user interaction, the visual task assignment system modifies a planned start date-time and planned finish date-time of milestone task M120 to be identical to a planned start date-time and planned finish date-time of milestone task M110.

Figure 27:
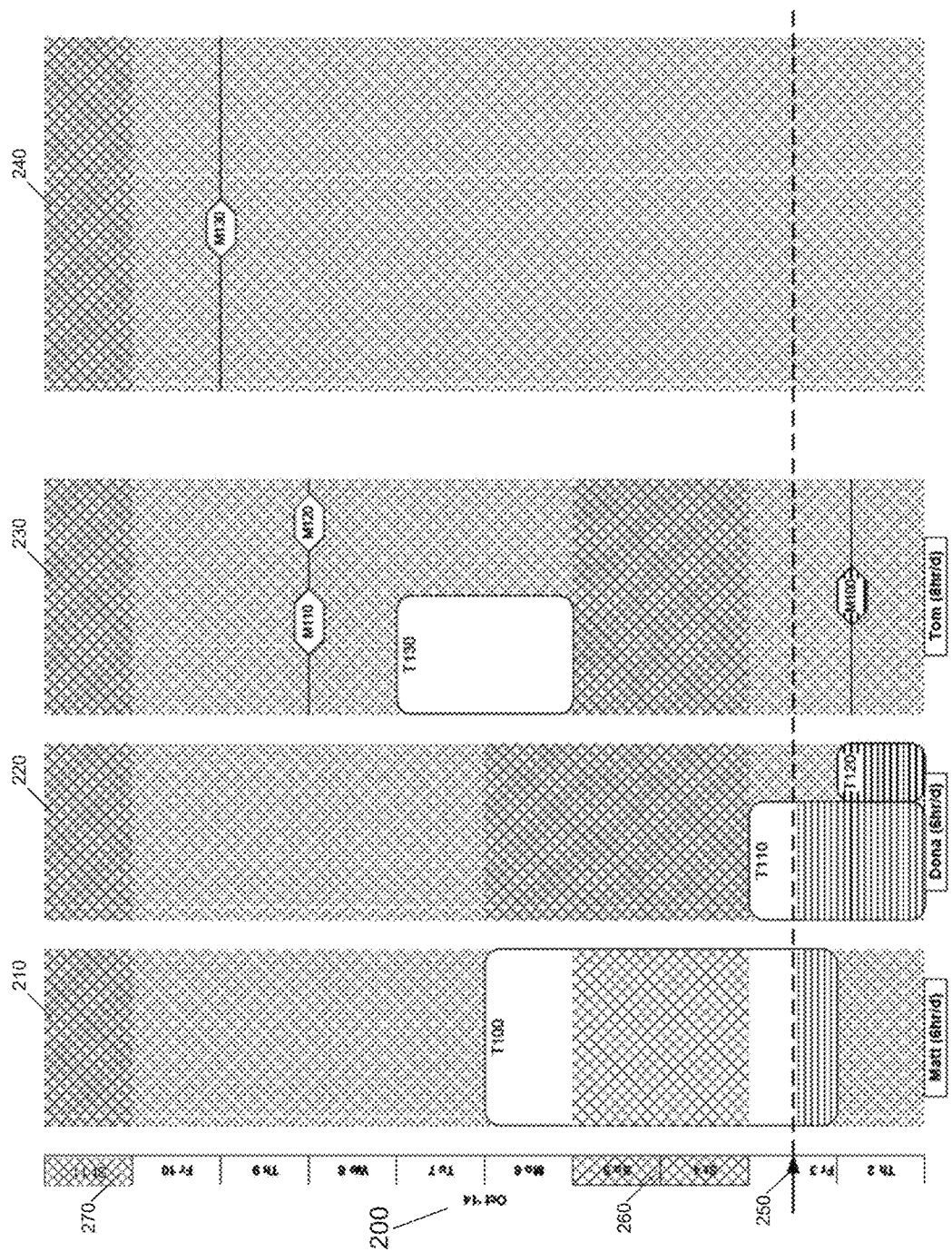
FIG. 27 illustrates a project plan timeline that is displayed by a visual task assignment system, where a position of a second milestone task coincides with a position of a first milestone task within the project plan timeline, according to an embodiment of the invention.

FIG. 27 illustrates project plan timeline 200 that is displayed by a visual task assignment system, where a position of milestone task M120 coincides with a position of milestone task M110 within project plan timeline 200, according to an embodiment of the invention. As illustrated in FIG. 27, the visual task assignment system modifies a display of milestone tasks M110 and M120 based on the user interaction previously described in conjunction with FIG. 26. More specifically, the visual assignment system displays milestone tasks M110 and M120 on a single line.

In one embodiment, the visual task assignment system can further display, or otherwise visually depict, a flow of incoming work for distinct work types within a user interface, where the flow of incoming work can be continuous. The visual task assignment system can further display, or otherwise visually depict, work parameters associated with the incoming work within the user interface. Such work parameters can include: (a) pending work for each date-time period and for each type of work; (b) incoming work for each date-time period and for each type of work; (c) a work-time allocation to resources for each date-time period and for each type of work; (d) a current progress of work resource-wise for a current date-time period and for each type of work; (e) a resource-wise productivity for each date-time period and for each type of work; (f) an available resource bandwidth for a current date-time period and future date-time periods; or (g) an estimated incoming work for future date-time periods. The visual task assignment system can further allow a user to interact with the user interface and visually allocate and un-allocate different types of work for any date-time period (i.e., current date-time period or future date-time periods) to one or more resources. Thus, the visual task assignment system can allow a user to effectively perform task management and resource planning from a single user interface.

Figure 28:
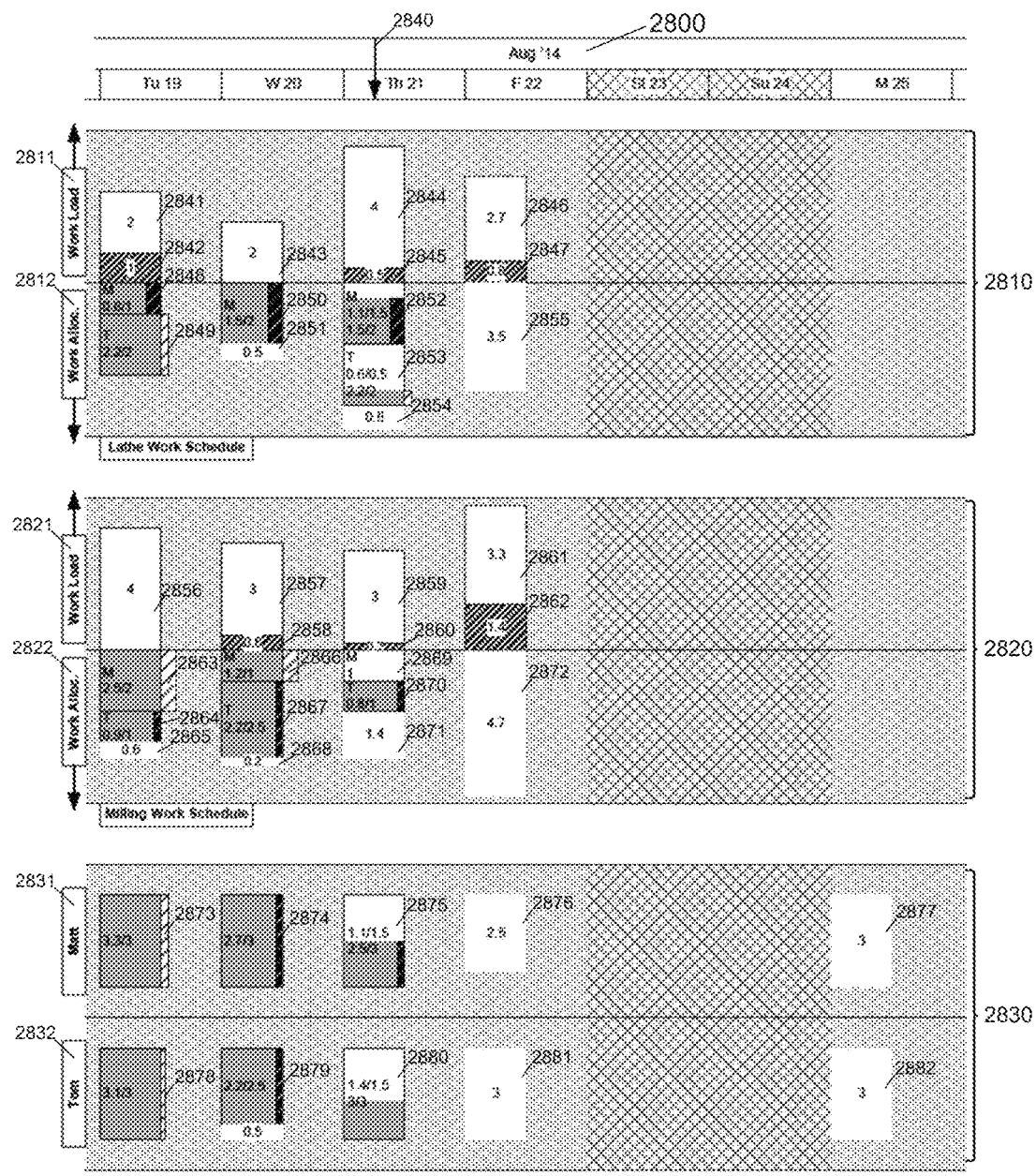
FIG. 28 illustrates a project plan timeline that is displayed by a visual task assignment system, where the project plan timeline includes work channels and a resource channel, according to an embodiment of the invention.

FIG. 28 illustrates a project plan timeline 2800 that is displayed by a visual task assignment system, where project plan timeline 2800 includes work channels 2810 and 2820, a resource channel 2830, and a current date-time indicator 2840 that visually represents a current date-time. Work channels 2810 and 2820 are examples of a work channel, where a work channel is a region that is displayed parallel to project plan timeline 2800 within the user interface, and where a work channel visually represents a type of work. In the illustrated embodiment, work channel 2810 is a lathe work channel that visually represents lathe work, and work channel 2820 is a milling work channel that visually represents milling work. While two work channels (i.e., work channels 2810 and 2820) are displayed within project plan timeline 2800 in the illustrated embodiment of FIG. 28, this is only an example embodiment, and, in alternate embodiments, any number of work channels can be displayed within a project plan timeline. Further, in alternate embodiments, only some of the work channels can be displayed within a project plan timeline, and a user can interact with the user interface to cause the user interface to scroll within the project plan timeline to display the other work channels.

In accordance with an embodiment, a work channel includes two work sub-channels: a new-incoming/pending work ("NIPW") sub-channel that visually represents work that is either newly incoming or pending; and a resource-allocated/completed work ("RACW") sub-channel that visually represents work that is either allocated to a resource or completed by a resource. The visual task assignment system can display the two work sub-channels, and can further display a horizontal axis line between the two work sub-channels. In the illustrated embodiment, lathe work channel 2810 includes lathe NIPW sub-channel 2811 and lathe RACW sub-channel 2812. Further, in the illustrated embodiment, milling work channel 2820 includes milling NIPW sub-channel 2821 and milling RACW sub-channel 2822.

Resource channel 2830 is an example of a resource channel, where a resource channel is a region that is displayed parallel to project plan timeline 2800 within the user interface, and where a resource channel visually represents one or more available resources. In accordance with an embodiment, a resource channel includes one or more resource sub-channels, where a resource sub-channel visually represents an available resource. The visual task assignment system can display the one or more resource sub-channels, and can further display one or more horizontal axis lines between the one or more resource sub-channels. In the illustrated embodiment, resource channel 2830 includes resource Matt sub-channel 2831 and resource Tom sub-channel 2832. While two resource sub-channels (i.e., resource Matt sub-channel 2831 and resource Tom sub-channel 2832) are displayed within project plan timeline 2800 in the illustrated embodiment of FIG. 28, this is only an example embodiment, and, in alternate embodiments, any number of resource sub-channels can be displayed within a project plan timeline. Further, in alternate embodiments, only some of the resource sub-channels can be displayed within a project plan timeline, and a user can interact with the user interface to cause the user interface to scroll within the project plan timeline to display the other resource sub-channels.

In accordance with the illustrated embodiment of FIG. 28, lathe NIPW sub-channel 2811 includes work indicators 2841, 2842, 2843, 2844, 2845, 2846, and 2847. A work indicator visually represents an amount of work for a specified work type and for a specified date-time period. In the illustrated embodiment, the date-time period is a day, but in alternate embodiments, a date-time period can be any duration, such as an hour, a week, etc. A height of a work indicator is defined based on an amount of the work that the work indicator visually represents. Further, the amount of work is displayed as a numeral within the work indicator. In the illustrated embodiment, work indicators 2841, 2843, 2844, and 2846 are newly incoming work ("NI") indicators that visually represent an amount of newly incoming work for the specified date-time period. According to the embodiment, NI indicators are displayed in a first format (e.g., displayed as clear rectangular bars). Further, work indicators 2842, 2845, and 2847 are pending work ("P") indicators that visually represent an amount of pending work from a previous date-time period for a specified date-time period. According to the embodiment, P indicators are displayed in a second format (e.g., displayed as striped rectangular bars). Work indicators that represent an amount of work for future date-times (i.e., work indicators 2846 and 2847) are based on estimates of the visual task assignment system and can be displayed using a specified border format (e.g., displayed using dashed borders).

Similarly, milling NIPW sub-channel 2821 includes work indicators 2856, 2857, 2858, 2859, 2860, 2861, and 2862. In the illustrated embodiment, work indicators 2856, 2857, 2859, and 2861 are NI indicators that visually represent an amount of newly incoming work for the specified date-time period. Further, work indicators 2858, 2860, and 2862 are P indicators that visually represent an amount of pending work from a previous date-time period. Work indicators that represent an amount of work for future date-times (i.e., work indicators 2861 and 2862) are based on estimates of the visual task assignment system and can be displayed using a specified border format (e.g., displayed using dashed borders).

Further, in accordance with the illustrated embodiment of FIG. 28, lathe RACW sub-channel 2812 includes resource-wise ("R") indicators 2848, 2849, 2850, 2852, and 2853, where an R indicator visually represents an amount of work allocated to (or completed by) a specified resource for a specified date-time period. A height of an R indicator is defined based on an amount of work allocated to a specified resource for a specified date-time period, where an amount of work can be measured in units of work (e.g., hours of work). An R indicator can also visually represent a progress of a specified resource by displaying a colored fill of the R indicator (e.g., displaying a grey-colored fill). An R indicator that is completely filled with a colored fill visually indicates that an amount of work that was allocated to the specified resource for the specified date-time period has been completely consumed or performed. Similarly, an R indicator that is 30% filled with a colored fill visually indicates that only 30% of the allocated amount of work has been consumed or performed. An R indicator can also visually represent a productivity of a specified resource. If the productivity is more than 100% (i.e., more work is completed within a specified date-time period than an allocated standard amount of work), then a portion of the R indicator is shown as a protrusion with a specified format (e.g., white-colored and black-striped). Further, a width of the protrusion can be defined based on an additional percentage of productivity. For example, if the productivity was 120%, then the width of a protrusion of the R indicator is 20% of a width of the original R indicator. Similarly, if the productivity is less than 100% (i.e., less work is completed within a specified date-time period than an allocated standard amount of work), then a portion of the R indicator is shown as an intrusion with a specified format (e.g., black-colored and white-striped). Further, a width of the intrusion can be defined based on a delta productivity (i.e., a difference between an actual productivity and an expected productivity). For example, if the productivity was 90%, then a width of an intrusion of the R indicator is 10% of a width of the original R indicator. Further, a protrusion or intrusion can be a same height as that of the colored fill. This is because the colored fill shows actual progress (i.e., progress in terms of an amount of actual work consumed or performed or a duration of actual work consumed or performed), and productivity is only relevant to the actual progress. Thus, an amount of actual work performed by a specified resource for a specified date-time period can be denoted by a surface area of a color-filled portion of an R indicator, and increased by a surface area of a protrusion (or decreased by a surface area of an intrusion). Further, an R indicator can include information that can be displayed as text within the R indicator, where the information can include the following: a name of a resource; an amount of work actually performed during an actual date-time period/an allocated standard amount of work performed during the actual date-time period; and an estimated amount of work that will be performed in a specified date-time period/an allocated standard amount of work performed during the specified date-time period.

Lathe RACW sub-channel 2812 includes remaining work ("RW") indicators 2851, 2854, and 2855, where a RW indicator visually represents an amount of work that is remaining or un-allocated for a specified date-time period. A RW indicator can be displayed using a specified format (e.g., displaying as a white-colored borderless bar). A height of a RW indicator can be defined based on an amount of time a standard resource with 100% productivity would require to complete the amount of work remaining or un-allocated. Similarly, a surface area of a RW indicator can be defined based on the amount of work remaining or un-allocated. Thus, a height and surface area of an RW indicator for a current date-time period or future date-time period can be defined based on an estimation of an amount of work that would be performed at an end of a current date-time period based on each allocated resource's actual time spent and actual productivity. Similarly, milling RACW sub-channel 2822 includes R indicators 2863, 2864, 2866, 2867, 2869, and 2870. Milling RACW sub-channel 2822 further includes RW indicators 2865, 2868, 2871, and 2872.

Further, in accordance with the illustrated embodiment of FIG. 28, resource Matt sub-channel 2831 includes resource availability ("RA") indicators 2873, 2874, 2875, 2876, and 2877, where an RA indicator visually represents an availability of a specified resource for a specified date-time period. A height of an RA indicator is defined based on a specified resource's availability for a specified date-time period. Similar to an R indicator, an RA indicator can include a colored fill that visually indicates a progress of work that has been allocated to a specified resource, and a protrusion (or intrusion) that visually indicates overall productivity of the specified resource (i.e., productivity of all the types of work that have been allocated to the specified resource). According to the embodiment, an allocated portion of a resource's availability can be visually represented as a portion of a RA indicator that is displayed using a first format (e.g., displayed as a bordered white bar), and an unallocated portion of the resource's availability can be visually represented as a portion of the RA indicator that is displayed using a second format (e.g., displayed as a borderless white bar). Further, an RA indicator can include information that can be displayed as text within the RA indicator, where the information can include the following: overall actual work performed/overall actual time spent; an estimated overall actual work that is to be performed if a specified resource works a full duration of allocated time/overall allocated time. Further, inside an RA indicator, if there is any unallocated time, the amount of time can be textually displayed within the RA indicator, and a portion of the RA indicator can be displayed using a specified format (e.g., displayed as white-colored and borderless). Similarly, resource Tom sub-channel 2832 includes RA indicators 2878, 2879, 2880, 2881, and 2882.

Thus, in the illustrated embodiment of FIG. 28, RA indicator 2873 visually indicates that, on August 19, resource Matt performed 3.3 units of work (e.g., hours of work) and had a capacity of 3 units of work (e.g., 3 hours of work). Because Matt's productivity on August 19 was above 100%, a portion of RA indicator 2873 is a protrusion. Further, RA indicator 2874 visually indicates that, on August 20, resource Matt performed 2.7 units of work and had a capacity of 3 units of work. Because Matt's productivity on August 20 was below 100%, a portion of RA indicator 2874 is an intrusion. RA indicator 2875 visually indicates that on August 21 (i.e., a current day), resource Matt performed 1.1 units of work with a capacity of 1.5 units of work, and is expected to perform 2.5 units of work with an expected capacity of 3 units of work. Because Matt's expected productivity on August 21 is below 100%, a portion of RA indicator 2875 is an intrusion. RA indicator 2876 visually indicates that, on August 22, resource Matt's expected capacity is 2.5 units of work. Further, RA indicator 2877 visually indicates that, on August 25, resource Matt's expected capacity is 3 units of work.

Similarly, in the illustrated embodiment of FIG. 28, RA indicator 2878 visually indicates that, on August 19, resource Tom performed 3.1 units of work and had a capacity of 3 units of work. Because Tom's productivity on August 19 was above 100%, a portion of RA indicator 2878 is a protrusion. Further, RA indicator 2879 visually indicates that, on August 20, resource Tom performed 2.2 units of work and had a capacity of 2.5 units of work, where resource Tom had an additional capacity of 0.5 units of work that were not allocated to any tasks. Because Tom's productivity on August 20 was below 100%, a portion of RA indicator 2879 is an intrusion. RA indicator 2880 visually indicates that on August 21 (i.e., a current day), resource Tom performed 1.4 units of work with a capacity of 1.5 units of work, and is expected to perform 3 units of work with a capacity of 3 units of work. Because Tom's expected productivity on August 21 is 100%, RA indicator 2880 does not include either a protrusion or an intrusion. RA indicator 2881 visually indicates that, on August 22, resource Tom's expected capacity is 3 units of work. Further, RA indicator 2882 visually indicates that, on August 25, resource Tom's expected capacity is 3 units of work.

Further, in the illustrated embodiment of FIG. 28, NI indicator 2841 visually indicates that, on August 19, 2 units of lathe work has come in. P indicator 2842 further visually indicates that, on August 19, 1 unit of lathe work is pending from a previous day. Further, R indicator 2848 visually indicates that, on August 19, resource Matt has been allocated 1 unit of lathe work, and resource Matt has completed 0.8 units of lathe work. Because Matt's productivity on August 19 was under 100%, a portion of R indicator 2848 is an intrusion. R indicator 2849 visually indicates that, on August 19, resource Tom has been allocated 2 units of lathe work, and resource Tom has completed 2.2 units of lathe work. Because Tom's productivity on August 19 was above 100%, a portion of R indicator 2849 is a protrusion.

NI indicator 2843 further visually indicates that, on August 20, 2 units of lathe work has come in. Further, R indicator 2850 visually indicates that, on August 20, resource Matt has been allocated 2 units of lathe work, and resource Matt has completed 1.5 units of lathe work. Because Matt's productivity on August 20 was under 100%, a portion of R indicator 2850 is an intrusion. RW indicator 2851 visually indicates that, on August 20, 0.5 units of lathe work has not been allocated to any resource.

NI indicator 2844 further visually indicates that, on August 21, 4 units of lathe work has come in. P indicator 2845 further visually indicates that, on August 21, 0.5 units of lathe work is pending from a previous day. Further, R indicator 2852 visually indicates that, on August 21, resource Matt has been allocated 1.5 units of lathe work, resource Matt has completed 1.1 units of lathe work, resource Matt is expected to be allocated a total of 2 units of lathe work, and resource Matt is expected to complete a total of 1.5 units of lathe work. Because Matt's expected productivity on August 21 is under 100%, a portion of R indicator 2852 is an intrusion. R indicator 2853 visually indicates that, on August 21, resource Tom has been allocated 0.5 units of lathe work, resource Tom has completed 0.6 units of lathe work, resource Tom is expected to be allocated a total of 2 units of lathe work, and resource Tom is expected to complete a total of 2.2 units of lathe work. Because Tom's expected productivity on August 21 is above 100%, a portion of R indicator 2853 is a protrusion. RW indicator 2854 visually indicates that, on August 21, 0.8 units of lathe work has not been allocated to any resource.

NI indicator 2846 further visually indicates that, on August 22, 2.7 units of lathe work is expected to come in. P indicator 2847 further visually indicates that, on August 22, 0.8 units of lathe work is expected to be pending from a previous day. Further, RW indicator 2855 visually indicates that, on August 22, 3.5 units of lathe work is expected to have not been allocated to any resource.

Further, in the illustrated embodiment of FIG. 28, NI indicator 2856 visually indicates that, on August 19, 4 units of milling work has come in. Further, R indicator 2863 visually indicates that, on August 19, resource Matt has been allocated 2 units of milling work, and resource Matt has completed 2.5 units of milling work. Because Matt's productivity on August 19 was above 100%, a portion of R indicator 2863 is a protrusion. R indicator 2864 visually indicates that, on August 19, resource Tom has been allocated 1 unit of milling work, and resource Tom has completed 0.9 units of milling work. Because Tom's productivity on August 19 was below 100%, a portion of R indicator 2864 is an intrusion. RW indicator 2865 visually indicates that, on August 21, 0.6 units of milling work has not been allocated to any resource.

NI indicator 2857 further visually indicates that, on August 20, 3 units of milling work has come in. P indicator 2858 further visually indicates that, on August 20, 0.6 units of milling work is pending from a previous day. Further, R indicator 2866 visually indicates that, on August 20, resource Matt has been allocated 1 unit of milling work, and resource Matt has completed 1.2 units of milling work. Because Matt's productivity on August 20 was above 100%, a portion of R indicator 2866 is a protrusion. R indicator 2867 further visually indicates that, on August 20, resource Tom has been allocated 2.5 units of milling work, and resource Tom has completed 2.2 units of milling work. Because Tom's productivity on August 20 was below 100%, a portion of R indicator 2867 is an intrusion. RW indicator 2868 visually indicates that, on August 20, 0.2 units of milling work has not been allocated to any resource.

NI indicator 2859 further visually indicates that, on August 21, 3 units of milling work has come in. P indicator 2860 further visually indicates that, on August 21, 0.2 units of milling work is pending from a previous day. Further, R indicator 2869 visually indicates that, on August 21, resource Matt has been allocated 1 unit of milling work, and resource Matt has not yet completed any milling work. Because Matt has not yet completed any milling work, R indicator 2869 does not include a protrusion or an intrusion. R indicator 2870 visually indicates that, on August 21, resource Tom has been allocated 1 unit of milling work, and resource Tom has completed 0.8 units of milling work. Because Tom's productivity on August 21 is below 100%, a portion of R indicator 2870 is an intrusion. RW indicator 2871 visually indicates that, on August 21, 1.4 units of milling work has not been allocated to any resource.

NI indicator 2861 further visually indicates that, on August 22, 3.3 units of milling work is expected to come in. P indicator 2862 further visually indicates that, on August 22, 1.4 units of milling work is expected to be pending from a previous day. Further, R indicator 2872 visually indicates that, on August 22, 4.7 units of milling work has not yet been allocated to any resource.

Figure 29:
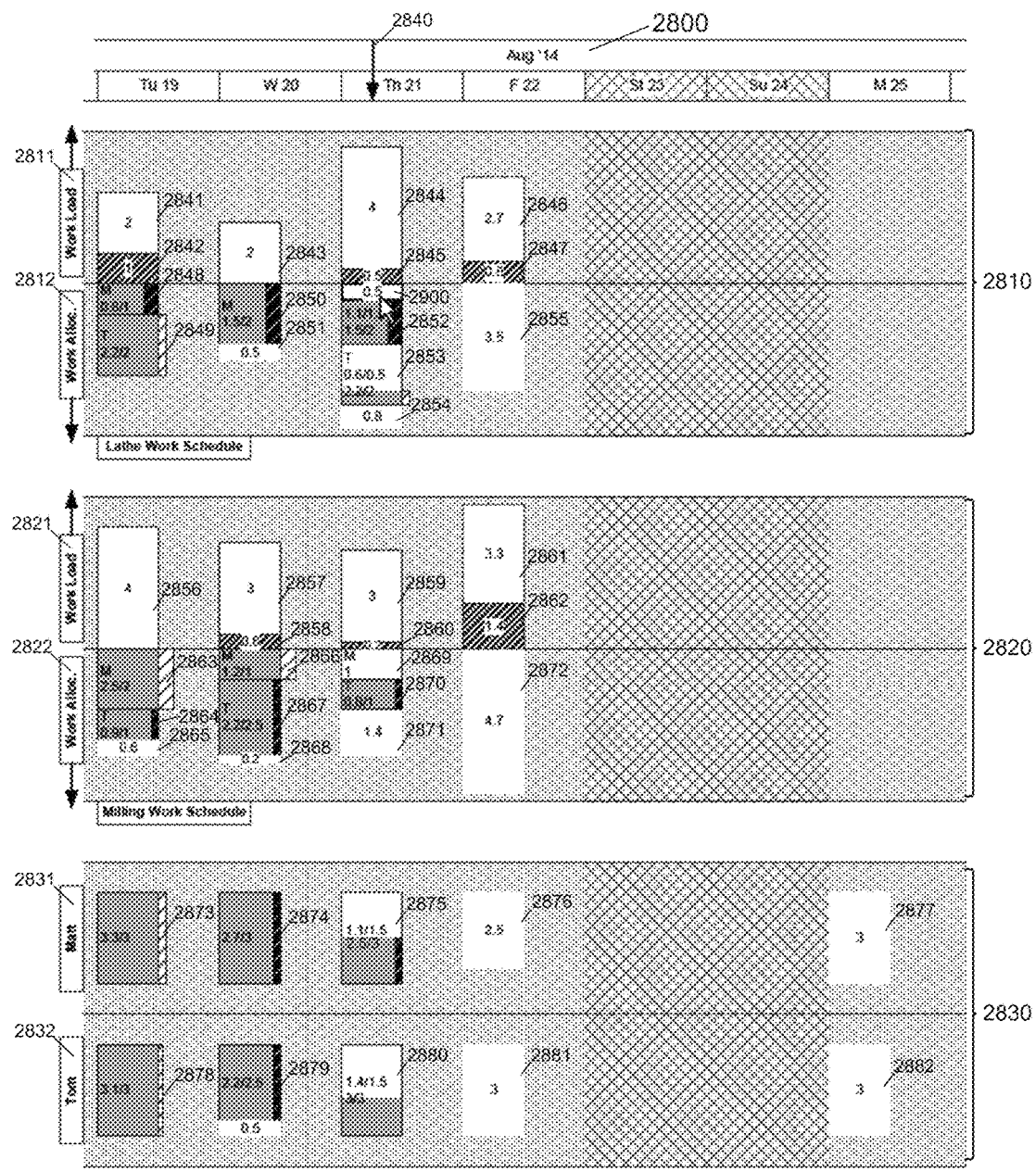
FIG. 29 illustrates a project plan timeline that is displayed by a visual task assignment system, where a portion of an availability of a resource that is allocated to a work type is highlighted, according to an embodiment of the invention.

FIG. 29 illustrates project plan timeline 2800 that is displayed by a visual task assignment system, where a portion of resource Matt's un-utilized allocation to a lathe work type is highlighted, according to an embodiment of the invention. As illustrated in FIG. 29, on August 21, NI indicator 2844 visually indicates that there are 4 units of new lathe work to be performed, P indicator 2845 visually indicates that there are 0.5 units of pending lathe work to be performed, NI work indicator 2859 visually indicates that there are 3 units of new milling work to be performed, and P work indicator 2860 visually indicates that there are 0.2 units of pending milling work to be performed. In other words, NI indicator 2844 and P indicator 2855 collectively indicate that there are 4.5 units of total lathe work to be performed, and NI indicator 2859 and P indicator 2060 collectively indicate that there are 3.2 units of total milling work to be performed. Further, as illustrated in FIG. 29, on August 21, R indicator 2852 visually indicates that resource Matt is allocated 2 units of lathe work, R indicator 2853 visually indicates that resource Tom is allocated 2 units of lathe work, R indicator 2869 visually indicates that resource Matt is allocated 1 unit of milling work, and R indicator 2870 visually indicates that resource Matt is allocated 1 unit of milling work. R indicator 2852 further visually indicates that out of 1.5 units of milling work that have been allocated to resource Matt, resource Matt has completed 1.1 units of milling work.

According to an embodiment, a user can review project plan timeline 2800 and determine whether re-allocating work among resources Matt and Tom will increase overall productivity. If so, the user can interact with project plan timeline 2800 in order to re-allocate work from resource Matt to resource Tom or vice-versa. More specifically, a user can review project plan timeline and identify the following: R indicator 2848 visually indicates that, on August 19, resource Matt was allocated 1 unit of lathe work and performed 0.8 units of lathe work; R indicator 2850 visually indicates that, on August 19, resource Matt was allocated 2 units of lathe work and performed 1.5 units of lathe work; R indicator 2863 visually indicates that, on August 19, resource Matt was allocated 2 units of milling work and performed 2.5 units of milling work; and R indicator 2866 visually indicates that, on August 20, resource Matt was allocated 1 unit of milling work and performed 1.2 units of milling work. Thus, a user can determine that, historically, resource Matt is less than 100% productive in lathe work, and is more than 100% productive in milling work. Further, the user may wish to re-allocate some or all of resource Matt's un-utilized time allocated for lathe work so that resource Matt spends its remaining time for August 21 performing milling work rather than lathe work. Thus, according to the embodiment, the user interacts with project plan timeline 2800 using a cursor control device, such as a computer mouse, and "clicks on," or otherwise selects, a portion of R indicator 2852. In response to the user interaction, the visual task assignment system displays R indicator 2900 which visually represents a selected portion of R indicator 2852, where R indicator 2900 can be displayed with a specified border format (e.g., displayed with a thick black border).

Figure 30:
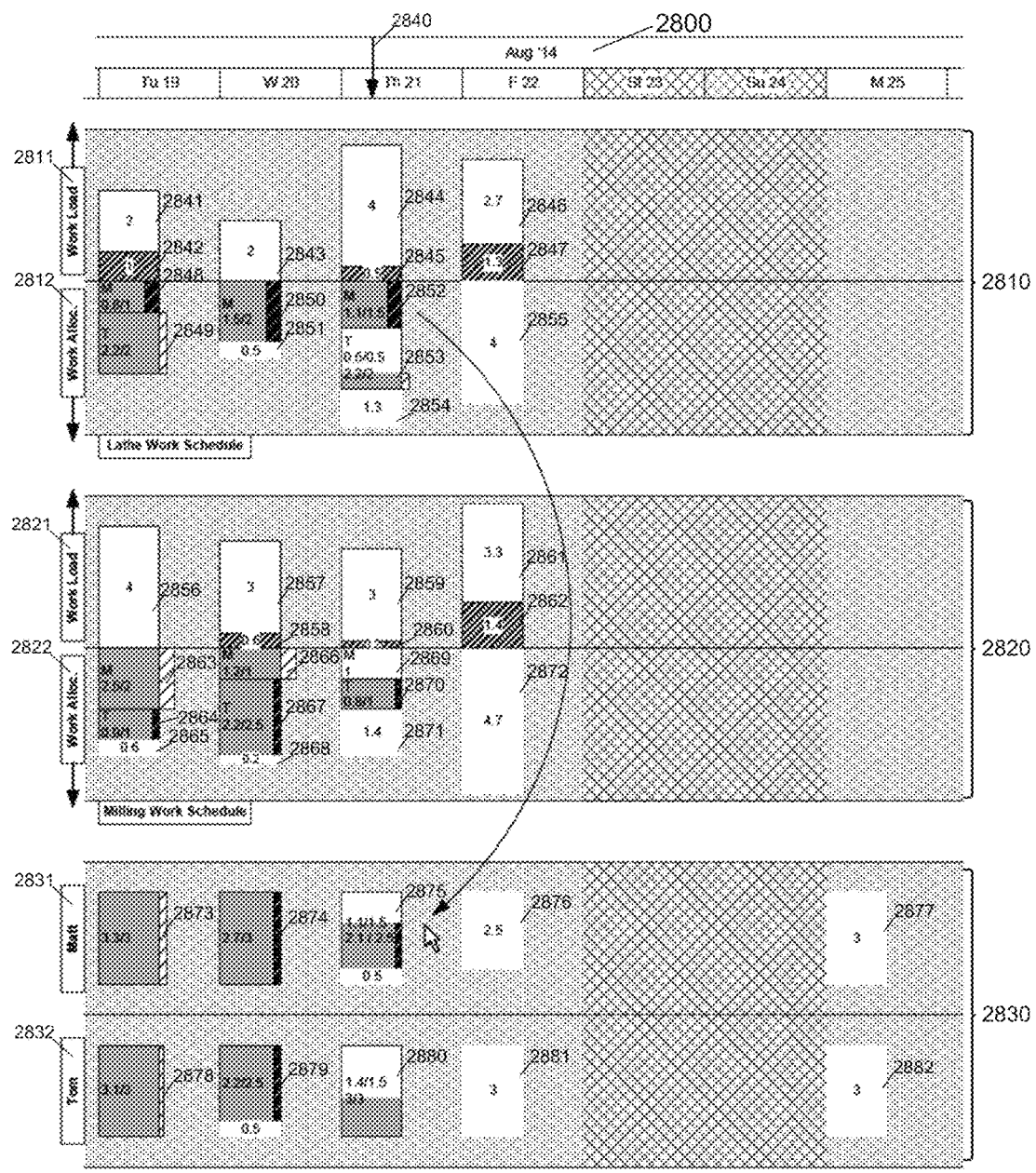
FIG. 30 illustrates a project plan timeline that is displayed by a visual task assignment system, where a highlighted portion of an availability of a resource is unallocated from a work type, according to an embodiment of the invention.

FIG. 30 illustrates project plan timeline 2800 that is displayed by a visual task assignment system, where a portion of resource Matt's availability visually represented by R indicator 2900 of FIG. 29 is unallocated from a lathe work type, according to an embodiment of the invention. According to the embodiment, a user interacts with project plan timeline 2800 using a cursor control device, such as a computer mouse, and "drags," or otherwise moves, R indicator 2900 of FIG. 29 from R indicator 2852 to RA indicator 2875, or any portion of resource Matt sub-channel 2831 (where the user interaction is illustrated in FIG. 30 as an arrow). In response to the user interaction, the visual task assignment system un-allocates 0.5 units of lathe work from resource Matt.

The un-allocation of 0.5 units of lathe work modifies an expected allocated total amount for resource Matt for August 21 from 2 units of lathe work to 1.5 units of lathe work, and an expected completed total amount for resource Matt from 1.5 units of lathe work to 1.1 units of lathe work. Thus, the visual task assignment system modifies a display of R indicator 2852, where R indicator 2852 visually represents 1.5 units of lathe work that is expected to be allocated to resource Matt for August 21, and 1.1 units of lathe work that is expected to be completed by resource Matt for August 21. The un-allocation of 0.5 units of lathe work further modifies an amount of lathe work for August 21 that has not been allocated to any resource from 0.8 units to 1.3 units. Thus, the visual task assignment system modifies a display of RW indicator 2854, where RW indicator 2854 visually represents 1.3 units of lathe work for August 21 that has not been allocated to any resource. The un-allocation of 0.5 units of lathe work further modifies an expected amount of performed work for resource Matt for August 21 from 2.5 units of work to 2.1 units of work, an expected capacity for resource Matt for August 21 from 3 units of work to 2.5 units of work, and an expected unallocated amount of work from 0 units of work to 0.5 units of work. Thus, the visual task assignment system modifies a display of RA indicator 2875, where RA indicator 2875 visually represents: an expected amount of performed work for resource Matt for August 21 of 2.1 units of work; an expected capacity for resource Matt for August 21 of 2.5 units of work; and an expected unallocated amount of work of 0.5 units of work. The un-allocation of 0.5 units of lathe work further modifies an expected pending amount of lathe work for August 22 from 0.8 units of work to 1.3 units of work, and further modifies an expected amount of lathe work that has not been allocated to any resource for August 22 from 3.5 units of work to 4 units of work. Thus, the visual task assignment system modifies a display of P indicator 2847, where P indicator 2847 visually represents 1.3 units of pending lathe work for August 22, and the visual task assignment system further modifies a display of RW indicator 2855, where RW indicator 2855 visually represents 4 units of work that is not yet been allocated to any resource.

Figure 31:
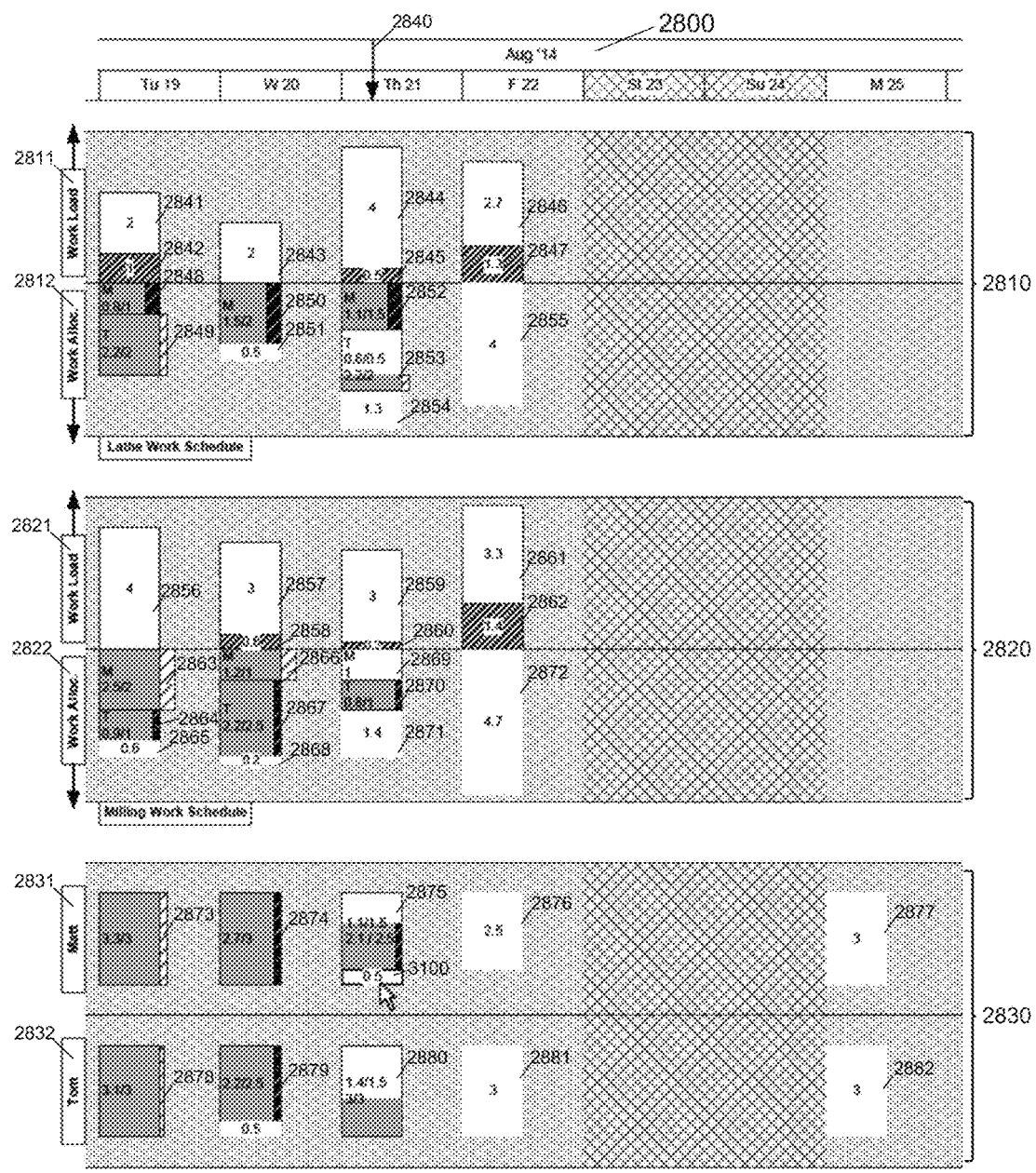
FIG. 31 illustrates a project plan timeline that is displayed by a visual task assignment system, where a portion of an availability of a resource is highlighted, according to an embodiment of the invention.

FIG. 31 illustrates project plan timeline 2800 that is displayed by a visual task assignment system, where a portion of resource Matt's availability is highlighted, according to an embodiment of the invention. According to the embodiment, the user interacts with project plan timeline 2800 using a cursor control device, such as a computer mouse, and "clicks on," or otherwise selects, a portion of RA indicator 2875, where the portion of RA indicator 2875 visually represents the 0.5 units of lathe work that were previously un-allocated from resource Matt. In response to the user interaction, the visual task assignment system displays RA indicator 3100 which represents a selected portion of RA indicator 2875, where RA indicator 3100 can be displayed with a specified border format (e.g., displayed with a thick black border).

Figure 32:
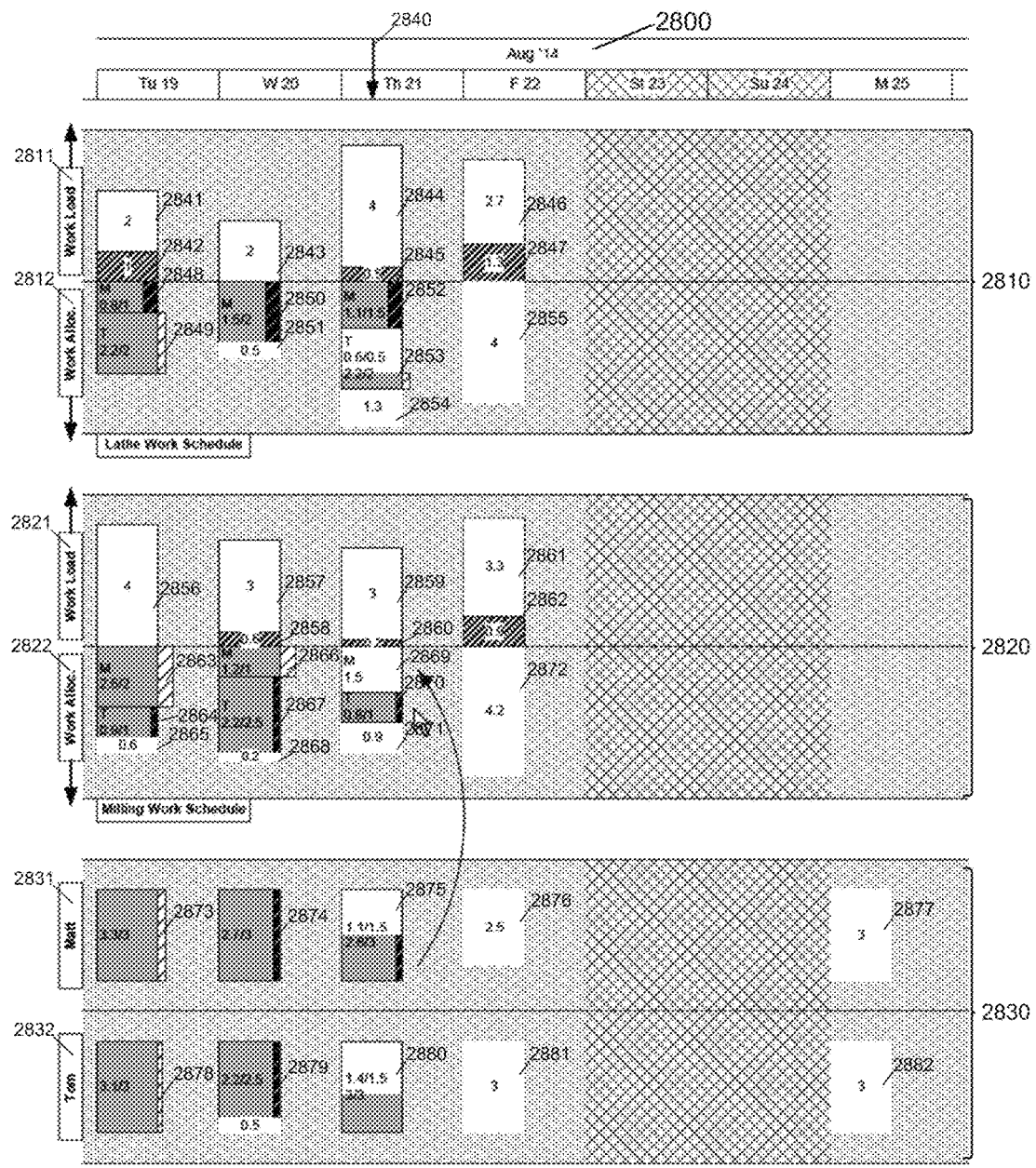
FIG. 32 illustrates a project plan timeline that is displayed by a visual task assignment system, where a highlighted portion of an availability of a resource is allocated to a work type, according to an embodiment of the invention.

FIG. 32 illustrates project plan timeline 2800 that is displayed by a visual task assignment system, where a highlighted portion of resource Matt's availability is allocated to a milling work type, according to an embodiment of the invention. According to the embodiment, a user interacts with project plan timeline 2800 using a cursor control device, such as a computer mouse, and "drags," or otherwise moves, RA indicator 3100 of FIG. 31 from RA indicator 2875 to R indicator 2869, or any portion of milling RACW sub-channel 2822 (where the user interaction is illustrated in FIG. 32 as an arrow). In response to the user interaction, the visual task assignment system allocates 0.5 units of milling work to resource Matt.

The allocation of 0.5 units of milling work modifies an allocated amount for resource Matt for August 21 from 1 unit of milling work to 1.5 units of milling work. Thus, the visual task assignment system modifies a display of R indicator 2869, where R indicator 2852 visually represents 1.5 units of milling work that is allocated to resource Matt for August 21. The allocation of 0.5 units of milling work further modifies an amount of milling work for August 21 that has not been allocated to any resource from 1.4 units to 0.9 units. Thus, the visual task assignment system modifies a display of RW indicator 2871, where RW indicator 2871 visually represents 0.9 units of milling work for August 21 that has not been allocated to any resource. The allocation of 0.5 units of milling work further modifies an expected amount of performed work for resource Matt for August 21 from 2.1 units of work to 2.6 units of work, an expected capacity for resource Matt for August 21 from 2.5 units of work to 3 units of work, and an expected unallocated amount of work from 0.5 units of work to 0 units of work. Thus, the visual task assignment system modifies a display of RA indicator 2875, where RA indicator 2875 visually represents: an expected amount of performed work for resource Matt for August 21 of 2.6 units of work; and an expected capacity for resource Matt for August 21 of 3 units of work. The allocation of 0.5 units of milling work further modifies an expected pending amount of milling work for August 22 from 1.4 units of work to 0.9 units of work, and further modifies an expected amount of milling work that has not been allocated to any resource for August 22 from 4.7 units of work to 4.2 units of work. Thus, the visual task assignment system modifies a display of P indicator 2862, where P indicator 2862 visually represents 0.9 units of pending milling work for August 22, and the visual task assignment system further modifies a display of RW indicator 2872, where RW indicator 2872 visually represents 4.2 units of work that is not expected to be allocated to any resource.

Embodiments described in conjunction with FIGS. 29-32 address un-allocation and reallocation of work for a current date-time period. Embodiments that are further described below in conjunction with FIGS. 33-35 address un-allocation and reallocation of work for a future date-time period.

Figure 33:
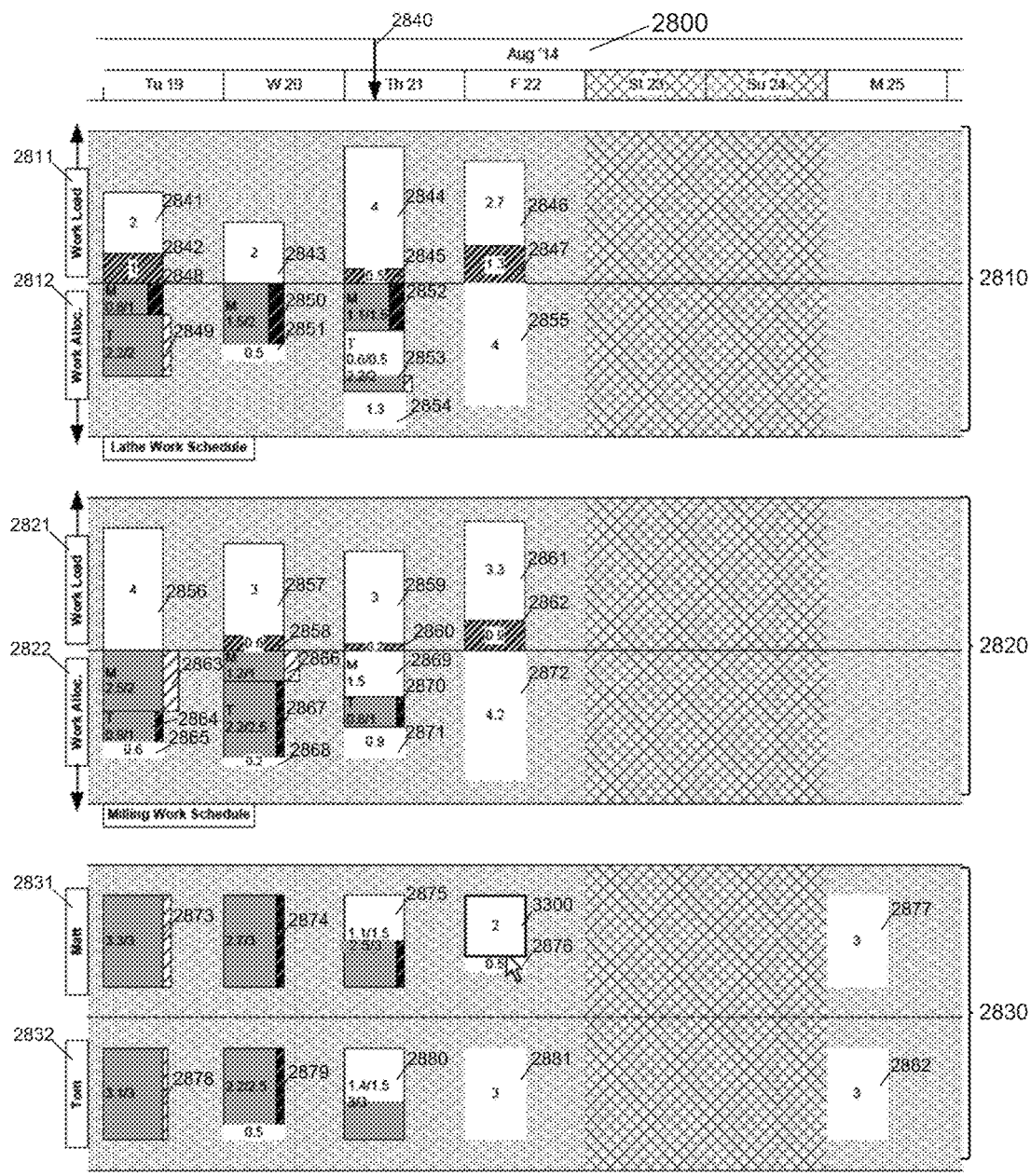
FIG. 33 illustrates a project plan timeline that is displayed by a visual task assignment system, where a portion of an availability at a future date-time of a resource is highlighted, according to another embodiment of the invention.

FIG. 33 illustrates project plan timeline 2800 that is displayed by a visual task assignment system, where a portion of resource Matt's availability at a future date-time is highlighted, according to another embodiment of the invention. According to the embodiment, the user interacts with project plan timeline 2800 using a cursor control device, such as a computer mouse, and "clicks on," or otherwise selects, a portion of RA indicator 2876, where the portion of RA indicator 2876 visually represents 2 units of availability or resource work capacity on a future date-time (e.g., August 22, as illustrated in FIG. 33). In response to the user interaction, the visual task assignment system displays RA indicator 3300 which visually represents a selected portion of RA indicator 2876, where RA indicator 3300 can be displayed with a specified border format (e.g., displayed with a thick black border). The visual task assignment system further modifies a display of RA indicator 2876, where RA indicator 2876 visually represents 0.5 units of work.

Figure 34:
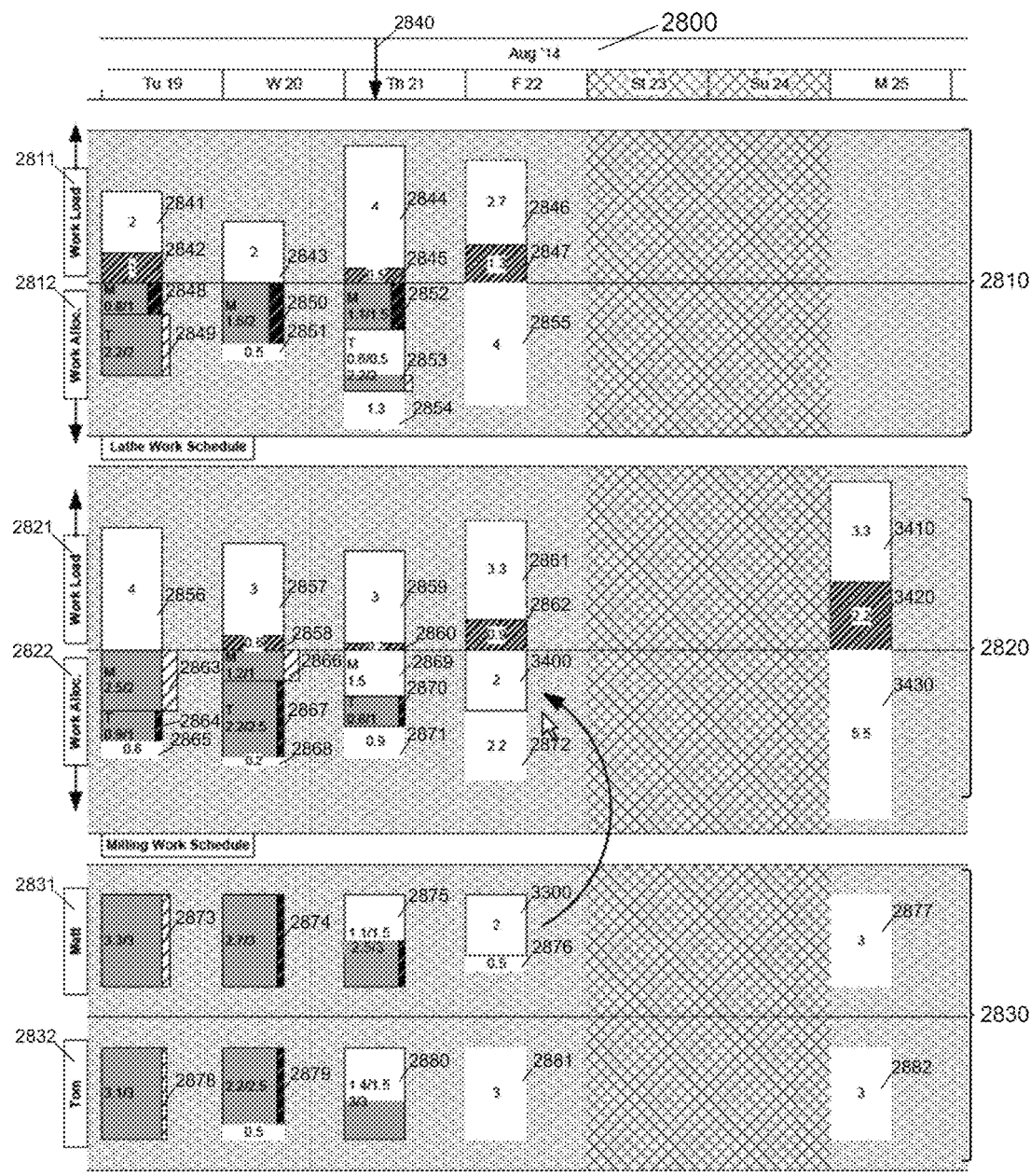
FIG. 34 illustrates a project plan timeline that is displayed by a visual task assignment system, where a highlighted portion of a future planned or expected availability of a resource is allocated to a planned work type, according to another embodiment of the invention.

FIG. 34 illustrates project plan timeline 2800 that is displayed by a visual task assignment system, where a highlighted portion of a future planned or expected availability of a resource is allocated to a milling work type, according to another embodiment of the invention (or another work type in an alternate embodiment). According to the embodiment, a user interacts with project plan timeline 2800 using a cursor control device, such as a computer mouse, and "drags," or otherwise moves, RA indicator 3300 from RA indicator 2876 to RW indicator 2872, or any portion of milling RACW sub-channel 2822 (where the user interaction is illustrated in FIG. 34 as an arrow). In response to the user interaction, the visual task assignment system allocates 2 units of milling work to resource Matt, where the 2 units of milling work are to be performed on August 22. The visual task assignment system further displays RW indicator 3400 which visually represents 2 units of milling work allocated to resource Matt. Further, the visual task assignment system modifies a display of RW indicator 2872, which visually represents 2.2 units of milling work not allocated to any resource. Even further, the visual task assignment system displays NI indicator 3410, P indicator 3420, and RW indicator 3430 for August 25, in response to advance planning for milling work for August 22 by the visual task assignment system.

Figure 35:
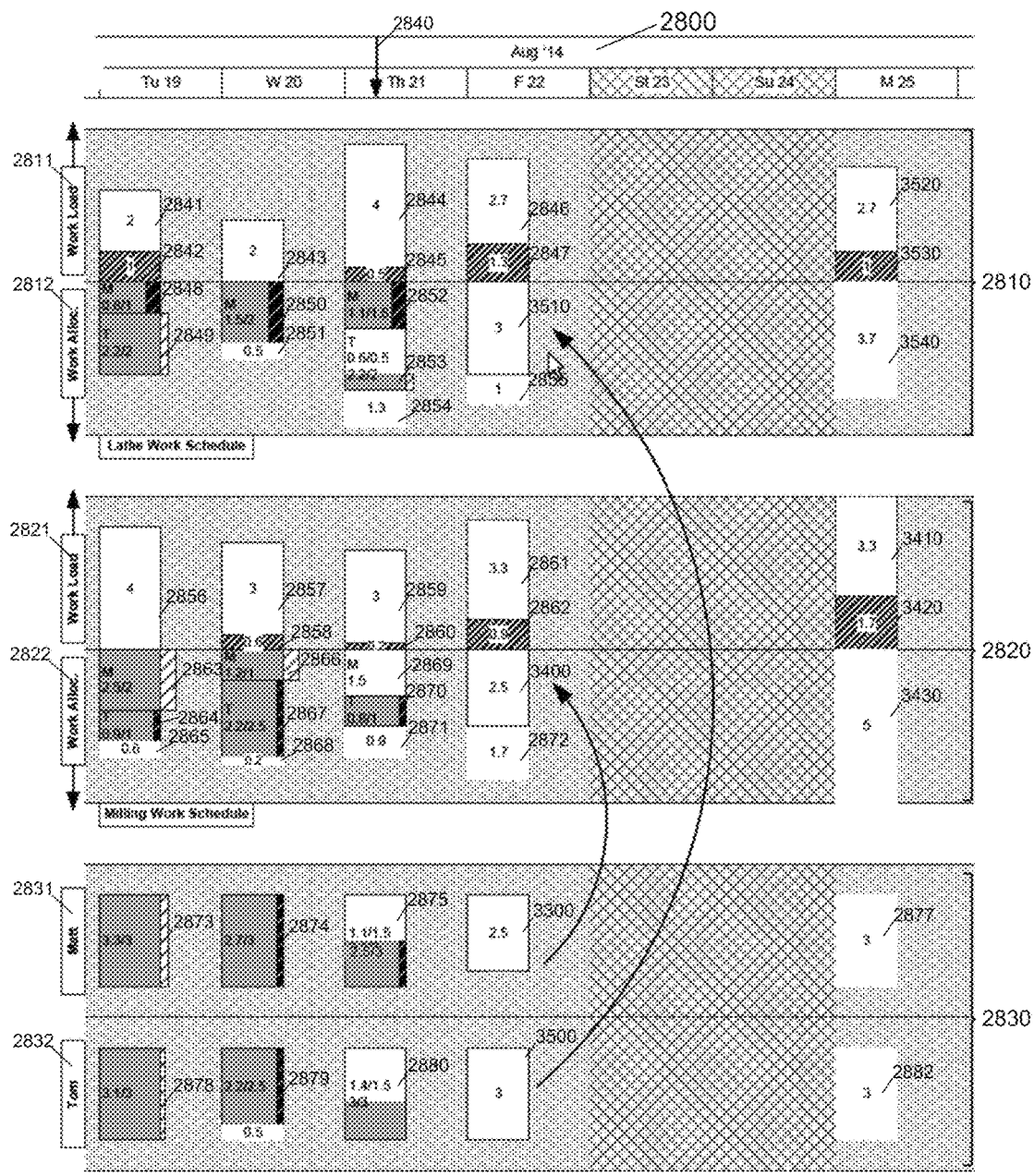
FIG. 35 illustrates a project plan timeline that is displayed by a visual task assignment system, where a first portion of a planned availability of a first resource is allocated to a first planned work type and a second portion of a planned availability of a second resource is allocated to a second planned work type, according to another embodiment of the invention.

FIG. 35 illustrates project plan timeline 2800 that is displayed by a visual task assignment system, where a portion of resource Matt's planned availability is allocated to a milling work type and a portion of resource Tom's planned availability is allocated to a lathe work type, according to another embodiment of the invention. In alternate embodiments, availability of alternate resources can be allocated to alternate work types. According to the embodiment, the user interacts with project plan timeline 2800 using a cursor control device, such as a computer mouse, and "clicks on," or otherwise selects, RA indicator 2876 of FIG. 34, where RA indicator 2876 of FIG. 34 visually represents a remaining 0.5 units of work. In response to the user interaction, the visual task assignment system modifies a display of RA indicator 3300, so that RA indicator 3300 visually represents 2.5 units of work (i.e., 2 units of work previously visually represented by RA indicator 3300 and 0.5 units of work previously visually represented by RA indicator 2876 of FIG. 34), where RA indicator 3300 can be displayed with a specified border format (e.g., displayed with a black border).

According to the embodiment, a user further interacts with project plan timeline 2800 using a cursor control device, such as a computer mouse, and "drags," or otherwise moves, RA indicator 3300 to RW indicator 3400, or any portion of milling RACW sub-channel 2822 (where the user interaction is illustrated in FIG. 35 as an arrow). In response to the user interaction, the visual task assignment system allocates an additional 0.5 units of milling work to resource Matt, where the additional 0.5 units of milling work are to be performed on August 22. The visual task assignment system further modifies a display of RW indicator 3400, where RW indicator 3400 visually represents 2.5 units of milling work allocated to resource Matt. Further, the visual task assignment system modifies a display of RW indicator 2872, which visually represents 1.7 units of milling work not allocated to any resource. Even further, the visual task assignment system modifies a display of P indicator 3420 and RW indicator 3430 for August 25, in response to advance planning for milling work for August 22 by the visual task assignment system.

According to the embodiment, the user interacts with project plan timeline 2800 using a cursor control device, such as a computer mouse, and "clicks on," or otherwise selects, RA indicator 2881 of FIG. 34, where RA indicator 2881 of FIG. 34 visually represents 3 units of work. In response to the user interaction, the visual task assignment system displays RA indicator 3500, where RA indicator 3500 visually represents 3 units of work previously visually represented by RA indicator 2881 of FIG. 34, and where RA indicator 3500 can be displayed with a specified border format (e.g., displayed with a thick black border).

According to the embodiment, a user further interacts with project plan timeline 2800 using a cursor control device, such as a computer mouse, and "drags," or otherwise moves, RA indicator 3500 to RW indicator 2855, or any portion of lathe RACW sub-channel 2812 (where the user interaction is illustrated in FIG. 35 as an arrow). In response to the user interaction, the visual task assignment system allocates 3 units of lathe work to resource Tom, where the 3 units of lathe work are to be performed on August 22. The visual task assignment system further displays RW indicator 3510 which visually represents 3 units of lathe work allocated to resource Tom. Further, the visual task assignment system modifies a display of RW indicator 2855, which visually represents 1 unit of lathe work not allocated to any resource. Even further, the visual task assignment system displays NI indicator 3520, P indicator 3530, and RW indicator 3540 for August 25, in response to advance planning for lathe work for August 22 by the visual task assignment system.

In the illustrated embodiments previously described, project plan timeline 2800 has been displayed to include 7 date-time periods (e.g., 7 days including 2 non-working days). However, in alternate embodiments, a project plan timeline can be displayed to include any number of date-time periods. Further, in alternate embodiments, a user can zoom within a project plan timeline, and based on a zoom level, a number of past and future date-time periods that are visible within the project plan timeline can be modified. Further, in alternate embodiments, a user can scroll within the project plan timeline to either past date-time periods or future date-time periods. Even further, in alternate embodiments, an indicator, such as an NI indicator, a P indicator, an R indicator, a RW indicator, or an RA indicator, can support drill-down viewing. For example, if a user "double-clicks on," or otherwise interacts with an indicator, the visual task assignment system can display a detailed drill-down view to visually indicate a breakdown of all new incoming work, incoming work which is in progress, an amount of progress, which incoming work is assigned to which resource, etc. Such a detailed view can be an overlay view, a pop-up view, or a separate view. Further, in one embodiment, the indicators in NIPW and RACW channels can be balanced on two sides of a middle axis, which can give the user a perception that an amount of incoming work is equal to an amount of work being allocated/completed/unallocated. Even further, in the illustrated embodiments previously described, project plan timeline 2800 has been displayed as a horizontal project plan timeline. However, in alternate embodiments, a project plan timeline 2800 can be displayed as a vertical project plan timeline, where all the channels are vertical channels, and all the indicators are horizontal indicators.

Figure 36:
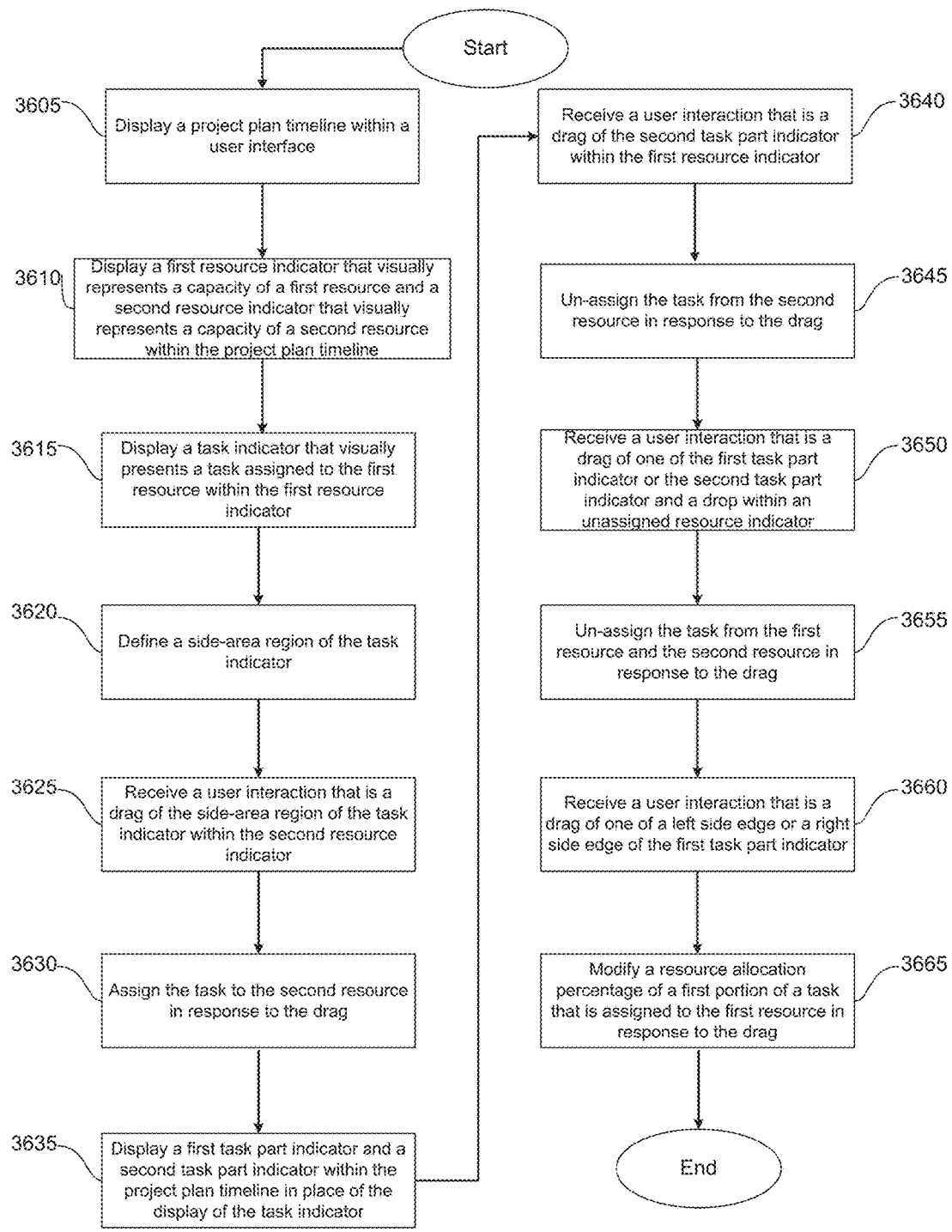
FIG. 36 illustrates a flow diagram of the functionality of a visual task assignment module, according to an embodiment of the invention.
Figure 37:
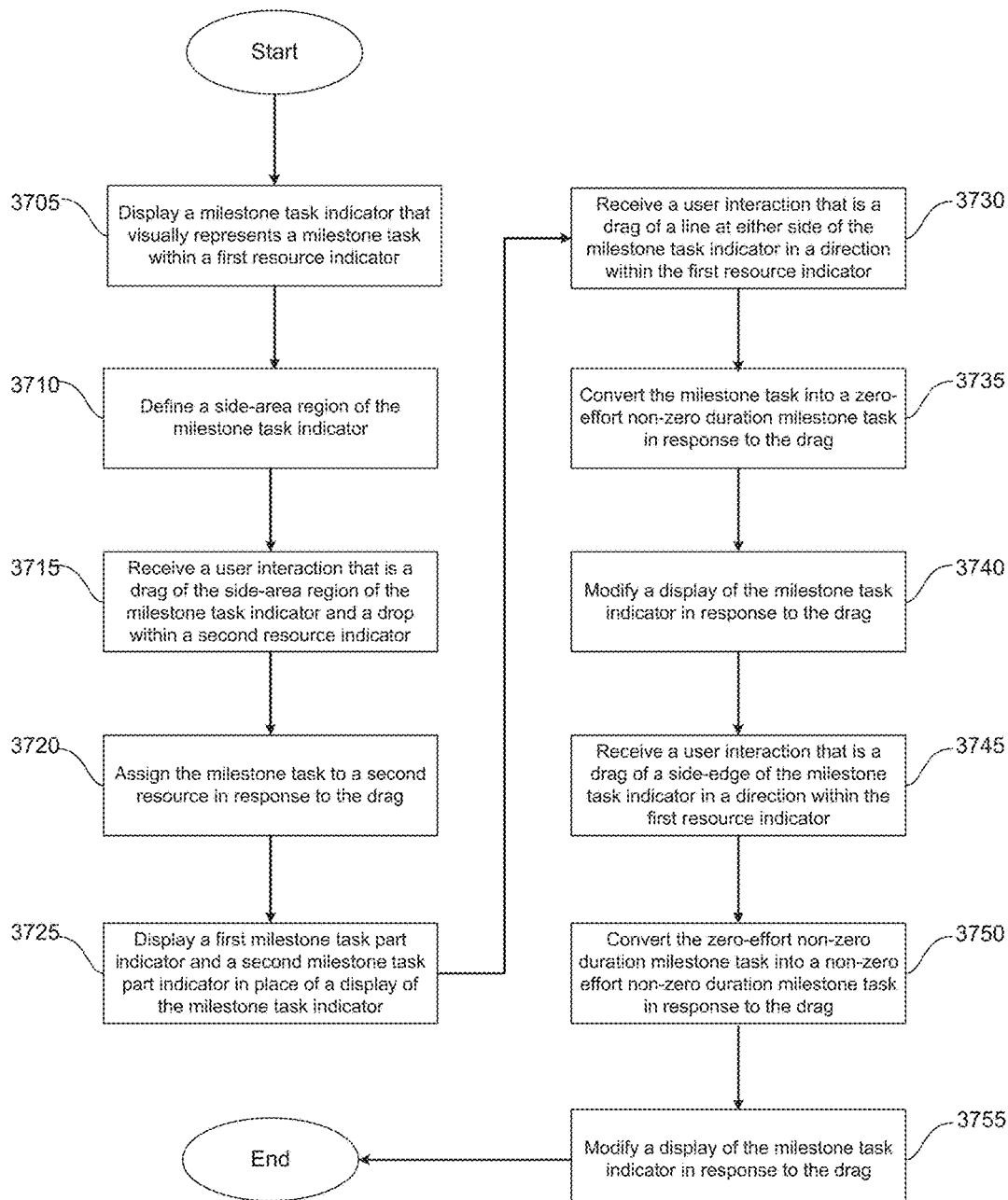
FIG. 37 illustrates a flow diagram of the functionality of a visual task assignment module for milestone tasks, according to another embodiment of the invention.
Figure 38:
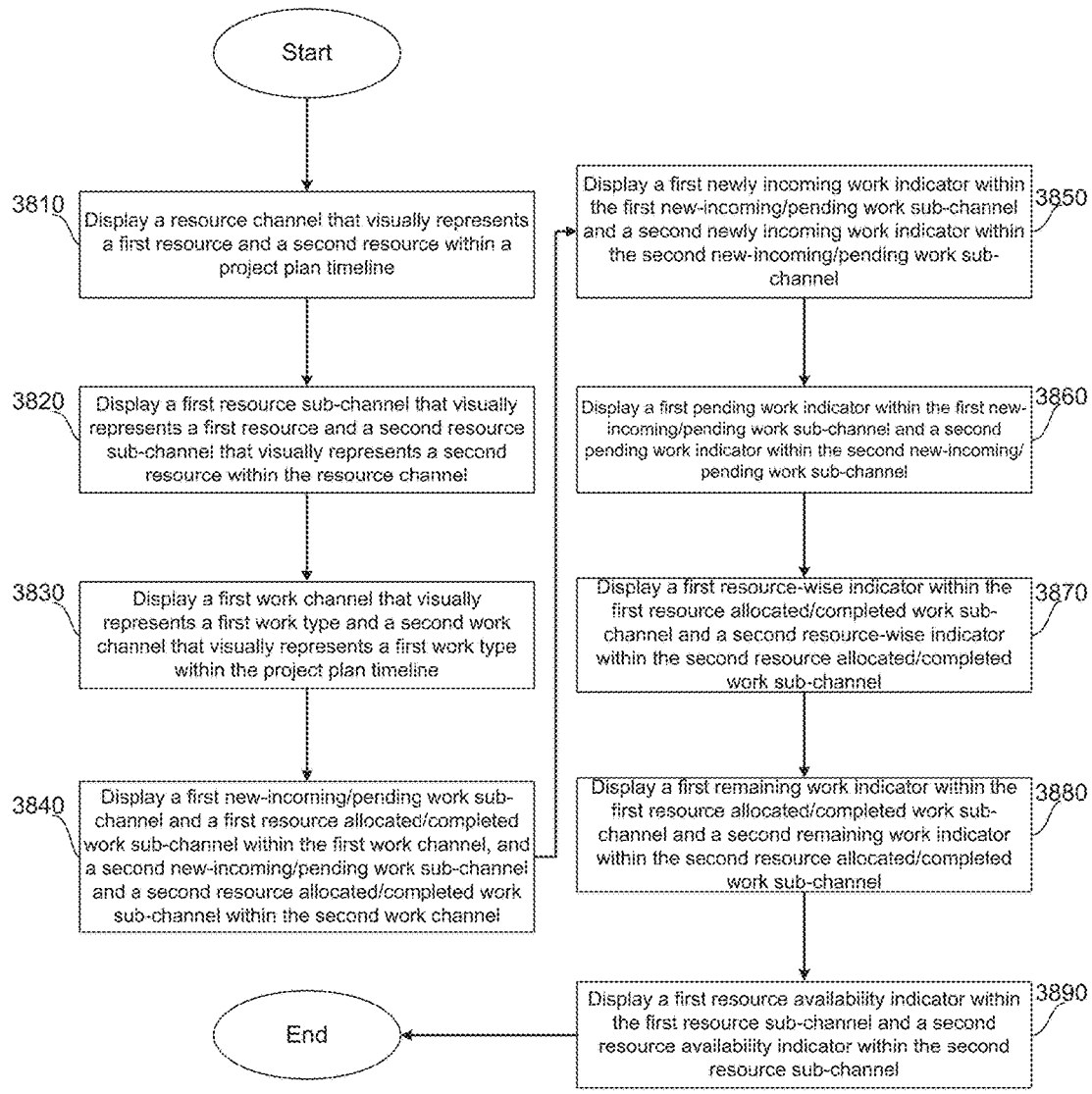
FIG. 38 illustrates a flow diagram of the functionality of a visual task assignment module, according to another embodiment of the invention.

FIG. 36 illustrates a flow diagram of the functionality of a visual task assignment module (such as visual task assignment module 16 of FIG. 1), according to an embodiment of the invention. In one embodiment, the functionality of the flow diagram of FIG. 36, as well as the functionality of the flow diagrams of FIGS. 37 and 38, are each implemented by software stored in a memory or some other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 3605. At 3605, a project plan timeline is displayed within a user interface. The flow then proceeds to 3610. At 3610, a first resource indicator and a second resource indicator are displayed within the project plan timeline. The first resource indicator visually represents a capacity of a first resource, and the second resource indicator visually represents a capacity of a second resource. The flow then proceeds to 3615. At 3615, a task indicator is displayed within the first resource indicator. The task indicator visually represents a task assigned to the first resource. The flow then proceeds to 3620. At 3620, a side-area region of the task indicator is defined. The defining the side-area region of the task indicator designates the task as a multi-resource enabled task, capable of being assigned to multiple resources. In some embodiments, one of a left side or a right side region of the task indicator can be double-clicked in order to define the side-area region of the task indicator. The flow then proceeds to 3625. At 3625, a user interaction (or "gesture") that is a drag of the side-area region of the task indicator within the second resource indicator is received. The flow then proceeds to 3630. At 3630, the task is assigned to the second resource in response to the drag of the side-area region of the task indicator within the second resource indicator. The flow then proceeds to 3635. At 3635, a first task part indicator and a second task part indicator are displayed within the project plan timeline in place of the display of the task indicator. The first task part indicator visually represents a first portion of the task that is assigned to the first resource. The second task part indicator visually represents a second portion of the task that is assigned to the second resource. Further, the first task part indicator is displayed within the first resource indicator, and the second task part indicator is displayed within the second resource indicator. The flow then proceeds to 3640.

At 3640, a user interaction that is a drag of the second task part indicator within the first resource indicator is received. The flow then proceeds to 3645. At 3645, the task is un-assigned from the second resource in response to the drag of the second task part indicator within the first resource indicator. The flow then proceeds to 3650. At 3650, a user interaction that is a drag of one of the first task part indicator or the second task part indicator and a drop within an unassigned resource indicator is received. The flow then proceeds to 3655. At 3655, the task is un-assigned from the first resource and the second resource in response to the drag of one of the first task part indicator or the second task part indicator and the drop within the unassigned resource indicator. The flow then proceeds to 3660. At 3660, a user interaction that is a drag of one of a left side edge or a right side edge of the first task part indicator is received. The flow then proceeds to 3665. At 3665, a resource allocation percentage of the first portion of the task that is assigned to the first resource in modified in response to the drag of one of the left side edge or the right side edge of the first task part indicator. The flow then ends.

FIG. 37 illustrates a flow diagram of the functionality of a visual task assignment module (such as visual task assignment module 16 of FIG. 1), according to another embodiment of the invention. The flow begins and proceeds to 3705. At 3705, a milestone task indicator is displayed within a first resource indicator that is displayed within a project plan timeline. The milestone task indicator visually represents a milestone task assigned to the first resource. In certain embodiments, the milestone task can be a zero-effort zero-duration milestone task that includes a zero effort and a zero duration. The flow then proceeds to 3710. At 3710, a side-area region of the milestone task indicator is defined. The defining the side-area region of the milestone task indicator designates the milestone task as a multi-resource enabled milestone task, capable of being assigned to multiple resources. In some embodiments, one of a left side or a right side region of the milestone task indicator can be double-clicked in order to define the side-area region of the milestone task indicator. The flow then proceeds to 3715. At 3715, a user interaction that is a drag of the side-area region of the milestone task indicator and a drop within the second resource indicator is received. The flow then proceeds to 3720. At 3720, the milestone task is assigned to the second resource in response to the drag of the side-area region of the milestone task indicator and the drop within the second resource indicator. The flow then proceeds to 3725. At 3725, a first milestone task part indicator and a second milestone task part indicator are displayed within the project plan timeline in place of the display of the milestone task indicator. The first milestone task part indicator visually represents a first portion of the milestone task that is assigned to the first resource. The second milestone task part indicator visually represents a second portion of the milestone task that is assigned to the second resource. Further, the first milestone task part indicator is displayed within the first resource indicator, and the second milestone task part indicator is displayed within the second resource indicator. The flow then proceeds to 3730.

At 3730, a user interaction that is a drag of a line at either side of the milestone task indicator in a direction (e.g., a vertical direction) within the first resource indicator is received. The flow then proceeds to 3735. At 3735, the milestone task (which in this embodiment, is a zero-effort zero-duration milestone task) is converted into a zero-effort non-zero duration milestone task, in response to the drag of the line of the milestone task indicator in the direction (e.g., the vertical direction) within the first resource indicator, where a non-zero duration is defined for the zero-effort non-zero-duration milestone task. The flow then proceeds to 3740. At 3740, a display of the milestone task indicator is modified in response to the drag of the line of the milestone task indicator in the direction (e.g., the vertical direction) within the first resource indicator. The flow then proceeds to 3745. At 3745, a user interaction that is a drag of a side-edge of the milestone task indicator in a direction (e.g., a horizontal direction) within the first resource indicator is received. The flow then proceeds to 3750. At 3750, the zero-effort non-zero duration milestone task is converted into a non-zero-effort non-zero duration milestone task, in response to the drag of the side-edge of the milestone task indicator in the direction (e.g., the horizontal direction) within the first resource indicator, where a non-zero effort is defined for the zero-effort non-zero-duration milestone task. The flow then proceeds to 3755. At 3755, a display of the milestone task indicator is modified in response to the drag of the side-edge of the milestone task indicator in the direction (e.g., the horizontal direction) within the first resource indicator. The flow then ends.

FIG. 38 illustrates a flow diagram of the functionality of a visual task assignment module (such as visual task assignment module 16 of FIG. 1), according to another embodiment of the invention. The flow begins and proceeds to 3810. At 3810, a resource channel is displayed within a project plan timeline. The resource channel visually represents a first resource and a second resource. The flow then proceeds to 3820. At 3820, a first resource sub-channel and a second resource sub-channel are displayed within the resource channel. The first resource sub-channel visually represents the first resource, and the second resource sub-channel visually represents the second resource. The flow then proceeds to 3830. At 3830, a first work channel and a second work channel are displayed within the project plan timeline. The first work channel visually represents a first work type, and the second work channel visually represents the second work type. The flow then proceeds to 3840. At 3840, a first NIPW sub-channel and a first RACW sub-channel are displayed within the first work channel, and a second NIPW sub-channel and a second RACW sub-channel are displayed within the second work channel. The first NIPW sub-channel visually represents work of the first work type that is newly incoming or pending. The second NIPW sub-channel visually represents work of the second work type that is newly incoming or pending. The first RACW sub-channel visually represents work of the first type that is allocated to a resource or completed by the resource. The second RACW sub-channel visually represents work of the second type that is allocated to a resource or completed by the resource. The flow then proceeds to 3850.

At 3850, a first NI indicator is displayed within the first NIPW sub-channel, and a second NI indicator is displayed within the second NIPW sub-channel. The first NI indicator visually represents an amount of newly incoming work for a first work type and for a specified date-time period. The second NI indicator visually represents an amount of newly incoming work for a second work type and for a specified date-time period. The flow then proceeds to 3860. At 3860, a first P indicator is displayed within the first NIPW sub-channel, and a second P indicator is displayed within the second NIPW sub-channel. The first P indicator visually represents an amount of pending work from a previous date-time period for a first work type and for a specified date-time period. The second P indicator visually represents an amount of pending work from a previous date-time period for a second work type and for a specified date-time period. The flow then proceeds to 3870. At 3870, a first R indicator is displayed within the first RACW sub-channel, and a second R indicator is displayed within the second RACW sub-channel. The first R indicator visually represents an amount of work of a first work type allocated to, or completed by, a specified resource for a specified date-time period. The second R indicator visually represents an amount of work of a second work type allocated to, or completed by, a specified resource for a specified date-time period. The flow then proceeds to 3880. At 3880, a first RW indicator is displayed within the first RACW sub-channel, and a second RW indicator is displayed within the second RACW sub-channel. The first RW indicator visually represents an amount of work of a first work type that is remaining or un-allocated for a specified date-time period. The second RW indicator visually represents an amount of work of a second work type that is remaining or un-allocated for a specified date-time period. The flow then proceeds to 3890. At 3890, a first RA indicator is displayed within the first resource sub-channel, and a second RA indicator is displayed within the second resource sub-channel. The first RA indicator visually represents an availability of the first resource for a specified date-time period. The second RA indicator visually represents an availability of the second resource for a specified date-time period. The flow then ends.

In one embodiment, system 10 is a specialized project management system/device that provides project management functionality, including the prioritizing, planning, managing, and evaluating of projects, programs, and portfolios. Embodiments include interactive activity Gantt charts and task flow charts such as shown in FIGS. 2-38 to allow planners, schedulers, and project managers to communicate a more accurate and complete graphical representation of a project's schedule, and further may provide calendar and activity network views to provide team members with an intuitive view for displaying their assignments, along with the required information to perform the work. Further, in one embodiment, user interfaces generated by system 10, such as shown in FIGS. 2-38, can be printed on paper or made available in any other "portable" media so that the information can be easily used in the field to assist in project planning.

Thus, a visual task assignment system is provided that can allow a user to interact with a user interface in order to assign a task to multiple resources, where the visual task assignment system can further display a visual indication that the task has been assigned to multiple resources. This allows a user to visually manage all aspects of multi-resource assignments, which can improve the efficiency of a project plan manager in managing multiple task-resource assignments for a project plan. Further, the visual task assignment system can display milestone tasks in addition to tasks, and can further allow a user to interact with a user interface in order to assign a milestone task to multiple resources, where the visual task assignment system can further display a visual indication that the milestone task has been assigned to multiple resources. This visual management of milestone tasks can further assist the project plan manager in managing the execution of multiple milestone tasks. Even further, the visual task assignment system can display a flow of incoming work for distinct work types within a user interface. The visual task assignment system can make it possible to visually allocate a resource at a macro level to a distinct category of tasks. The visual task assignment system can also provide for a drill-down view which can easily make a detailed view available, and can facilitate individual task to resource assignment.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to visualize task assignments, the visualizing comprising:

displaying a project plan timeline within a user interface, wherein project plan timeline data is accessed from a data store to display information about the project plan timeline;

displaying a first work channel that represents a first work type and a second work channel that represents a second work type within the user interface, wherein the first work type and second work type are different;

displaying a first incoming/pending (I/P) sub-channel and a first allocated/completed (A/C) sub-channel within the first work channel, wherein the first I/P sub-channel visually represents work of the first work type that is incoming or pending, the first A/C sub-channel visually represents allocated or completed work of the first work type, and an amount of work indicated by I/P indicators within the first I/P sub-channel on a given date visually corresponds to an amount of work indicated by A/C indicators within the first A/C sub-channel on the given date;

displaying a first resource indicator within the first A/C sub-channel and a second resource indicator within the first A/C sub-channel, wherein the first resource indicator visually represents work of the first work type allocated to or completed by a first resource for a specified date-time period, and the second resource indicator visually represents work of the first work type allocated to or completed by a second resource for a specified date-time period;

displaying a first I/P indicator within the first I/P sub-channel, wherein the first I/P indicator visually represents an amount of incoming work of the first work type for a specified date-time period, and a flow of incoming work for the first work type is continuous;

receiving, from a user, a selection of a portion of the first resource indicator, the selection indicating a portion of the amount of work of the first work type assigned to the first resource for a specified date-time period;

receiving a user interaction that comprises a drag of the selected portion of the first resource indicator and a drop within a first resource availability indicator, wherein the first resource availability indicator visually represents an availability of the first resource;

un-assigning work corresponding to the selected portion of the first resource indicator from the first resource in response to the drag of the selected portion of the first resource indicator and the drop within the first resource availability indicator; and dynamically updating the display of the first work channel to reflect the un-assigning of the work corresponding to the selected portion of the first resource indicator.

2. The computer-readable medium of claim 1, the visualizing further comprising:

displaying a tasks project plan for the project plan timeline;

displaying a third resource indicator and a fourth resource indicator within the tasks project plan, wherein the third resource indicator visually represents the first resource and the fourth resource indicator visually represents the second resource;

displaying a first task indicator within the third resource indicator, wherein the first task indicator visually represents a task assigned to the first resource;

defining a side-area region of the first task indicator, where the defining the side-area region designates the task as a multi-resource enabled task;

receiving a user interaction that comprises a drag of the side-area region of the first task indicator and a drop within the third resource indicator;

assigning the task to the second resource in response to the user interaction, wherein the task is assigned to both the first resource and the second resource; and displaying a first task part indicator and a second task part indicator within the tasks project plan in place of the display of the first task indicator, wherein the first task part indicator visually represents a first portion of the task that is assigned to the first resource and the second task part indicator visually represents a second portion of the task that is assigned to the second resource;

receiving a user interaction that comprises a drag of the second task part indicator and a drop within the third resource indicator; and un-assigning the task from the second resource in response to the drag of the second task part indicator within the third resource indicator.

3. The computer-readable medium of claim 2, the visualizing further comprising:

receiving a user interaction that comprises a drag of one of the first task part indicator or the second task part indicator and a drop within an unassigned resource indicator; and un-assigning the task from the first resource and the second resource in response to the drag of one of the first task part indicator or the second task part indicator within the unassigned resource indicator.

4. The computer-readable medium of claim 2, wherein the defining the side-area region of the task indicator comprises double-clicking on one of a left side region or a right side region of the task indicator.

5. The computer-readable medium of claim 1, the visualizing further comprising:

displaying a resource channel within the project plan timeline, wherein the resource channel visually represents the first resource and the second resource;

displaying a first resource sub-channel and a second resource sub-channel within the resource channel, wherein the first resource sub-channel visually represents the first resource, and wherein the second resource sub-channel visually represents the second resource;

displaying a second I/P sub-channel and a second A/C sub-channel within the second work channel, wherein the I/P sub-channel visually represents work of the second work type that is newly incoming or pending, and wherein the second A/C sub-channel visually represents work of the second work type that is allocated to a resource or completed by the resource.

6. The computer-readable medium of claim 5, the visualizing further comprising:

displaying a second I/P indicator within the second I/P sub-channel, wherein the second I/P indicator visually represents an amount of newly incoming work for a second work type and for a specified date-time period; and displaying a second pending work indicator within the second I/P sub-channel, wherein the second pending work indicator visually represents an amount of pending work from a previous date-time period for the second work type.

7. The computer-readable medium of claim 6, the visualizing further comprising:

displaying a third resource indicator within the second A/C sub-channel; wherein the first resource indicator visually represents an amount of work of the first work type allocated to, or completed by, the first resource for a specified date-time period, and the second resource indicator visually represents an amount of work of the first work type allocated to, or completed by, the second resource for a specified date-time period, and the third resource indicator visually represents an amount of work of the second work type allocated to, or completed by, the second resource for a specified date-time period; and displaying a second remaining work indicator within the second A/C sub-channel; wherein the second remaining work indicator visually represents an amount of work of the second work type that is remaining or un-allocated for a specified date-time period.

8. The computer-readable medium of claim 7, the visualizing further comprising:

displaying the first resource availability indicator within the first resource sub-channel and a second resource availability indicator within the second resource sub-channel, wherein the first resource availability indicator visually represents an availability of the first resource for a specified date-time period, and wherein the second resource availability indicator visually represents an availability of the second resource for a specified date-time period.

9. The computer-readable medium of claim 6, wherein the first remaining work indicator within the first A/C sub-channel at a first date corresponds to a pending work indicator in the first I/P sub-channel at a date after the first date, the second date is a future date.

10. The computer-readable medium of claim 8, further comprising:

receiving a drag-and-drop user interaction between the first resource availability indicator and the first work remaining indicator; and dynamically removing the unassigned indicator and dynamically displaying a fourth resource indicator within the first A/C sub-channel that visually represents work of the first work type that has been assigned to the first resource.

11. The computer-readable medium of claim 1, further comprising:

receiving a user interaction with the first I/P indicator;

in response to the user interaction, dynamically displaying a detailed drill-down view of incoming work of the first work type, wherein the detailed drill-down view comprises an overly view or pop-up view.

12. The computer-readable medium of claim 1, further comprising:

displaying a first pending work indicator within the first I/P sub-channel for a specified date-time period, wherein the first pending work indicator visually represents an amount of pending work from a previous date-time period for the first work type; and displaying a first remaining work indicator within the first A/C sub-channel, wherein the first remaining work indicator visually represents an amount of work of the first work type that is remaining or un-allocated for a first date-time period, the first date-time period is a future date, and the first remaining work indicator corresponds to estimated incoming work of the first work type.

13. The computer-readable medium of claim 1, further comprising:

receiving, from a user, a selection of a portion of the first resource availability indicator;

receiving a user interaction that comprises a drag of the portion of the first resource availability indicator and a drop within the first A/C sub-channel;

assigning work corresponding to the selected portion of the first resource availability indicator to the first resource in response to the drag of the selected portion of the first resource availability indicator and the drop within the first A/C sub-channel.

14. The computer-readable medium of claim 1, further comprising:

dynamically updating the display of the first work channel to reflect the assigning of the work corresponding to the selected portion of the first resource availability indicator to the first resource.

15. A computer-implemented method for visualizing task assignments, the computer-implemented method comprising:

displaying a project plan timeline within a user interface, wherein project plan timeline data is accessed from a data store to display information about the project plan timeline;

displaying a first work channel that represents a first work type and a second work channel that represents a second work type within the user interface, wherein the first work type and second work type are different;

displaying a first incoming/pending (I/P) sub-channel and a first allocated/completed (A/C) sub-channel within the first work channel, wherein the first I/P sub-channel visually represents work of the first work type that is incoming or pending, the first A/C sub-channel visually represents allocated or completed work of the first work type, and an amount of work indicated by I/P indicators within the first I/P sub-channel on a given date visually corresponds to an amount of work indicated by A/C indicators within the first A/C sub-channel on the given date;

displaying a first resource indicator within the first A/C sub-channel and a second resource indicator within the first A/C sub-channel, wherein the first resource indicator visually represents work of the first work type allocated to or completed by a first resource for a specified date-time period, and the second resource indicator visually represents work of the first work type allocated to or completed by a second resource for a specified date-time period;

displaying a first I/P indicator within the I/P sub-channel, wherein the first I/P indicator visually represents an amount of incoming work of the first work type for a specified date-time period, and a flow of incoming work for the first work type is continuous;

receiving, from a user, a selection of a portion of the first resource indicator, the selection indicating a portion of the amount of work of the first work type assigned to the first resource for a specified date-time period;

receiving a user interaction that comprises a drag of the selected portion of the first resource indicator and a drop within a first resource availability indicator, wherein the first resource availability indicator visually represents an availability of the first resource;

un-assigning work corresponding to the selected portion of the first resource indicator from the first resource in response to the drag of the selected portion of the first resource indicator and the drop within the first resource availability indicator; and dynamically updating the display of the first work channel to reflect the un-assigning of the work corresponding to the selected portion of the first resource indicator.

16. The computer-implemented method of claim 15, further comprising:

displaying a tasks project plan for the project plan timeline;

displaying a third resource indicator and a fourth resource indicator within the tasks project plan, wherein the third resource indicator visually represents the first resource and the fourth resource indicator visually represents the second resource;

displaying a first task indicator within the third resource indicator, wherein the first task indicator visually represents a task assigned to the first resource;

defining a side-area region of the first task indicator, where the defining the side-area region designates the task as a multi-resource enabled task and the defining the side-area region comprises double-clicking on one of a left side region or a right side region of the first task indicator;

receiving a user interaction that comprises a drag of the side-area region of the first task indicator and a drop within the third resource indicator;

assigning the task to the second resource in response to the user interaction, wherein the task is assigned to both the first resource and the second resource; and displaying a first task part indicator and a second task part indicator within the tasks project plan in place of the display of the first task indicator, wherein the first task part indicator visually represents a first portion of the task that is assigned to the first resource and the second task part indicator visually represents a second portion of the task that is assigned to the second resource;

receiving a user interaction that comprises a drag of the second task part indicator and a drop within the third resource indicator; and un-assigning the task from the second resource in response to the drag of the second task part indicator within the third resource indicator.

17. The computer-implemented method of claim 16, further comprising:

receiving a user interaction that comprises a drag of one of the first task part indicator or the second task part indicator and a drop within an unassigned resource indicator; and un-assigning the task from the first resource and the second resource in response to the drag of one of the first task part indicator or the second task part indicator within the unassigned resource indicator.

18. A system for visualizing task assignments, the system comprising:

a processor in communication with a data store and a display for displaying a user interface, wherein the processor is configured to:

display, on the display, a project plan timeline within a user interface, wherein project plan timeline data is accessed from the data store to display information about the project plan timeline;

display a first work channel that represents a first work type and a second work channel that represents a second work type within the user interface, wherein the first work type and second work type are different;

display a first incoming/pending (VP) sub-channel and a first allocated/completed (A/C) sub-channel within the first work channel, wherein the first I/P sub-channel visually represents work of the first work type that is incoming or pending, the first A/C sub-channel visually represents allocated or completed work of the first work type, and an amount of work indicated by I/P indicators within the first I/P sub-channel on a given date visually corresponds to an amount of work indicated by A/C indicators within the first A/C sub-channel on the given date;

display a first resource indicator within the first A/C sub-channel and a second resource indicator within the first A/C sub-channel, wherein the first resource indicator visually represents work of the first work type allocated to or completed by a first resource for a specified date-time period, and wherein the second resource indicator visually represents work of the first work type allocated to or completed by a second resource for a specified date-time period;

display a first I/P indicator within the I/P sub-channel, wherein the first I/P indicator visually represents an amount of incoming work of the first work type for a specified date-time period, and a flow of incoming work for the first work type is continuous;

receive, from a user, a selection of a portion of the first resource indicator, the selection indicating a portion of the amount of work of the first work type assigned to the first resource for a specified date-time period;

receive a user interaction that comprises a drag of the selected portion of the first resource indicator and a drop within a first resource availability indicator, wherein the first resource availability indicator visually represents an availability of the first resource;

un-assign work corresponding to the selected portion of the first resource indicator from the first resource in response to the drag of the selected portion of the first resource indicator and the drop within the first resource availability indicator; and dynamically update the display of the first work channel to reflect the un-assigning of the work from the first resource corresponding to the selected portion of the first resource indicator.

\* \* \* \* \*

UNITED STATES PATENT AND TRADEMARK OFFICE
CERTIFICATE OF CORRECTION

PATENT NO. : 10,496,943 B2  
APPLICATION NO. : 14/672346  
DATED : December 3, 2019  
INVENTOR(S) : De et al.

Page 1 of 1

It is certified that error appears in the above-identified patent and that said Letters Patent is hereby corrected as shown below:

On the Title Page

On page 3, Column 2, under Other Publications, Line 44, delete "informatin" and insert -- information --, therefor.

In the Claims

In Column 37, Line 43, in Claim 1, delete "(VP)" and insert -- (I/P) --, therefor.

In Column 42, Line 32, in Claim 18, delete "(VP)" and insert -- (I/P) --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*